United States Patent
Reichlen

(10) Patent No.: US 6,396,497 B1
(45) Date of Patent: May 28, 2002

(54) COMPUTER USER INTERFACE WITH HEAD MOTION INPUT

(75) Inventor: Bruce A. Reichlen, Acton, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/566,863

(22) Filed: May 8, 2000

Related U.S. Application Data

(63) Continuation of application No. 08/708,103, filed on Aug. 27, 1996, now Pat. No. 6,061,064, which is a continuation of application No. 08/188,180, filed on Jan. 29, 1994, now abandoned, which is a continuation-in-part of application No. 08/114,546, filed on Aug. 3, 1993.

(51) Int. Cl.[7] ............................................. G06T 17/00

(52) U.S. Cl. ..................................................... 345/427

(58) Field of Search ............................. 345/418, 419, 345/423, 424, 425, 427, 428, 429

(56) References Cited

U.S. PATENT DOCUMENTS

| | | | |
|---|---|---|---|
| 5,300,943 A | 4/1994 | Jakobs et al. ................... | 345/1 |
| 5,345,281 A | 9/1994 | Taboada et al. ............ | 351/210 |
| 5,360,971 A | 11/1994 | Kaufman et al. ........... | 250/221 |
| 5,373,857 A | 12/1994 | Travers et al. .............. | 128/782 |
| 5,381,158 A | 1/1995 | Takahara et al. ............ | 345/156 |
| 5,388,990 A | 2/1995 | Beckman ..................... | 434/38 |
| 5,394,517 A | 2/1995 | Kalawsky .................... | 395/129 |
| 5,408,346 A | 4/1995 | Trissel et al. ................. | 359/65 |
| 5,422,653 A | 6/1995 | Maguire et al. ............... | 345/9 |
| 5,422,689 A | 6/1995 | Knapp et al. ............... | 351/208 |
| 5,436,639 A | 7/1995 | Arai et al. ................... | 345/156 |
| 5,447,166 A | 9/1995 | Gevins ....................... | 128/731 |
| 5,491,492 A | 2/1996 | Knapp et al. ................... | 345/8 |
| 5,495,576 A | 2/1996 | Ritchey ...................... | 395/125 |

OTHER PUBLICATIONS

Pierre Wellner and William Newman, "A Desk Supporting Computer–based raction with Paper Documents", CHI '92 Conference Proceedings, May 3–7, 1992, es 587–592.

Pierre Wellner, "DigitalDesk Calculator: Tangible Manipulation on a Desk Top play" UIST, Proceedings of the ACM Symposium on User Interface Software and Technology, No. 11–13, 1991, pp. 27–33.

W. Johnson, H. Jellinek, Leigh Koltz Jr., R. Rao, and S. Card, "Bridging the Paper Electronic Worlds: The Paper User Interface", Interchi '93 Converence Proceedings, Apr. 24–29, 1993, pp. 507–512.

(List continued on next page.)

*Primary Examiner*—Cliff N. Vo
(74) *Attorney, Agent, or Firm*—Edward W. Porter

(57) ABSTRACT

A computer interface allows as user to control aspects of its behavior by head motion. In one example, a head mounted display (HMD) includes a directional detector for generating an object detection signal when pointed at certain physical objects. The detector is mounted so users can point it by moving their heads. In another example, a graphical user interface includes the computation of a view space comprised of multiple separate portions, in each of which graphical user interface windows generated by separate computer processes can be selectively located by a user. The user can selectively move such windows between view space portions by a point and click interface. The method displays a subset of view space portions to the user at one time, senses motion of the user's head, and changes the portions of the view space displayed, in discrete units of view space portions, in response to changes in the position of the user's head. In still another example, a graphical user interface includes: computing a visual space; displaying a subset of space to the user, sensing user motion, including monitoring motion of a user's head, so as to divide head motions into at least a first and second class; and allowing a user to navigate through the visual space in response to head motions of said first class, while substantially ignoring head motions of the second class for such purposes.

12 Claims, 34 Drawing Sheets

OTHER PUBLICATIONS

Pierre Wellner, "Interacting With Paper On The DigitalDesk" *Communications of the ACM*, Jul. 1993/Vo. 36, No. 7, pp. 87–97.

Tomio Kishimoto et al., "Virtual Offices", IEEE Communications Magazine, (Oct. 1993) 36–39.

R.S. Kalawsky, "Reality of Virtual Reality", IEEE Colloq. (1991) No. 197; Real World Visualization.

Kazuyo Iwamoto et al., "Development of an Eye Movement Tracking Type Head Mounted Display: System Proposal and Evaluation Experiments", Robots and Human Communications, 1993 Int'l 1993 Workshop, pp. 287–291, (1993).

John A. Adam, "Virtual Reality is for Real", IEEE Spectrum, pp. 22–29, (Oct. 1993).

P. Fau et al., "Registration Without Correspondence", Computer Vision and Pattern Recognition (1994), pp. 121–128.

Thomas P. Caudell et al., "Augmented Reality: An application of Heads–Up Display Technology to Manual Manufacturing Processes", Systems Science, 1992 Annual Hawaii International Conference, vol. II, 659–669.

Emily K. Edwards et al., "Video See–through For Merging Real and Virtual Environments", Virtual Reality, 1993 Symposium, pp 223–233.

Daniel Henry et al., "Spatial Perception in Virtual Environments: Evaluating and Architectural Applications", Virtual Reality, 1993 Symposium, pp 33–40.

Michael Deering, "Explorations of Display Interfaces for Virtual Reality", Symposium, pp. 144–147.

Adam L. Janin et al., "Calibration of Head–Mounted Displays for Augmented Reality Applications", Virtual Reality, 1993 Symposium, pp. 246–255.

Audrie State et al., "Case Study: Observing a Volume Rendered Fetus within a Pregnant Patient", Visualization, 1994 Conference, pp. 364–368.

Henry A. Sowizral et al., "Tracking Position and Orientation in a Large Volume" Virtual Reality, 1993 Symposium, pp. 132–139.

Klaus Ziner, "Integrated Multi Media and Visualization Technique for Process S&C", Systems, Man, and Cybernetics, 1993 International Conference, pp 367–372.

Stuart K. Card et al., "A Multiple, Virtual–Workspace Interface to Support User Task Switching", Association for Computing Machinery, ACM document No. ACM–0–91–213–6/87/0004/0053, 1987, pp. 59–95, on file at Univ. of NE Libraries at Lincoln, NE.

Reference (page 4) Serial No. 09/566,863 form 1449.

Austin D. Henderson et al., "Rooms: The user of Multiple Virtual Workspaces to reduce Space Contention in a Windows–Based Graphical User Interface", ACM Transactions on Graphics, vol. No. 3, Jul. 1986, ACM document No. 1987 ACM 0–0301/86/0700–0211, pp. 211–243.

George W. Fitzmaurice, "Situated information spaces and spatially aware palmtop computers", Communications of the ACM, v36, n7, p38 (12), Jul. 1993.

Robert Cowart, "Mastering Windows 3.1," Sybex, Inc. 1992, 1993, pp 12–24 and 689–690.

David Kahaner, "Special Report: Virtual Reality in Japan, " IEEE Micro pp. 66–73, 4/93.

```
...                 ┌412
   +📁Ⓜ BUILDING AT WORK
         +📁    MY OFFICE AT WORK
   326B +📁 CONFERENCE ROOM Ⓟ
   322B +📁 OUTSIDE BOSS'S DOOR Ⓝ
                  -🗒 SOUND RECORDER-MSG671
               + FROM JIM
         432┘       -🗒 SOUND RECORDER - MSG 235
                 🔔-🗒 WORD PERFECT - HAPPY BIRTHDAY
         +📁 BOSS'S OFFICE Ⓝ
   326┘       -🗒 1-2-3 - 3RD Q REPORT
              -🗒 1-2-3 - 4TH Q PROJECTION
...
...
```

```
...
  +[M]LOCAL         180J
412—   +[]DRIVEWAY OF HOUSE[N]
   428—   △-[] SOUND RECORDER - MSG RE BOX
       +[]HOUSE
       +[]SUPERMARKET[N]
326C—      -[] WORD PERFECT - SHOPPING LIST
       +[]MALL[N]
326C—      -[] SOUND RECORDER - MSG1278
           -[] WORD PERFECT - SHOPPING LIST
       + FROM WIFE
432—       -[] SOUND RECORDER - RE SON'S PRESENT
   ...
...
```

+☐ FRONT DOOR SCREEN AT WORK
    +▭ BACKGROUND
  360⤴    -☐ WORD PERFECT - GREETINGS
  +▤ JIM DOE [N]
      + FROM BOSS
          🔔- ☐ SOUND RECORDER - MSG3092
      + FROM BRUCE
          -☐ WORD PERFECT - HAPPY BIRTHDAY
     ...
  +▤ BRUCE [N]
      + FROM JIM DOE
          -☐ WORD PERFECT - SEE ME RIGHT AWAY

FIG. 36

COMPUTER USER INTERFACE WITH HEAD MOTION INPUT

RELATED APPLICATIONS

The present application is a continuation of U.S. patent application Ser. No. 08/708,103, filed on Aug. 27, 1996, now U.S. Pat. No. 6,061,064 entitled "System And Method For Providing And Using A Computer User Interface With View Space Having Discrete Portions". Application Ser. No. 08/708,103 is a File Wrapper Continuation application of U.S. patent application Ser. No. 08/188,180, filed on Jan. 29, 1994, entitled "System And Method For An Improved Computer User Interface" now abandoned. Application Ser. No. 08/188.180 was a continuation-in-part of a U.S. patent application Ser. No. 08/114,546 entitled "System And Method For A Computer Video Display" filed on Aug. 31, 1993.

BACKGROUND OF THE INVENTION

1. Field of the Invention

The present invention relates to a user interface for computers that allow user head motion to control aspects of its interface.

2. Background of the Invention

Computers have vastly increased their ability to process information. Many computers now include one or more powerful microprocessors. Multitasking operating systems have given the computer the ability to execute more than one application at a time. Application programs have taken advantage of this increased computing power, and as a result, have become more graphic intensive.

The size of standard computer terminals (e.g., a 19 inch monitor) has become a limiting factor in presenting processed information to the user. A standard desktop computer now has the capability to inundate the display terminal of the computer with information. The computer industry has attempted several approaches to overcome this problem.

The most common approach has been window based software. Windowing systems attempt to maximize the use of the screen space of a display terminal by providing overlapping windows and icons. The window operating environment, although useful, is often frustrating to operate. The user is required to spend an inordinate amount of time moving, resizing, and opening and closing various windows and icons on the display space. The opening and closing of a window is often slow. Overlapping windows can be aggravating to the eye. It is also difficult to manipulate information within windows. The physical size of the display terminal limits the size of each window, the number of windows that can be displayed at a given time, and, in the case of graphic intensive applications, is often too small to display an image of an object in its entirety.

Another approach to increasing the display surface area of a computer is to simply use a larger monitor. Several companies are marketing twenty-eight (28) inch diagonal monitors. These extra-large monitors do increase the display capabilities of the computer to some degree, but the problems outlined above are still present. These monitors are also prohibitively expensive to build and difficult to ship to customers. One such monitor currently on the market weighs over two hundred pounds and is more than thirty inches deep. This monitor is clearly impractical for standard desktop computers.

Virtual reality systems represent yet another approach to increasing the display area of a computer. It is believed a virtual reality system was first described by Ivan Sutherland, a co-inventor of the parent application of the present application, in a seminal article entitled "A head-mounted three dimensional display", AFIPS Conference Proceedings, Volume 33, 1968. This article describes an imaging pipeline, including: a database for storing all the data, relationships and objects that are relevant to a model to be displayed; a position sensor for selecting a view point of the model to be displayed; a transformer for traversing the database, extracting the appropriate data to generate the model from the selected view point, and transforming it on the fly to a display format; a frame buffer for storing the transformed data; and the head mounted display for displaying the data stored in the frame buffer. The virtual reality system thus provides the user with a head-motion parallax: when the user moves his or her head, the view seen through the head mounted display unit changes as it would in real life.

Another approach to increasing the effective size of the visual space upon which graphic objects such as windows can be placed is to make the view space in which those objects can be placed larger than the screen and to place a map on the screen representing the various parts of that expanded desktop. The user can then select a given portions of that expanded desktop by clicking the mouse on the corresponding portion of the desktop map. While this can be useful, it requires the user to perform mouse operations to access different portions of the view space, which take time and which can be difficult if his computer does not have mouse or if he, or his hands, are not in situation in which using a mouse is convenient. In the mobile computing made possible by smaller computers and displays, traditional computer mice are often difficult and awkward to use, and other methods of selecting and interacting with computing objects are desirable.

SUMMARY OF THE INVENTION

It is an object of the invention to provide a user interface for computer systems in which a user has provide useful input into the interface through use of his or her head;

It is another object of the present invention to make it easier to access computer information and/or applications.

It is still another object of the present invention to make it easier to access windows or groupings of windows in computing system with a graphic user interface.

It is yet another object of the present invention to enable users to rapidly navigate through windows or computational objects.

It is still another object of the present invention to make it easy to perform certain computer functions without requiring use of a keyboard or mouse.

The present invention relates to a system and method for improving computer user interfaces.

According to one aspect of the invention, a head mounted display (HMD) apparatus is provided. The HMD apparatus includes a display which can be seen by a user wearing the apparatus. The apparatus also includes a directional detector for generating an object detection signal when the detector receives a certain signal from a physical object in response to the detector being pointed at the object. The detector is mounted on the apparatus so a user wearing the apparatus can point the detector by moving his or her head.

In some embodiments of this aspect of the invention the HMD apparatus includes a see-through window to enable a user to see his or her physical surroundings when wearing the apparatus. In some embodiments the apparatus includes an additional input device to enable a user wearing the apparatus to selectively generate computer readable signals in addition to those generated by said detector. In many embodiments the detector points in the same general direction as the face of a user wearing the HMD apparatus. In some embodiments the directional detector has a limited angular view from which it can receive radiation, the user can point the angular view by moving his or her head, and the directional detector generates the object detection signal when the detector is pointed at one of said physical object so that it can receive radiation coming straight from the object.

According to another aspect of the invention, a method of computing a graphical user interface is provided. The method includes computing a view space in which graphical user interface windows generated by separate computer processes can be selectively located by a user. The view space has a plurality of discrete portions, each of which is large enough to hold a plurality of windows generated by separate computer processes. The method enables a user to selectively locate GUI windows in each of the view space portions and to selectively move such windows between view space portions by use of a point and click interface. The method displays a subset of the view space portions to the user with a head-mounted visual display, it senses motion of the user's head, and it changes the portions of the view space displayed to the user, in discrete units of view space portions, in response to changes sensed in the position of the user's head.

In some embodiments of this aspect of the invention, the user is allowed to drag a window with a pointing device to a desired portion in a view space portion. In some embodiments users can change the portion of the view space shown by rotating their heads. In some embodiments, users can use eye movements to input information into the interface.

According to another aspect of the invention, a method of computing a graphical user interface is provided which computes a computer generated visual space. It displays a subset of this space to the user, such as, for example, through a head-mounted visual display. The method senses user motion including monitoring motion of a user's head. This sensing divides head motions into at least a first and second class. The method allows a user to navigate through the visual space by changing the subset of the visual space displayed in response to head motions of said first class, but not in response to head motions of the second class. This enable a user to move further in the visual space in a given direction than would otherwise be possible by causing successive head motions in the given direction to be of the first class, which are counted toward such visual space motion, and causing intervening head motions in the opposite direction—made to prevent the head from being over extended in the given direction—to be of the second class, so as to go uncounted toward such visual space motion.

DESCRIPTION OF THE DRAWINGS

The objects, features and advantages of the system and method of the present invention will be apparent from the following description in which:

FIG. 36 illustrates a portion of a desktop outline showing desktops intended for display on the shared display shown in FIG. 35.

DESCRIPTION OF PREFERRED EMBODIMENTS

I. Continuous View Space

Figure 1:
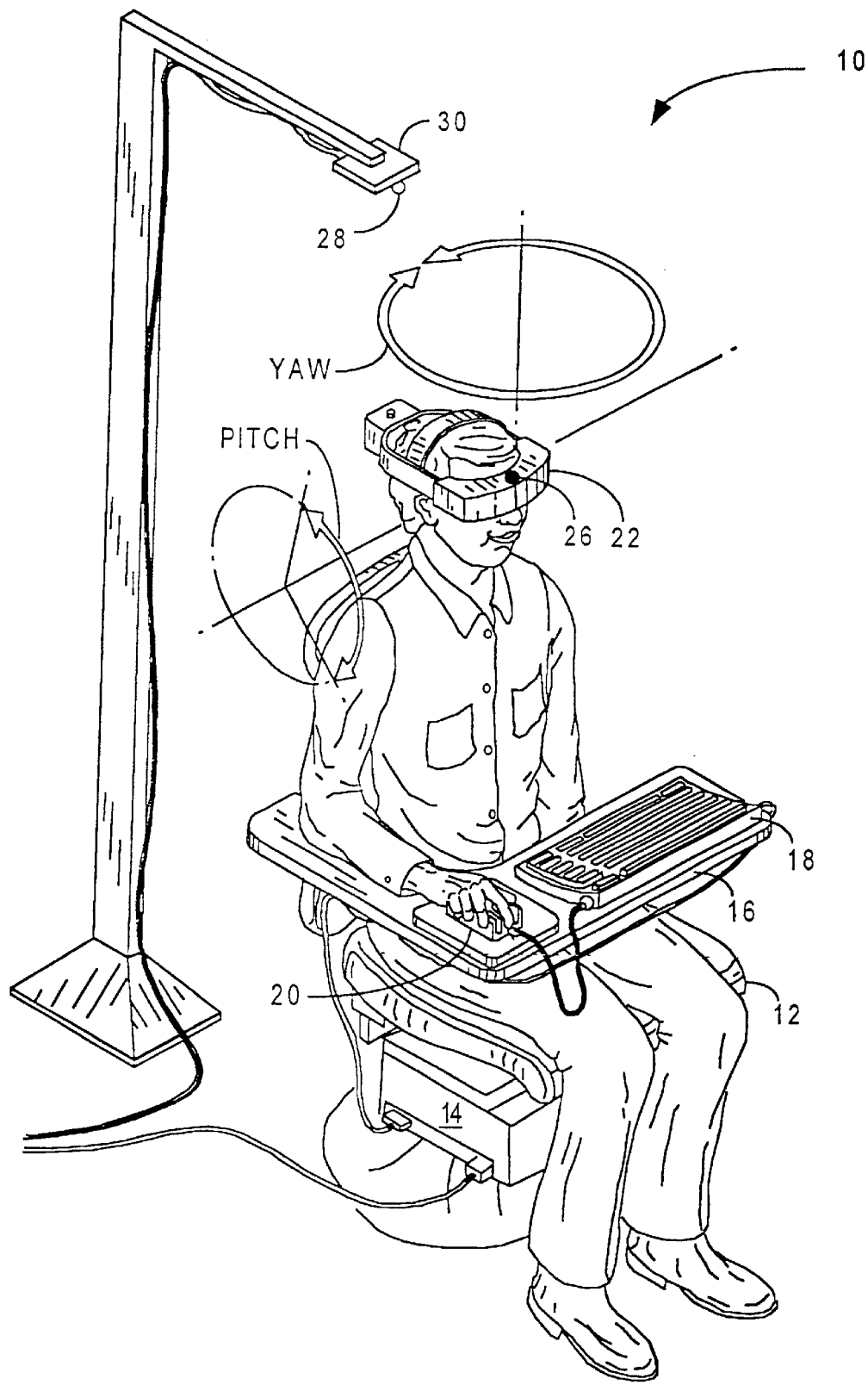
FIG. 1 illustrates a computer operator using the video display system of the present invention.

Referring to FIG. 1, a computer operator using the video display system of the present invention is shown. The video display system 10 includes a swiveling chair 12, a computer 14 mounted at the base of the chair 12, a platform 16 for supporting computer peripheral devices such as a keyboard 18 and a mouse 20, a head mounted display 22 and a position sensor 24 (housed inside computer 14), including a transmitter 26 mechanically coupled to the head mounted display 22 and a receiver 28 mechanically connected to a stationary reference point 30. The reference point can be located above the user's head as illustrated in FIG. 1, at the base of the chair 12, or any other stationary location in the vicinity of the video display system 10.

Figure 2:
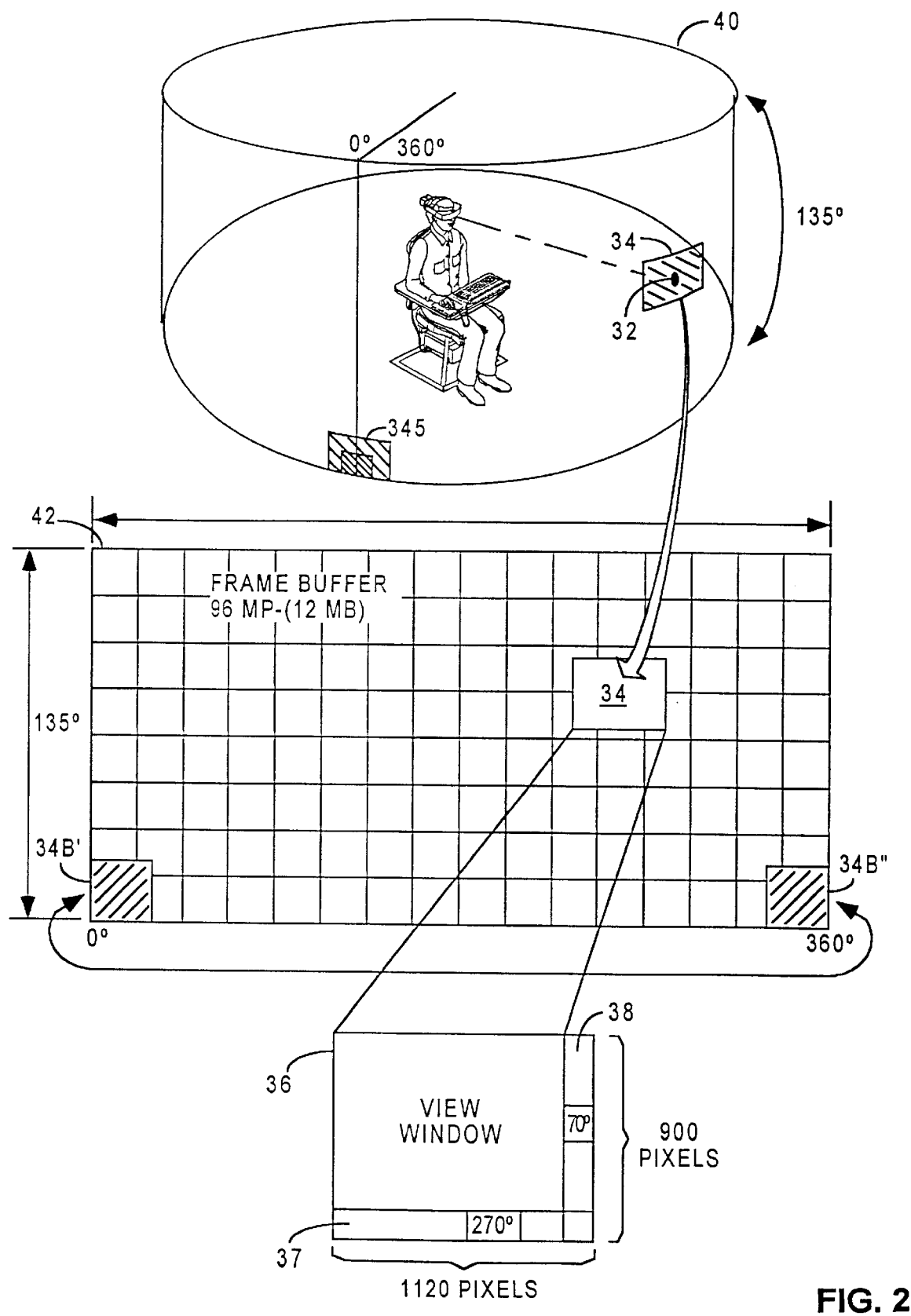
FIG. 2 illustrates the relationship between a frame buffer, a view port, a view window and a virtual view space of the video display system of the present invention.

Referring to FIG. 2, the relationship between a frame buffer, a view port and a view window in a virtual view space in the video system 10 is illustrated. The virtual view space 40 is the total image area in the video display system 10. The virtual view space 40 is 360° and has a height of 135°. The virtual view space 40 is shaped like a "cylinder" which surrounds the user. In the preferred embodiment, the total size of the virtual view space 40 is equivalent to a wall size display having the dimensions of approximately eight (8) feet by three (3) feet.

The virtual view space 40 includes ninety-six (96) million discrete points, each identified by a particular yaw and pitch location. In the horizontal direction, there are sixteen thousand (16K) discrete yaw locations. In the vertical direction, there are six thousand (6K) discrete locations.

The frame buffer 42, contained in the memory of computer 14, includes twelve (12) megabytes (MBs) of dynamic random access memory (DRAM) and has a storage capacity of ninety-six million memory locations. Each memory location stores pixel information. The memory locations in the frame buffer 42 are organized into words. Each word is thirty-two (32) bits long.

The virtual view space 40 is "mapped" into the frame buffer 42. For each (yaw, pitch) location in the virtual view space 40, an addressable memory location is provided in the frame buffer 42. The memory locations store the pixel information for the corresponding (yaw, pitch) location in the virtual view space 40 respectively.

The left-most edge of the frame buffer 42 corresponds to the 0° location in the virtual view space 40. The right-most edge of the frame buffer 42 corresponds to the 360° location in the virtual view space 40. The bottom edge of the frame buffer 42 corresponds to the 0° location of the virtual view space 40 and the top edge of the frame buffer corresponds to the 135° location of the virtual view space 40 in the vertical direction.

During operation, the user may navigate the virtual view space 40 by rotating his or her head from side to side, tilting his or her head up or down, or swiveling in chair 12. The position sensor 24 permits the video display system 10 to emulate a video environment that has two degrees of freedom. The position sensor 24 generates rotation (yaw) information and vertical movement (pitch) information in response to the movement of the transmitter 26 on the head mounted display 22 with respect to the receiver 28 at the reference point 30. It should be noted that in the preferred embodiment, only yaw and pitch movement is measured. It is within the scope of the present invention to measure other motions, such as scaling (forward/backward), roll, lateral, side-to-side, and up/down.

When the user looks at a discrete point in the virtual view space 40 with the head mounted display 22, the computer 14 calculates a view point 32 in the virtual view space 40 from the yaw and pitch information from the position sensor 24. The computer 14 then defines a view port 34 around the view point 32 in the virtual view space 40. The view point 32 is located in the center of the view port 34, equidistant from the vertical and horizontal boundaries of the view port 34. The view port 34 has the dimensions of (25°×20°) within the virtual view space 40.

To generate an image of the view port 34 in the virtual view space 40, computer 14 retrieves the pixel information from the frame buffer 42 that corresponds to the view port 34. The pixel information is stored in (1120×900) memory locations. The pixel information is subsequently transferred to the head mounted display 22. The pixel information displayed in the head mounted display 22 is referred to as view window 36. The view window 36 includes (1120×900) pixels and has the dimensions of (25°×20°) within the virtual view space 40.

The view window 36 may include a horizontal scroll bar 37 which designates the yaw position and a vertical scroll bar 38 which designates the pitch position of the view window 36. In the example illustrated in FIG. 2, the display window 36 is located at a position of approximately 270° yaw and 70° pitch in the virtual view space 40. The scroll bars help the user keep track of the current location in the virtual view space 40 and they help to locate regions in the virtual view space 40 not currently displayed in the view window 36.

The virtual view space also includes a wrap around feature. For example, if a view port 34B overlaps the (0°/360°) intersection of the virtual view space 40, memory locations from both the left side 34B' and right side 34B" of the frame buffer 42 are accessed. The pixel information contained in regions 34B' and 34B" is used to define the view port 34B, and are subsequently displayed in the head mounted display 22. The virtual view space 40 thus appears "seamless" to the user.

In summary, the virtual video system 10 of the present invention provides an image pipeline. For each yaw and pitch sample, the computer 14 determines the view point 32, and the view port 34. The pixel information contained in the view port 34 is retrieved and displayed on the head mounted display 22 as a view window 36 of the virtual view space 40.

As the user moves his or her head through the virtual view space 40, the frame buffer 42 is immediately traversed. As a result, the view window 36 in the head mounted display 22 is continuously updated. The image appears to be fluid and natural. The problems related to lag in prior art virtual reality systems are thus effectively eliminated.

II. The Video Display System

Figure 3:
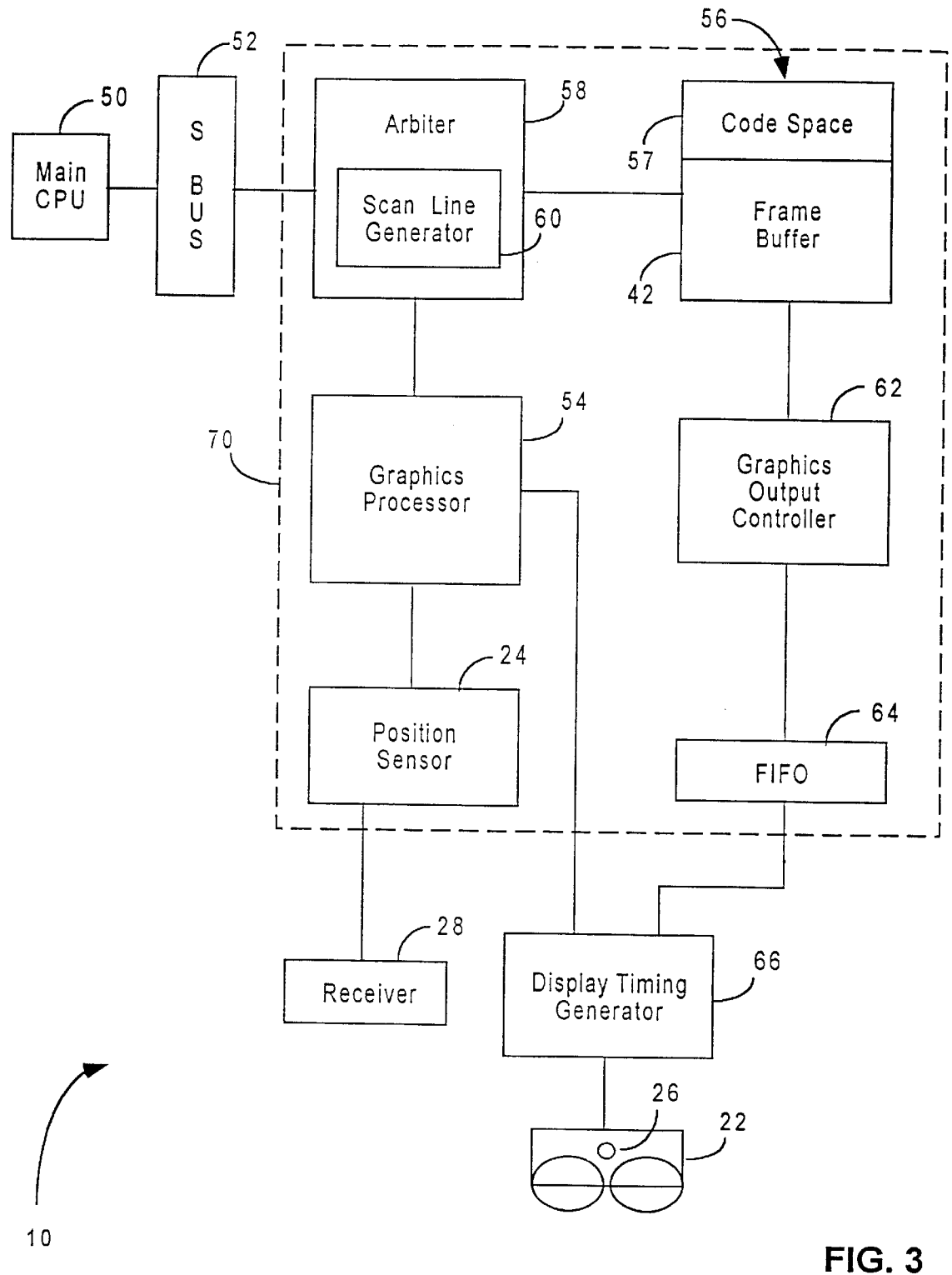
FIG. 3 illustrates a block diagram of the video display system of the present invention.

Referring to FIG. 3, a block diagram of the video display system 10 is shown. The video display system 10 includes a main CPU 50, a system bus (SBus) 52, a graphics processor 54, a memory 56 including the frame buffer 42 and code space 57, an arbiter 58, a scan line generator 60, graphics output controller 62, first-in-first-out (FIFO) buffer 64, display timing generator 66, the position sensor 24 and the head mounted display 22.

The graphics processor 54, memory 56, arbiter 58, scan line generator 60, graphics output controller 62, FIFO 64 are all provided on a single buffer display card 70. The display timing generator 66 is an electronic card marketed by Reflection Technology along with the head mounted display 22. A ribbon cable (not shown) is used to couple the display buffer card 70 and the display timing generator card 66. The two cards are inserted in the housing of computer 14. The position sensor 24 is wired to the buffer display card 70 through the RS-232 port (not shown) of the computer 14.

III. The Computer System and Main CPU

The computer 14 can be any general purpose computer platform, such as a SPARCstation 2 or a SPARCstation 10 marketed by Sun Microsystems, Inc., of Mountain View, Calif., assignee of the present invention. These computers run a multi-tasking operating system called Sun OS and use a window manager system called Open Windows.

The primary responsibility of the main CPU 50 with respect to the video display system 10 is to fill the frame buffer 42 with information to be displayed in the virtual view space 40. This information is placed on the SBus 52 by the main CPU 50, and, under the discretion of the arbiter 58, is subsequently stored in the frame buffer 42. The manner in which the main CPU places information on the SBus 52 is well known, and therefore is not described in detail.

The main CPU 50 uses a modified version of Open Windows. The modified version of Open Windows retains the ability to move windows, resize windows, open and close windows, pull down menus, user interface, etc., within the virtual view space 40. Since the virtual view space 40 is several orders of magnitude larger than a traditional monitor screen, problems related to allocating screen space and preventing programs from interfering with one another are virtually eliminated. The modified Open Windows, however, retains these features in the event they are needed.

Modifications to Open Windows were made to take advantage of and to extend the user interface capabilities of the virtual view system 10 environment. These modifications predominantly include changes to the window manager of Open Windows. For example, when the user opens a new window, the window manager ensures that the window is displayed in the current view window 36. Similarly, the window manager is modified so that dialog boxes appear in the current view window 36. When the user invokes a full screen or a full height function of an image, the window manager has been modified so that the image is resized to match that of the view window 36, and not the size of the frame buffer. The window manager is also modified to account for the fact that the cursor is primarily controlled by the position sensor 24. The window manager insures that the cursor always appears in the current view window 36. The mouse 20 only secondarily controls the cursor by determining its position within the current view window 36. Many of these modifications are desirable because the frame buffer 42 is much larger than the view window 36, which differs from than prior art video systems where the frame buffer and the display are the same size.

In an office environment, for example, the user may be running a word processing program, a calendar management program, and a computer automated drawing (CAD) drawing program on the main CPU 50. The information generated by these three programs can be displayed, at the user's discretion, anywhere in the eight by three foot (8'×3') virtual view space 40. For example, when the user opens a window at a particular area in the virtual view space 40, the main CPU 50 is responsible for allocating the corresponding memory locations in the frame buffer 42. The proper image is presented in the head mounted display 22 when the user looks at a particular location in the virtual view space 40.

IV. Video Display Hardware

The graphics processor 54 can be any general purpose processor. In one embodiment of the present invention, a Fujitsu 40 Mhz SPARClite™ microprocessor is used. The graphics processor 54 is responsible for determining the view points 32 and view ports 34 in response to the yaw and pitch samples respectively from the position sensor 24. The graphics processor 54 may also use prediction algorithms to predict the movement of the head mounted display 22. These algorithms include a smoothing function which reduces the effects of instability in the movement of the user's head. A "stick" function determines how the video display system 10 is to respond when the user begins to move his or her head. Since a user will not keep his or her head perfectly still while looking at a view window 36, the stick function will freeze the view window. When a movement threshold is exceeded, the graphics processor 54 "unsticks" the image in the view window 36 and the image can be updated. Such algorithms are well known and are often referred to as "hysterysis" algorithms. The graphics processor 54 is also responsible for calculating and displaying the scroll bars 37 and 38 in the view window 36.

The memory 56 includes sixteen megabytes (16 MB) of DRAM. Four megabytes (4 MBs) are dedicated for code space 57 for the graphics processor 54. The code for the standard graphics algorithms is stored in this memory space. The remainder of the memory 56 is used for the frame buffer 42, as described above. In one embodiment, the memory includes thirty-two 4 MBit DRAM chips.

The arbiter 58 is an application specific integrated circuit (ASIC) chip designed for the video display system 10. The scan line generator 60, the graphics processor 54, and the main CPU 50 all compete for access to the frame buffer 42. The arbiter 58 controls access to the frame buffer 42 according to a basic priority protocol. The scan line generator 60, the graphics processor 54, and the main CPU 50 have first, second and third priority rights to the frame buffer 42 respectively. A state machine is used to select one of the three inputs in accordance with the above-defined protocol. The arbiter 58 is also responsible for generating the row address signals (RAS) and column address signals (CAS) for accessing the frame buffer 42, for refreshing the DRAM memory of the frame buffer 42, and other memory related functions. Since bus arbitration and these other memory related functions are well known in the art, a detail description is not provided herein.

The scan line generator 60 is a part of the arbiter 58. A scan line is defined as thirty-six consecutive words (1152 bits) in the frame buffer 42. The scan line generator 60, under the direction of the graphics processor 54, is responsible for addressing the words in the frame buffer 42 which define a scan line. Nine hundred (900) scan lines are used to generate a single view window 36.

The graphics output controller 62 is a shift register capable of holding one scan line and is responsible for truncating the scan line to (1120) bits. The truncation eliminates the bits of the scan line that fall outside the boundaries of the view port 34. The truncated scan line is then segmented into bytes (8 bits). The bytes are stored in the FIFO 64.

The display timing generator 66 performs two functions. First, it provides the bytes stored in the FIFO 64 to the head mounted display 22 for display. Second, it generates a new window interrupt and scan line interrupt. These two interrupts are used to control the timing of the graphics processor 54.

The head mounted display 22 provides a (1120×900) monochrome pixel image, corresponding to the 1120×900 pixels of the view window 36 respectively. The view window 36 as seen in the mounted display 22 extends (250× 200). The head mounted display 22 provides a very clear, crisp image having a resolution that exceeds a conventional computer monitor. A display device, such as the Private Eye™, designed by Reflection Technology, Inc. of Waltham, Mass., is a suitable choice for the head mount display 22. Although the pixel density of the Private Eye is not quite as high as that mentioned above, the device could be readily modified to provide the preferred pixel density as mentioned above.

In a preferred embodiment, a "6D Tracking System" by Logitech, Fremont, Calif., is used for the position Sensor 24. This device was selected because it is commercially available, is relatively inexpensive, accurate and provides an adequate yaw and pitch sampling rate.

V. Operation

Figure 4:
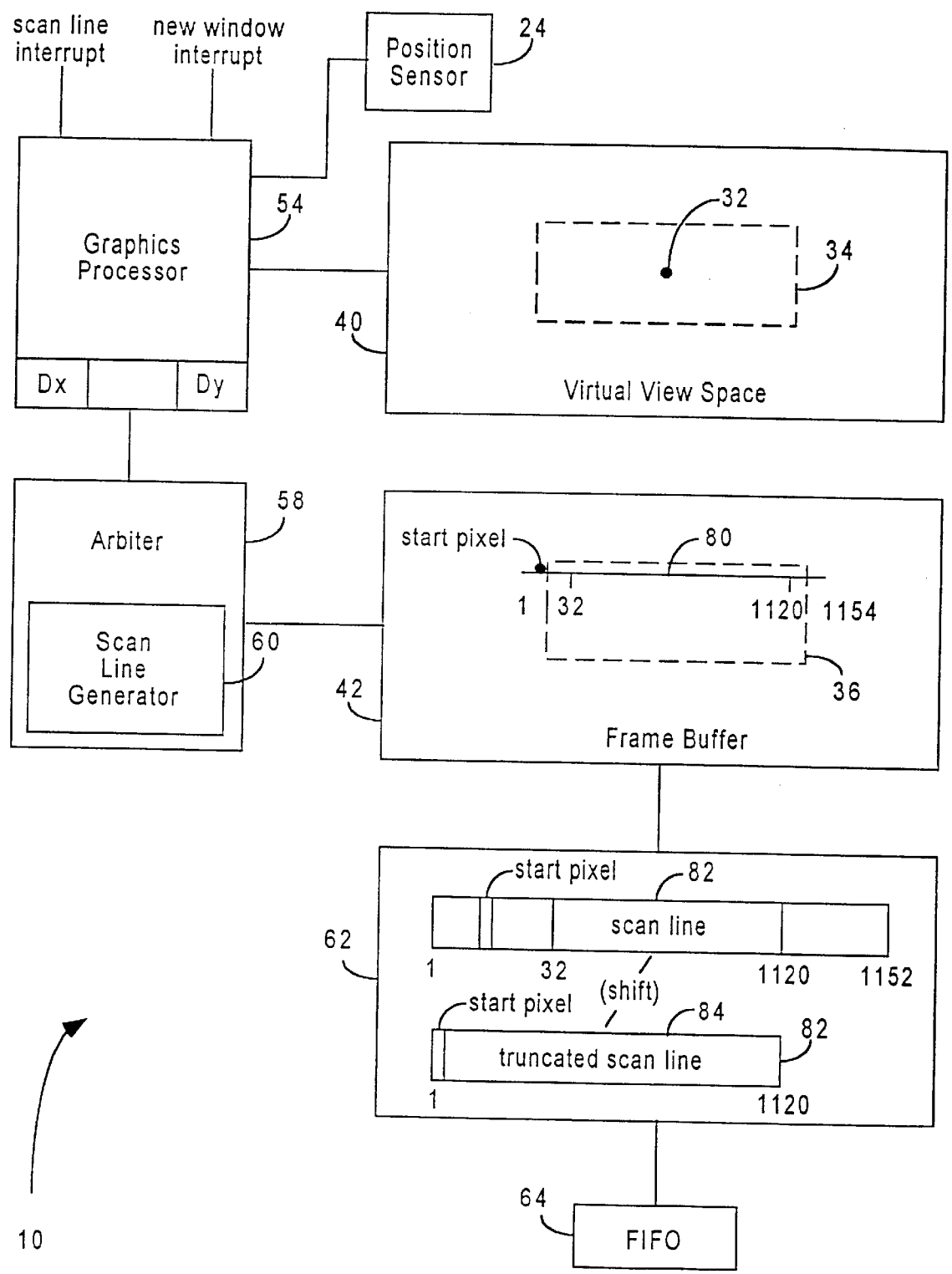
FIG. 4 illustrates the video display system generating a view window according to the present invention.

FIG. 4 illustrates the video display system 10 generating a view window 36 according to the present invention. When the graphics processor 54 receives a new window interrupt from the display timing generator 66, the processor first determines the location of the view point 32 based on the most recent yaw and pitch sample. Next, the graphics processor 54 determines the view port 34 around the view point 32. The view point 32 and the view port 34 are shown superimposed on the virtual view space 40. (Note the size of the view port 34 in reference to the virtual view space 40 is not to scale.) The display timing generator 66 then generates a scan line interrupt. In response to this interrupt, the graphic processor 54 determines a "start pixel" location for the first scan line 80. The physical memory address for the start pixel location is stored in Dx and Dy registers of the graphics processor 54 respectively.

The scan line generator 60 reads the start pixel address information from the Dx and Dy registers of the graphics processor 54 and determines the physical address of the word that contains the start pixel in the frame buffer 42. The scan line generator 60 then accesses thirty-six consecutive words, in nine bursts of four words, starting with the word that contains the start pixel. The thirty-six words define the scan line 80 which is 1152 bits long. For the scan line 80 illustrated in the figure, the first word is designated by bits (1–32) and the last word is designated by bits (1120–1152).

Note that the left side of the view window 36, which is superimposed on the frame buffer 42, coincides with the start pixel location. The right side view window 36 passes through the last word of the scan line 80.

In situations where the wrap around feature is invoked, the scan line generator 60, under the direction of the graphics processor 54 will again access thirty-six words. However, a first subset of the thirty-six words are accessed from the right side of the frame buffer 42 and the remaining words are accessed from the left side of the frame buffer 42.

The graphics output controller 62 receives the scan line 80 from the frame buffer 42 and places its bits into a shift register system 82. This system functions as if it were a 1152 bit wide shift register, which shifts the 1152 bits so that the start pixel is in the left-most position in the register (i.e., position 1). Accordingly, the bits in the first 1120 locations of the register 82 are used to define a truncated scan line 84. Any bits remaining in locations 1021 through 1052 are discarded. The truncated scan line is then divided into 8 bit bytes and stored in FIFO 64.

In the preferred embodiment, the size of the actual shift register is (36) bits wide. For each of the thirty-six words that make up a scan line 80, the graphics processor 54 controls the shift amount by calculating the two's complement of the lower five bits of the start pixel address. This calculation determines the offset of the start pixel within the scan line 80 and shifts the word in the register accordingly. This shift sequence is repeated for the thirty-six words that make up the scan line 80.

The truncated scan lines 84 are stored in byte segments in the FIFO 64 and are sequentially provided to the head mounted display 22 through the display timing generator 66. The head mounted display 22 displays the nine hundred scan lines, from top to bottom, for each view window 36. In this manner, the view window 36 is generated and displayed in a "raster" like fashion in the head mounted display 22.

In a preferred embodiment, the actual lag time of the video display system 10 is approximately 0.033 seconds, which is imperceptible to the human eye. To achieve this lag time, the yaw and pitch information is sampled 30 times a second. The new window interrupt occurs 50 times a second, and the scan line interrupt occurs 45,000 times a second.

VI. Video Pipeline

Figure 5:
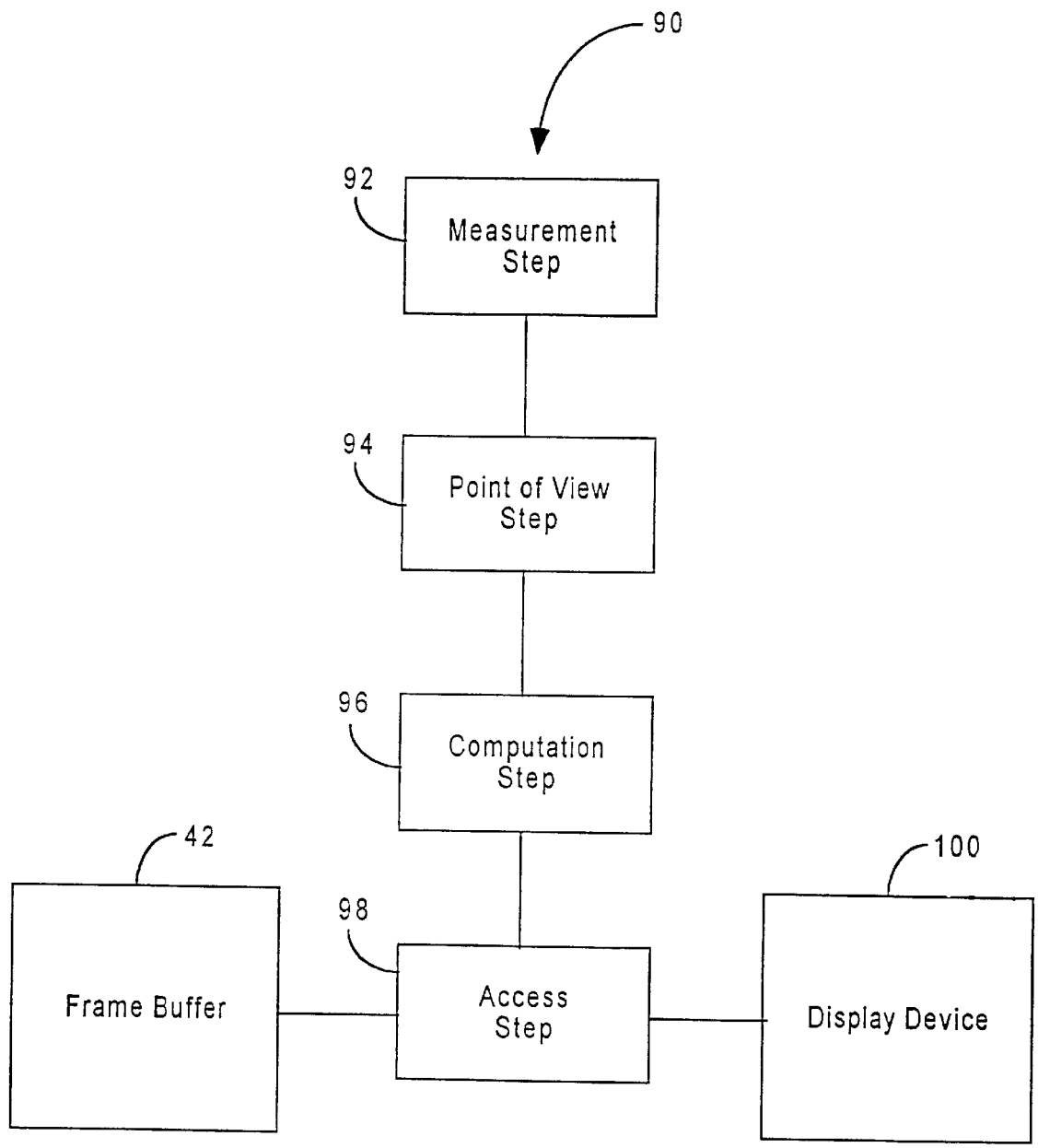
FIG. 5 illustrates a video display system pipeline according to the present invention.

Referring to FIG. 5, a video pipeline according to the present invention is shown. The video pipeline 90 illustrates the functional steps by which the present invention generates a model to be displayed. This figure and the discussion below highlights the advantages and distinctions of the video display system 10 over prior art virtual reality systems.

The video display pipeline includes a measuring step 92 for measuring the user's movement, a step 94 for defining the view point of the model to be displayed based on input from the measuring step 92, a computation step 96 for modifying the point of view based on a predefined algorithm, and an access step 98 for accessing the appropriate data from the frame buffer 42, and providing the data to a display device 100.

The frame buffer 42 stores all of the possible views of the model to be displayed. The data, relationships and objects that are relevant to all possible view points of the model are stored in the converted state (i.e., ready for display) in the frame buffer. This approach significantly differs from the prior art virtual reality systems. The need to store pre-transformed display information in a database, traversing the database, extracting the appropriate data to generate the model from the selected point of view, and transforming it on the fly to the proper display format are all eliminated. As a result, the video display system of the present invention provides superior performance in displaying those view points stored in the frame buffer 42.

VII. Quantized Path Independent and Hyper View Spaces

Figure 6:
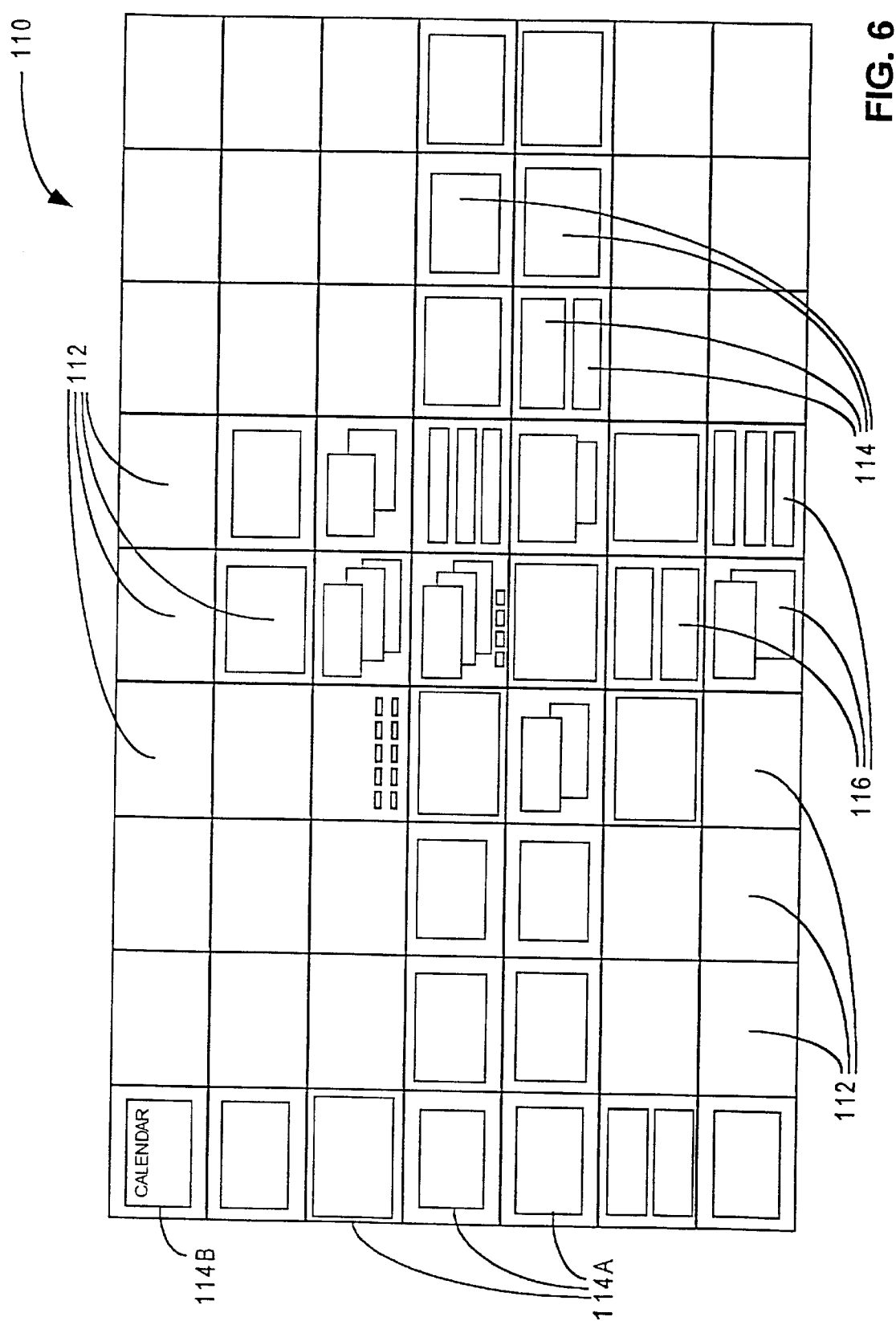
FIG. 6 illustrates a quantized path-independent view space divided into a plurality of discrete view windows according to the present invention.

Referring to FIG. 6, a virtual view space 110 is shown which is divided, or quantized, into an array of screen, or view port, sized portions 112. This quantized space is similar to that shown in FIG. 2, except that it is shown flat, rather than in a cylinder, as in FIG. 2. This space can be created and viewed with the system described above by altering the computation step 96 shown in FIG. 5 to compute the current view port 34 to be the current screen sized portion 112 of the view space 110 in which the measurement step 92 determines the view point 32 to be located in at any given time.

Such a quantized view space has several advantages. First, it insures that the user always sees windows 114 at the same position relative to the view port, or screen, in which they are viewed. Thus, windows, such as the windows 114A in FIG. 6, which occupy almost an entire screen will always be seen fitting within their respective view port. It also means that arrangements of multiple windows designed to fit within one screen, such as the arrangements 116 shown in FIG. 6, will always be seen together within one screen. Second, it means the user can much more rapidly search the view space, because when he or she rapidly traverses the space he or she will see a succession of separate screens in which the windows are stationary and placed as intended within the boundaries of the screen, rather than a blur of moving windows which are not properly aligned relative to the view port most of the time. Third, quantized view spaces allow the user a greater degree of freedom to move his or her head without causing the view port to move away from a desired view of a given window, because any head movement within the zone of motion associated with a given screen causes no screen movement.

Figure 7:
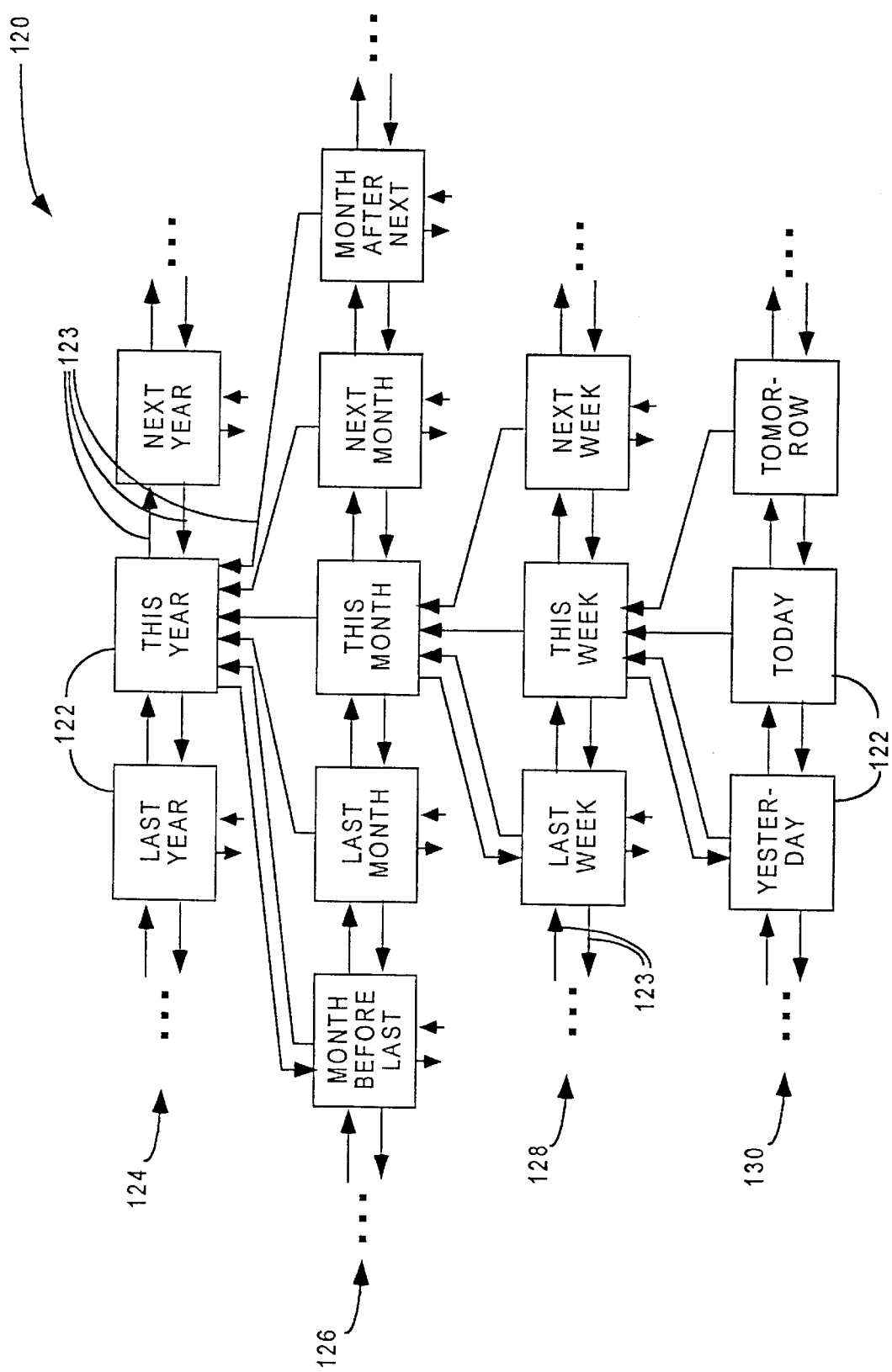
FIG. 7 illustrates a quantized hyper view space comprising a navigable generalized network of view windows according to the present invention.

The view spaces shown in FIGS. 2 and 6 are path-independent two dimensional spaces. FIG. 7 shows a "hyper" view space 120, one which is path dependent. It contains a succession of screens, or view port, sized portions 122 that are linked via connections 123 to form a generalized network. Each screen-sized portion 122 can have one or more such connections 123 to another window, with each such connection leading from a given window being associated with a different one of four directions of head movement: up, down, right, or left. The screen the user sees is dependent upon the path he or she has taken to get to his or her current screen position, rather than being dependent just upon current head position or total pitch and yaw movement.

For example, the portion of the space illustrated in FIG. 7 shows yearly, monthly, weekly, and daily views of a calendar program in respectively lower rows 124, 126, 128, and 130. In this figure, the connections 123 are represented with arrows and the arrowheads indicate the direction of those connections. Arrows that are unconnected at one end connect at that end to screens which are not shown in the drawing. In the vertical direction many screens have connections to other screens which do not have connections back to them..

Horizontal movement in the year row moves to a view of the next or last year. In the month row, it moves to the next or last month; in the week row, to the next or last week; and, in the day row, to the next or last day. Moving upward changes from a day, to the week including that day, to the month containing that week, and finally to the year containing that month. Moving down changes from a year, to the first month of that year, to the first week of that month, and finally to the first day of that week. Moving up and then right will not have the same result as moving right and then up. If one starts on the screen for the first week of November and moves up and then right, he or she will move to the screen for November and then to that for December. If one starts on the same screen and move right and then up, he or she will move to the screen for the second week of November and then to the screen for November.

Such hyper view spaces allow users to more rapidly navigate through a larger number of screens because they allow screens to be more densely interconnected than a continuous path-independent two dimensional space. But such hyper spaces have the disadvantage of making it easy for the user to get lost. To alleviate this problem, some embodiments of the system have two modes, a 2-D mode in which the user operates in a path-independent two dimensional view space, like that shown in FIG. 6, and a network mode in which the user can navigate in a more complexly interconnected path-dependent manner.

In such a mixed space, certain screens 114B perform a dual function. They form part of both the path-independent and path-dependent parts of the mixed space and operate as connections between those parts. For example, assume the space shown in FIG. 6 were changed to be such a mixed space with such a dual function screen 114B in the upper left corner representing a screen of the calendar space shown in FIG. 7. In that case, if the user navigated in the path-independent space in 2-D mode to reach such a dual-function screen and then switched to network mode, he or she could then navigate the path-dependent space shown in FIG. 7. If he or she then switched back to 2-D mode, he or she would be popped back to window 114B of the 2-D path-independent space.

Figure 8:
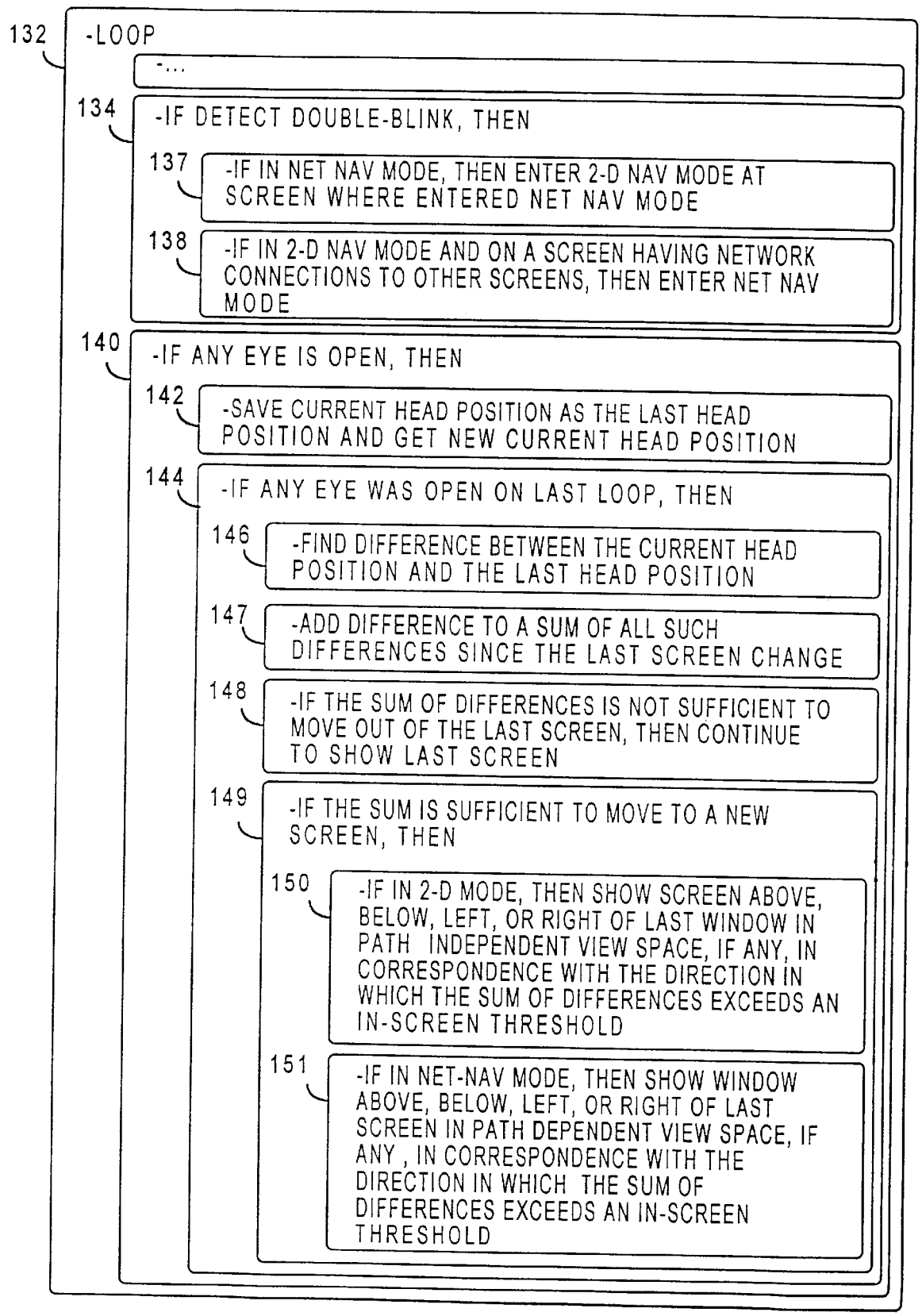
FIG. 8 illustrates a simplified flow chart of a program for navigating a view space having a combination of the path-independent and path-dependent features shown in FIGS. 7 and 8, respectively.

FIG. 8 is a high level flow chart of a program loop 132 for enabling a user to navigate a mixed type view space in either a 2-D mode or a network mode.

Steps 134, 137 and 138 of the loop 132 toggle between the 2-D and network navigation modes in response to a user input. In the embodiment of the invention shown in FIG. 8, this input is the detection of the user blinking twice in rapid succession. Such a double-blink can be detected by photo detectors, such as the detectors 135 shown in FIG. 9, which sense when reflection of light off each of the user's eyes 137 is interrupted. If such a double-blink is detected, then either step 137 or 138 is performed. If the system is currently in the network navigation mode, step 137 switches to the 2-D navigation mode. If the system is currently in the 2-D navigation mode, and if the current screen is a dual-function screen 114B, step 138 switches to the network navigation mode.

Whether or not the user double-blinks, each pass though loop 132 advances to step 140, which tests to see if the user has any eye open during the current pass through loop 132. If not, step 140 causes the rest of the steps shown in FIG. 8 to be skipped, causing any head movement while both of the user's eyes are closed to be ignored.

This destroys the advantage of a one-to-one correspondence between direction of head orientation and screen display enabled by the embodiment of the invention described above with regard to FIGS. 1–6, an advantage that is particularly valuable in many virtual reality applications. But such a one-to-one correspondence is impossible with path-dependent hyper spaces anyway. In addition, allowing head motion to be disregarded when both eyes are closed has the same advantage as allowing the motion of a computer mouse to be disregarded when the mouse is lifted. That is, it allows the user to perform extended navigation in any direction without actually having to move a net corresponding distance in that direction. Instead the user can intersperse motion in the direction counted for navigation with motion in the opposite direction which is not counted. This means the user does not need to turn his or her head all the way around or upside down to perform extended screen navigation. It does away with the need for a swiveling chair 12, and it greatly increases the size of a view space which can be comfortably navigated by head motion.

If step 140 finds the user's eyes are open during the current pass through the loop, then head position is to be used for screen navigation and the remaining steps shown in FIG. 8 are performed. If so, step 142 gets the current yaw and pitch of the user's head, saves it as the Current Head Position, and saves the previous Current Head Position as the Last Head Position.

Next step 144 tests to see if the user's eye was open on the last pass through loop 132. It does this by checking a variable (not shown) containing this information which is saved from the last pass through the loop. If the user's eye was closed on the last pass, steps 146–151 are skipped because Last Head Position records the head position before the user closed his or her eyes, and, thus, the difference in head position since then should be disregarded.

If step 144 finds the user's eyes were open on the last loop, step 146 finds the signed yaw and pitch differences between the Current Head Position and the Last Head Position. Step 147 adds those signed differences to respective yaw and pitch sums for all such differences since the last time the screen showed to the user has changed. Then step 148 tests to see if the sum of either the yaw or pitch differences is above a respective in-screen threshold for yaw or pitch. If not, it causes the user to continue to see the same screen.

If, however, either the sum of yaw or pitch changes is above the respective yaw or pitch in-screen threshold, the condition of step 149 is met, causing either step 150 or 151 to show a new screen. If the system is currently in 2-D navigation mode, step 150 moves the view port to the screen in the 2-D view space which is above or below the current screen if the above-threshold sum of pitch changes is positive or negative, respectively. It changes to a screen which is right or left of the current screen if the above-threshold sum of yaw changes is positive or negative, respectively. If the system is currently in the network navigation mode, step 151 changes the view port to the screen in the hyper view space which is connected to the current screen by a connection having a direction corresponding to the direction in which the sum of changes exceeds an in-screen pitch or yaw threshold.

VIII. Head Mounted Displays for Mobile Interactive Computing

The head mounted display 22 shown in FIG. 1 substantially blocks the user's view of the physical world around him. This can be desirable when the user is interacting almost exclusively with the artificial reality his or her computer is creating. But it can be detrimental when the user wants to alternate between interacting with the computer and the surrounding physical world, or to interact with both at once, for example, while walking and talking with other people. Also the apparatus shown in FIG. 1 requires that the user stay near the receiver 28 to have his or her head position accurately read. This limits the user's ability to use the invention while moving about his or her office, a building, or the world at large.

Figure 9:
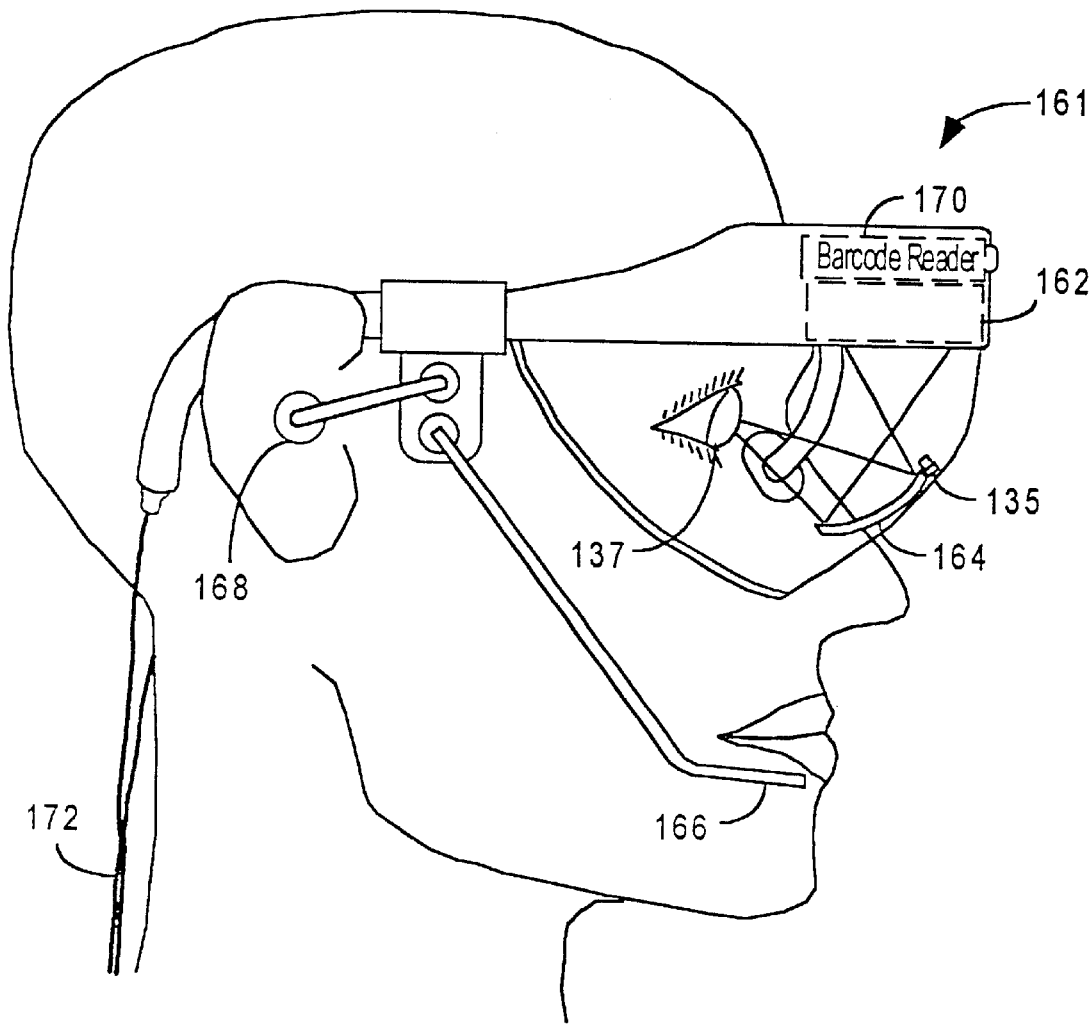
FIG. 9 illustrates a head mounted sensing and communicating unit, including a visual display, used in certain embodiments of the present invention.

FIG. 9 illustrates a head mounted sensing and communicating unit 161 which enables the user to instantly alternate between viewing its computer display and the external world, and which allows the user to navigate a view space without needing to stay near the receiver 28. As will be described below it also includes features that enable the user to enter data and select screen objects without the need to use a mouse or keyboard, providing him or her with great freedom of motion while interacting with the visual display.

The visual display part of the head mounted unit 161 is similar to that currently sold under the name Virtual Vision Sport by Virtual Vision, Inc. of Redmond, Wash. It is similar to the Virtual Vision Sport in that it includes a small back-lit liquid crystal display, or LCD, 162, and a lens-mirror 164 which projects a view of that display into the lower portion of a user's field of vision. In preferred embodiments the display 162 has a resolution higher than that of the Virtual Vision Sport, one high enough to be suitable for running a graphical user interface such as that provided by Sun Microsystems' Open Windows, described above.

The head mounted unit 161 also includes a photo detector 135 for each eye. Each such detector determines when its associated eye is opened or closed by detecting the amount of light reflected off the ball of that eye. The unit 161 also includes a microphone assembly 166 similar to that currently found on many telephone head sets to enable the user to enter speech information, and one or more ear phones 168 to enable the user to hear audio output.

The head mounted unit also includes a bar code reader 170 of a type currently available from Symbol Technologies of Bohemia, N.Y. This bar code reader is capable of scanning a laser beam in a rectangular raster pattern of scan lines, and of reading bar code patterns which fall within that rectangular scan pattern at a distance of twenty feet or more. It does so by detecting how the intensity of light reflected from the laser beam varies in correspondence with the progression of that beam along the scan pattern. This bar code reader is for use in location quantized view spaces in which the user navigates by motion relative to locations external to the visual display. Such view spaces are described below with regard to FIG. 12 and many of the figures that follow it. For applications like those described above with regard to FIGS. 1–8 such a bar code reader is not necessary.

The head mounted unit 161 also includes other electronic component necessary to interface to or drive the display 162, the photo detectors 135, the microphone 166, the speaker 168, and the bar code reader 170, as will be understood by those skilled in the art of electronic design. It also includes wires 172 which communicate signals from the head mounted unit to a computer. Preferably this computer is small enough to be worn by the user, such as in a back pack, so the user is free to walk around while using the computer. Such a computer can be constructed from a SPARCstation computer, of the type described above, with the standard AC power supply replaced with a battery power supply. A computer with enough power to run Sun OS and the Open Windows graphical user interface could be built to fit within a user's pocket using today's technology. Within the coming decade such computers are expected to be small enough to fit within a head mounted unit such as that shown in FIG. 9.

The visual display in the head mounted unit shown in FIG. 9 is not a see-through display, since the mirror 164 through which the user sees the visual display is not transparent. In addition its display is located in the lower part of the users field of vision, at a location which some might find uncomfortable to look at for extended periods of time.

Figure 10:
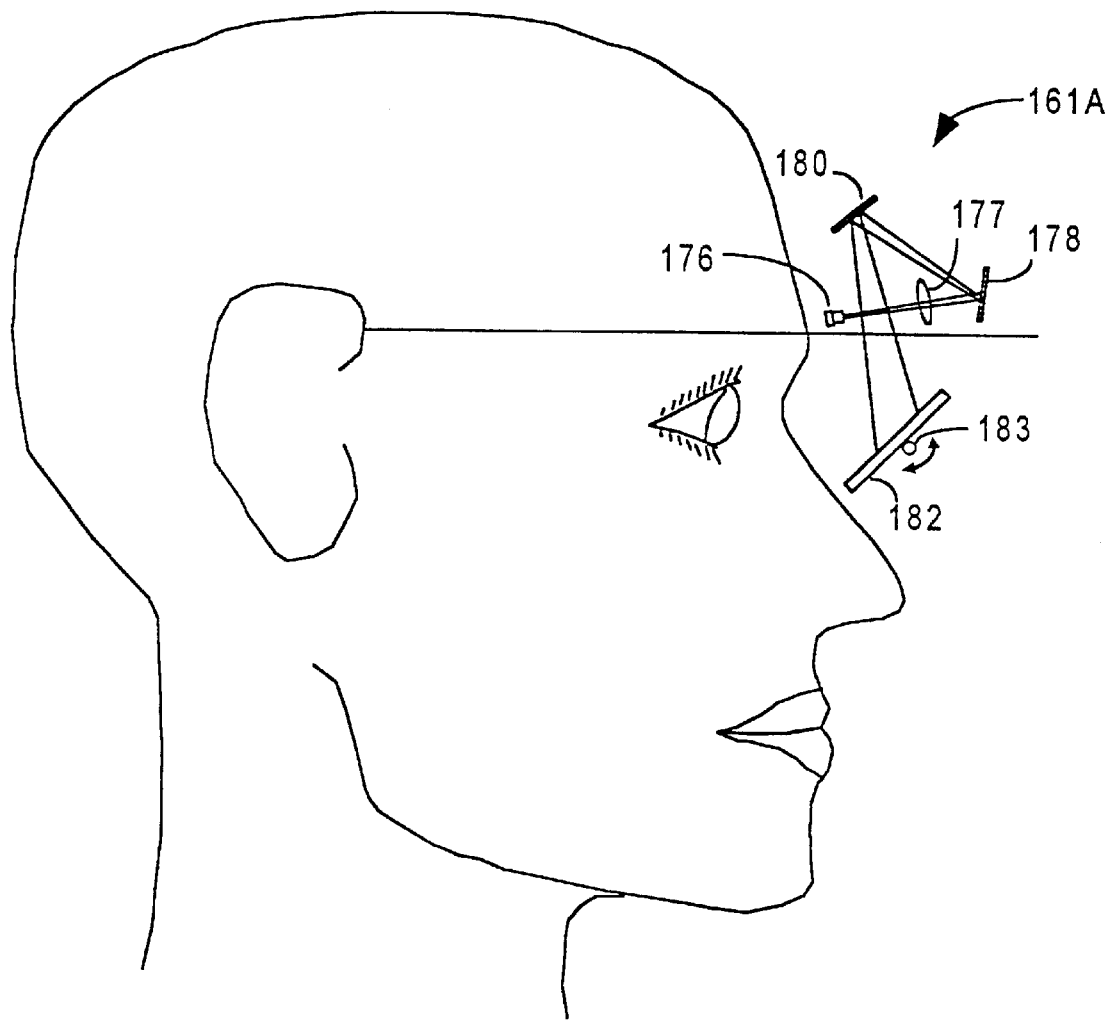
FIG. 10 illustrates another embodiment of a head mounted visual display which can be used in certain embodiments of the present invention.

FIG. 10 provides a schematic illustration of an alternate embodiment 161A of a head mounted unit which is similar to that shown in FIG. 9, except it includes a true see-through visual display. In this embodiment a linear array of light emitting diodes 176 form the individual pixels of each video scan line. Its light pass through a lens 177, then bounces off mirrors 178 and 180 onto a rapidly vibrating, partially transparent mirror or dichroic lens 182, from which it is then reflected into the users field of vision. The mirror 182 vibrates about an axis 183 in synchronism with the vertical scan period of the video image, spacing the reflection of each horizontal scan line in the user's field of vision, so as to form a complete screen image. This is similar to the Reflection Technology display 22 described above with regard to FIG. 1, except that the mirror 182, and any material on the opposite side of it from the user, are made of largely transparent material. Preferably a separate visual display apparatus is provided for each eye, and the bar code reader 170 shown in FIG. 9 is placed between them.

Further information on miniature displays from Reflection Technology, Inc. is provided in U.S. Pat. No. 4,902,083, entitled "Low Vibration Resonant Scanning Unit For Miniature Optical Display Apparatus" issued to Benjamin Wells on Feb. 20, th 1990; U.S. Pat. No. 4,934,773, entitled "Miniature Video Display System" issued to Allen Becker on Jun. 19, 1990; U.S. Pat. No. 5,003,300 entitled "Head Mounted Display For Miniature Video Display system" issued to Benjamin Wells on Mar. 26, 1991; U.S. Pat. No. 5,009,473, entitled "Low Vibration Resonant Scanning Unit For Miniature Optical Display Apparatus" issued to Gregory Hunter et al. on Apr. 23, 1991; and U.S. Pat. No. 5,023,905 entitled "Pocket Data Receiver With Full Page Visual Display" issued to Benjamin Wells et al. on Jun. 11, 1991, all of which are incorporated herein by reference.

A see-through display, such as the one shown in FIG. 10, has an advantage of enabling a user to watch video information in the center of his or her field of vision where it is easy to watch. It also makes it easier for the user to monitor both a computer image and information from the surrounding world at the same time, since only a change in focus is required to switch between the two. Such a see-through display has the disadvantage, relative to the display of FIG. 9, of placing the image on a transparent surface where it can interfere with the user's perception of the world around him, or in which light from the surrounding world can interfere with such images.

IX. Selecting Application Links by Motion Relative to External Locations

Figure 11:
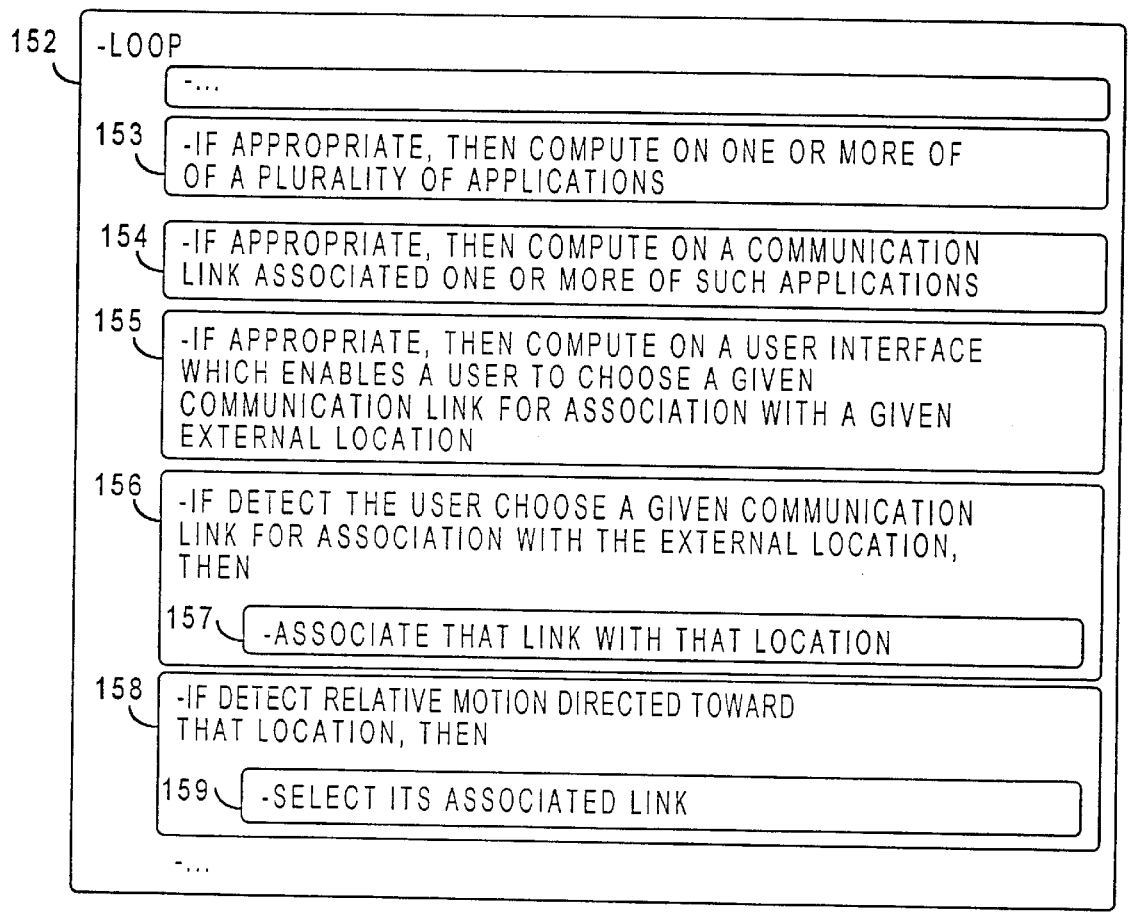
FIG. 11 illustrates a schematic high level flow chart of a program for allowing a user to more easily access communications links with various computer applications according to the present invention.

FIG. 11 is a simplified high level flow chart representing an aspect of the present invention. According to this aspect, operation of a computer is controlled by motion relative to locations external to that computer, such as by the user pointing at a selected object in his or her office or entering a given location in his or her building or town.

The program loop 152 shown in FIG. 11 repeatedly performs a sequence of steps 153–159. Step 153 performs computation on each of a plurality of applications which currently requires computation. An application requires computation, for example, if it has received user input requiring a response during the current pass through the loop 152, or if it has yet to complete a task started in a prior pass through that loop. In a personal computer such applications can include, among others, word processor, spread sheet, calendar, phone book, electronic mail, data base, and custom applications. In an audio computer, for example, such applications might include voice mail, dictation, and telephony.

Step 154 performs computation on a communication link associated with an application when user input or computation in steps 153 or 155 requires it. In computers with a graphical user interface the communication links are usually windows created when an application is opened. Such windows communicate from their application to a user by providing visual information or other output. They communicate from the user to their application in response to user mouse clicks, mouse drags, or typing on objects shown in the window. In character based computers the communication links can be screens or non-graphic windows. In audio computers the communication links can be connections to audio input and output.

Step 155 performs computation on a user interface when user input or the computation in steps 153 or 154 require it. The computation of the user interface includes, among other functions, receiving user input, selecting which communication links to direct such input to, and enabling the user to choose a selected communication link for association with a location which is external to the computing apparatus running the program of FIG. 11.

Step 156 responds when the user has been detected entering input selecting a given communication link for association with a given external location by causing step 157 to be performed. Step 157 makes the association by storing it in memory.

Step 158 detects when relative motion is directed toward the external location. Such relative motion includes any motion directed between the user or a sensor which is part of the computer and the external location. For example, it includes the user's pointing at the location; his or her moving toward, or into, the location; or the location's coming within a given distance of the user, or his or her computer, or within a direction in which he or she, or a given sensor, is pointing.

When step 158 detects such relative motion toward an external location associated with a given communication link, it causes step 159 to select that given communication link. Such selection can include causing the link to be placed on the display screen if it is a visual object, causing input or output to be directed through that communication link, performing a function associated with that link's application, or performing a function upon that link or its associated application.

The loop 152 also performs other functions necessary in the operation of its computer, as is indicated by the ellipsis in FIG. 11, before making the next pass through the steps described above.

X. Location Quantized View Space

Figure 12:
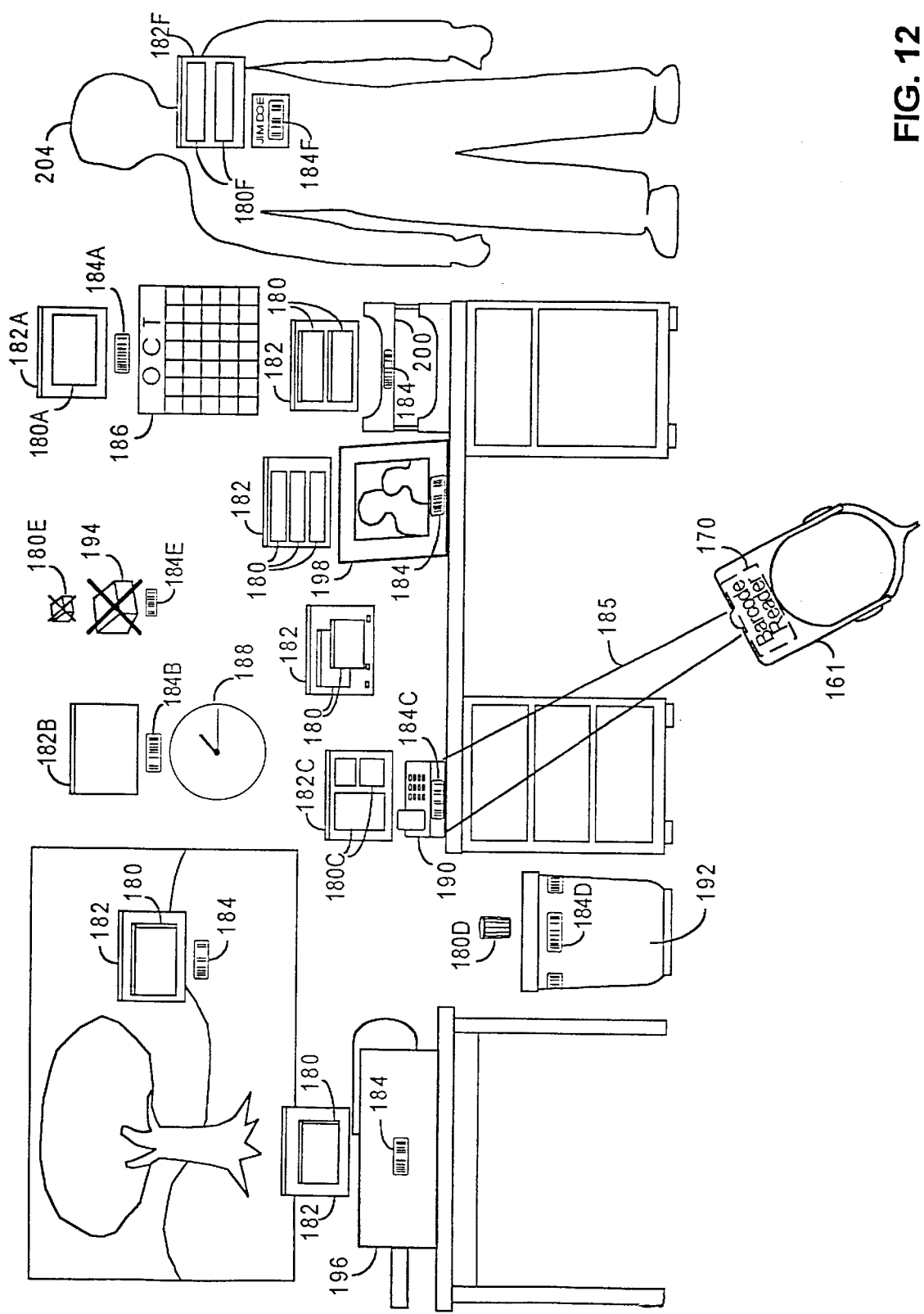
FIG. 12 illustrates how the program of FIG. 11 allows a plurality of windows to be associated with various locations in a person's office.

FIG. 12 illustrates the operation of a preferred embodiment of the aspect of the invention described above with regard to FIG. 11. In this embodiment the user wears a head mounted unit, like the unit 161A described with regard to FIGS. 9 and 10, which includes a head mounted display which allows the user to see the world around him or her and which includes a bar code reader 170. In this embodiment, the communication links are windows 180 in a graphical user interface. The view space of this user interface is divided into a plurality of separate parts 182, called desktops, each of which is associated with an external location, in this case the location of a bar code pattern 184. The user associates a window 180 with an external location by placing it in the desktop associated with that location. The system detects relative motion toward an external location with which a bar code pattern has been associated when the user points his or her head at it. When this happens the bar code pattern will fall within the radial zone 185 scanned by the bar code reader 170 which extends out from the front of the head mounted unit. This causes the bar code reader to read the pattern 184, and the system responds by displaying the desktop 182 associated with that pattern in the visual display of the user's head mounted unit. This display includes any windows 180 previously located in that desktop, and it gives input/output focus to the last window which had such focus in that desktop.

In the example shown in FIG. 12, the user has placed a bar code 184A near the calendar 186, and has associated a desktop 182A with that bar code which includes a month view window 180A from a calendar application. Similarly the user has placed a day view window 180B from the same application in the desktop 182B associated with the bar code pattern 184B located near the wall clock 188. The user has placed a window 180C from a phone book application in the desktop 182C associated with the bar code pattern 184C on the phone 190.

It can be see that, in this example, the user has attempted to place bar code patterns near physical objects which bring to mind the particular windows found in the desktops associated with those objects. Thus, a print manager window is found in the desktop associated with the printer 196, windows relating to the user's personal life in a desktop associated with a family picture 198, electronic mail in a desktop associated with an in/out basket 200, and a window associated with blue sky ideas in a desktop associated with a window 202. Thus, the physical objects on, or near, which the user places bar code patterns can function as physical icons. That is, they can function to remind the user which windows are in the desktops associated with which bar codes, and they can act as a visual reference which tells the user where to point so the bar code reader 170 will read the bar code that brings a desired desktop or window into view.

Preferably the bar code reader 170 is one of a commercially available type which uses an infrared laser beam, and the bar code patterns 184 are written in infrared ink on clear tape. This reduces the visual impact of the bar code patterns, so they do not significantly impair the appearance of the objects on, or near, which they are placed.

The window 180D associated with the bar code pattern 184D on the trash can 192, and the window 180E associated with the pattern 184E near the picture of the hide-desktop icon 194 are unusual in that the applications with which they are connected are operator functions. That is, they are functions which perform operations on other desktops, windows, or the applications associated with those windows. As will be explained below in greater detail, the trash can window is used to delete other objects which have been selected by the user and the hide desktop icon is used to remove the last selected desktop from the visual display.

The bar code 184F is unusual in that it is worn as part of an identity badge on the clothing of a person 204, rather than being stuck on an inanimate object. The windows 180F placed in its associated desktop 182F are those which a user wishes to use when he or she sees the particular person wearing the bar code pattern 184F. One such window might include information about the person wearing the bar code, such as data out of a corporate personnel directory. Another might include matters which the user wishes to discussed with the person, and so on. Other desktops, associated with bar codes worn by other persons, can contain windows associated with such other persons.

In alternate embodiments of the invention other types of detectors besides bar code readers can be used to detect when the user's head is pointing toward an external location or object.

Figure 13:
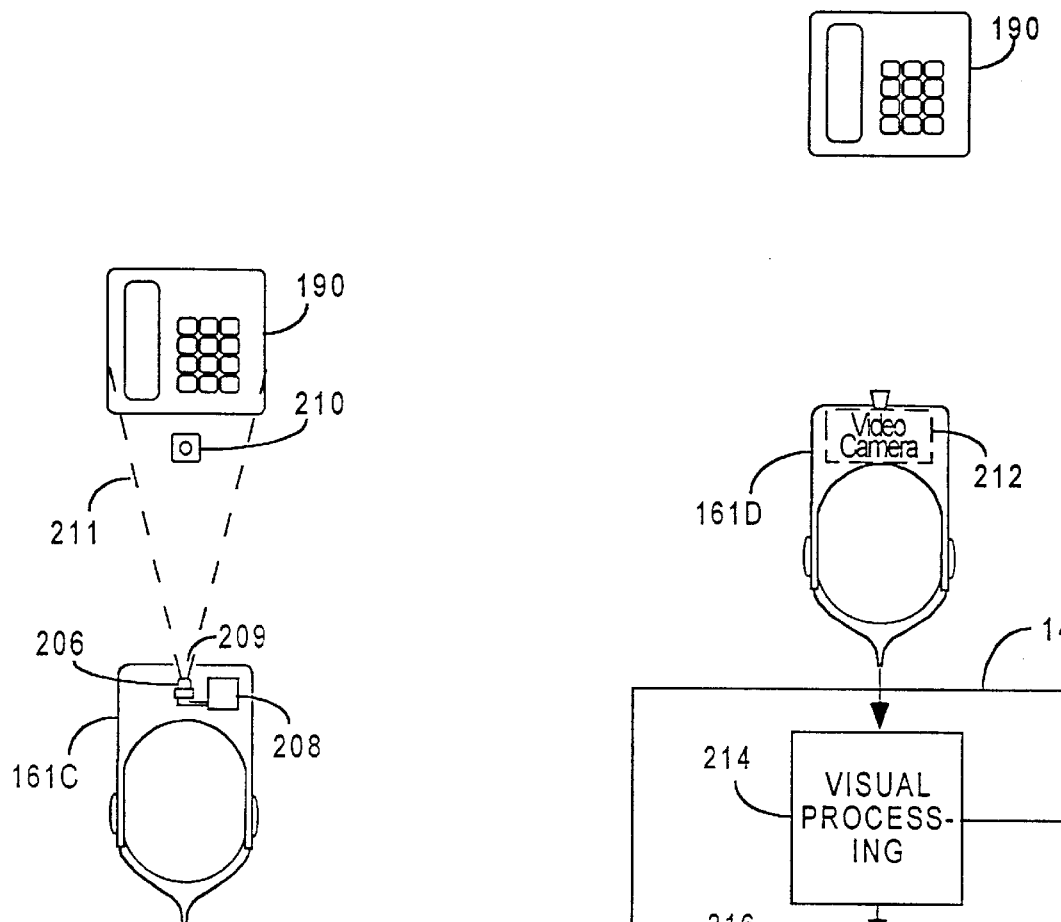
FIG. 13 illustrates an alternate object sensor for use in the head mounted sensing and communicating units shown in FIGS. 9 and 10.

FIG. 13 shows a head mounted unit 161C which is similar to the units 161 and 161A, except that instead of a bar code reader it includes an infrared receiver 206 and a decoding circuit 208 for decoding temporal modulations in the infrared light received by the receiver 206. With this embodiment of the invention the user places a small infrared emitter unit 210 in a location, such as near the phone 190, which he or she wants to associate with a desktop. Each of these emitter units includes an infrared diode, a coding circuit which causes the infrared diode to emit light modulated with a particular coded pattern, and a battery for powering the diode and coding circuit. The head mounted unit 161C blocks all light from reaching the infrared receiver except that which passes through a small hole 209 located directly in front of that receiver. As a result, the receiver will only detect a transmitter's light if that transmitter is in a limited angular zone 211 which extends radially out in the direction in which the head mounted unit is pointed.

Figure 14:
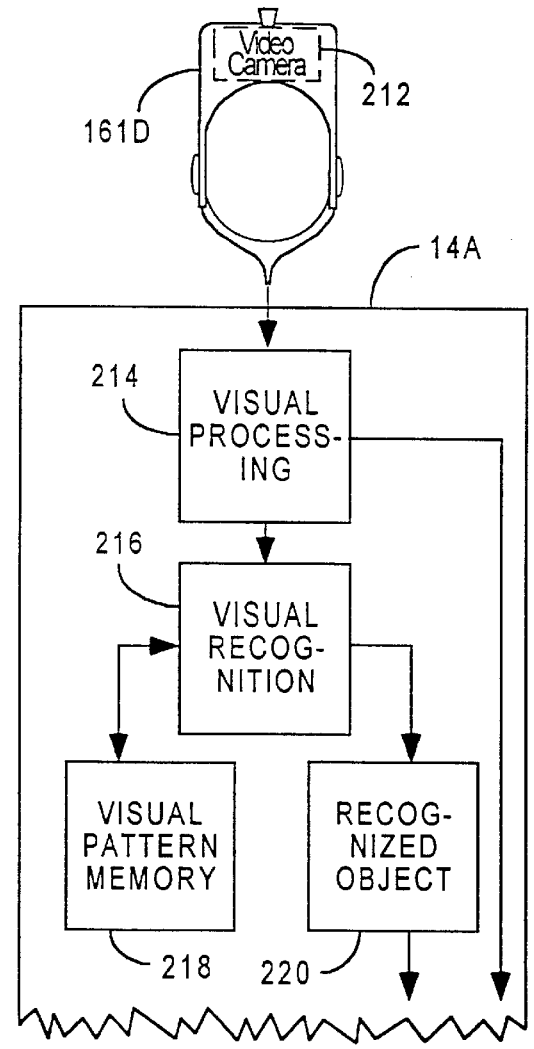
FIG. 14 illustrates another alternate object sensor for use in the head mounted sensing and communicating units shown in FIGS. 9 and 10.

FIG. 14 shows another embodiment 161D of the head mounted unit which contains a video camera 212, instead of a bar code reader or an infrared detector. In this embodiment the computer 14A used with the head mounted unit 161D contains a visual processing unit 214 which supplies visual information to a visual recognition module 216. This module compares signals received from the camera 212 with patterns stored in a visual pattern memory 218. These patterns represent signals previously received by the camera 212 when pointing at particular objects, such as the phone 190. When the recognition module 216 determines that signals received by the camera 212 appear to match the signal pattern representing a given object, it supplies an output 220 indicating that the object has been recognized. If the user has previously associated a desktop with the object recognized, the system will then cause the desktop to be shown in the user's visual display.

XI. Hardware for Location Quantized View Spaces

Figure 15:
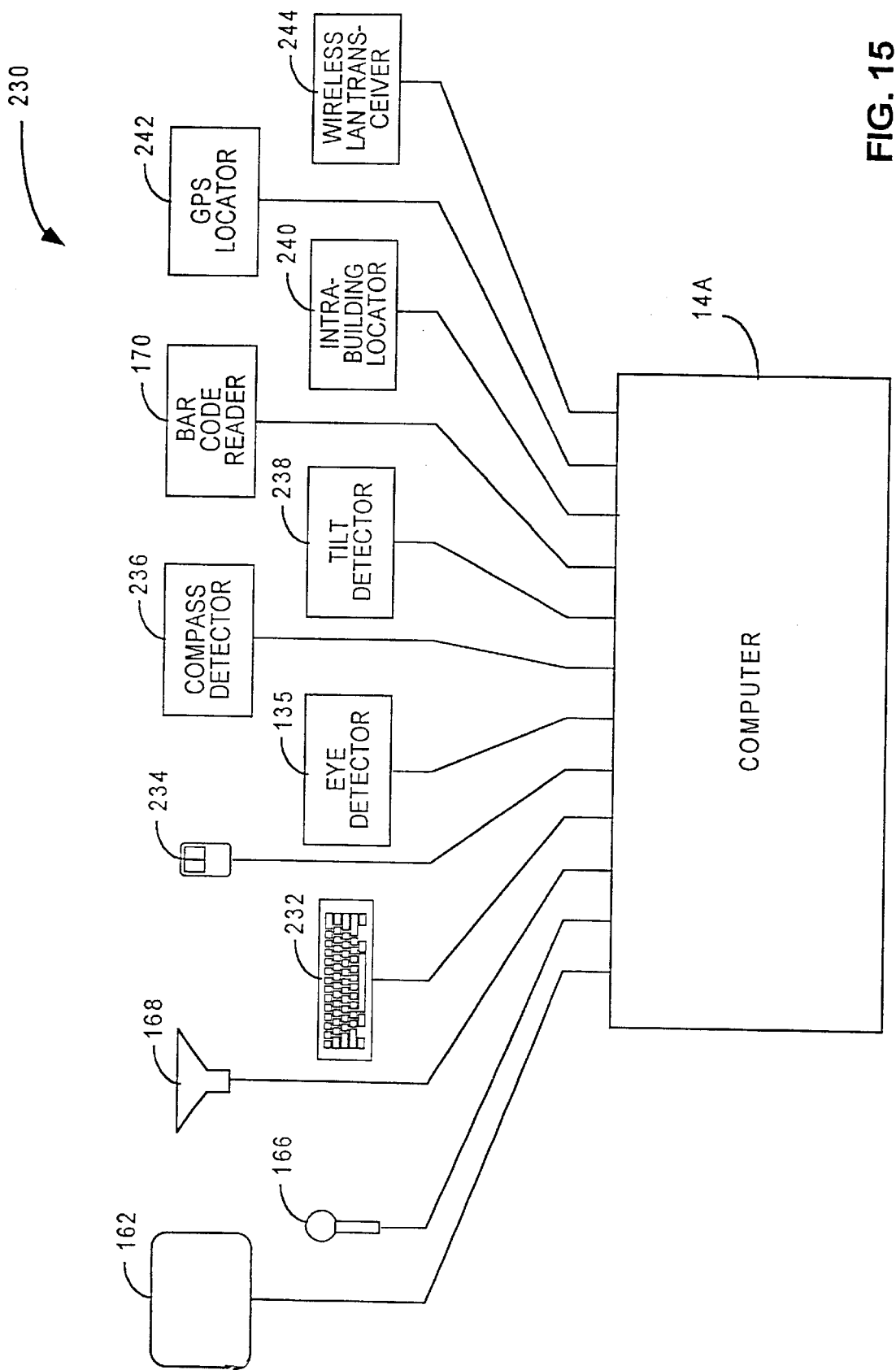
FIG. 15 illustrates the computing apparatus, with input and output devices, used in certain embodiments of the present invention.

FIG. 15 is schematic representation of computing apparatus 230 which enables a user to associate desktops with locations, select desktops by motion relative to such location, and to manipulate visual objects in those desktops. This apparatus preferably includes a portable general purpose computer 14A and a plurality of input and output devices.

The general purpose computer 14A is preferably small enough to be easily carried or worn, as described above with regard to the head mounted unit 161. It can be constructed, for example, from a SPARCstation computer of the type described above, with the standard AC power supply replaced by a battery power supply. The computer 14A preferably runs Sun OS and Open Windows, with the modifications to that software necessary to incorporate the features shown in FIGS. 16 and 17A–17D.

In an embodiment using the head mounted unit 161A, the computing apparatus 230 includes the visual display 162, microphone 166, and speaker, or earphone, 168 of that head mounted unit, and all the standard interface hardware and software necessary to interface to such input/output devices. The apparatus 230 preferably includes connections for a keyboard 232 and a mouse 234. But, as is explained below, such input devices are often not necessary in preferred embodiments of the invention. The apparatus includes the photo detectors 135 for detecting when each of a user's eyes are opened or closed. It also includes a compass detector 236 located on the head mounted unit 161A. This detector includes a magnetic sensor which detects changes in yaw of the head mounted unit relative to the earth's magnetic field lines. The apparatus includes a gravity driven tilt indicator 238 to detect changes in pitch of the head mounted unit. It further includes the bar code detector 170 for detecting when the head mounted unit is pointed at a location labeled with a given bar code pattern.

The apparatus also includes an intra-building location detector, or locator, 240. This detects the computing apparatus's location relative to the interior of buildings. It includes a global positioning system, or GPS, locator 242 which detects the apparatus's location on the surface of the earth. It further includes a high frequency wireless LAN transceiver 244, which enables it to be connected to a network of other computers, including other mobile computers like the apparatus 230 of FIG. 15, itself.

The intra-building and GPS locators are provided to enable the user to associate information with building or geographic locations and to select that information when he or she enters those locations. GPS locators are well known and commercially available. They can determine one's location on the surface of the earth to with approximately 3 feet, based on signals received from satellites. Unfortunately they often do not work well indoors. For that reason a separate intra-building locator is provided.

The wireless LAN enables the user to be connected to a network while having freedom of motion, and, as is described below, it enables users to associate information with specific locations on other user's systems.

Figure 16:
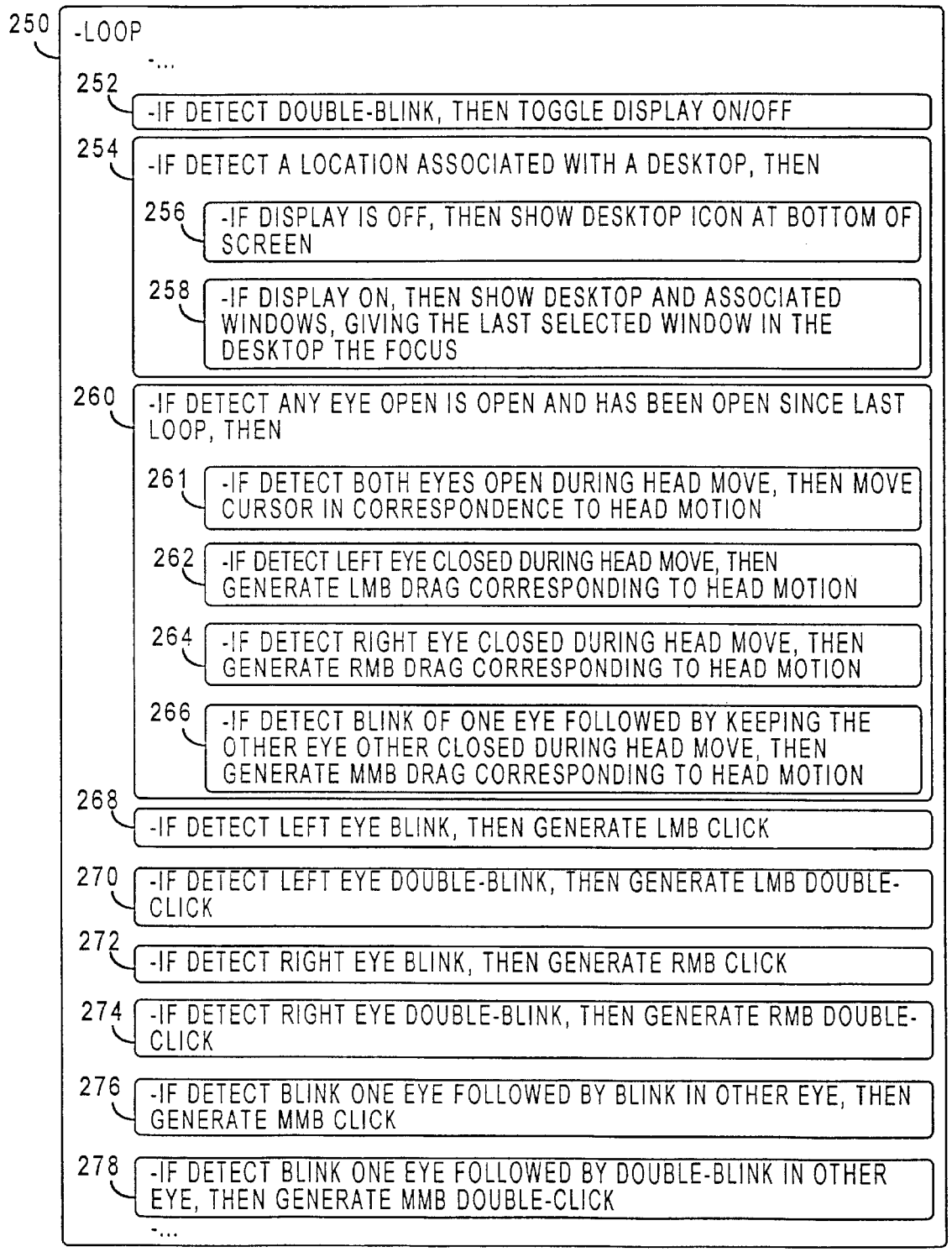
FIG. 16 is a flow chart illustrating steps performed by a command interpreter used with a head mounted display of the type shown in FIG. 10.

XII. Command Interpreter for Head Mounted Display Used with Location Quantized View Space FIG. 16 is a high level flow chart of a command interpreter which allows a user to control many of the functions of the computing apparatus 230 with a head mounted unit, such as 161A described above with regard to FIGS. 9 and 10. The command interpreter is part of the loop 250 of a larger command interpreter which dictates the response of the apparatus 230 to user inputs. The particular command interpreter shown in FIG. 16 is optimized for a see-through display, such as the one shown in FIG. 10, which has separate displays and photo detectors for each eye, and in which the visual display is project in front of the user's view of the surrounding world.

Step 252 of the command interpreter responds to the detection of a double-blink by the eye photo detectors 135 shown in FIGS. 9 and 15. It responds to such a double-blink by toggling the visual display between on and off modes. That is done so the user can quickly and easily turn on and off the see-through display whenever desired, to minimize its interference with his or her perception of the outside world.

Step 254 responds to an indication by one of the external location indicators, such as the bar code reader 170, the intra-building locator 240, or the GPS locator 242, that the user is pointing, at or has come within, a given location. If so, either step 256 or 258 is performed.

If the visual display is currently in its off mode, step 256 shows a labeled icon of the desktop associated with the detected location at the bottom of the screen, to alert the user that there is a desktop for him or her to see without substantially interfering with his or her vision of the outside world. If the display is currently in the on mode, step 258 displays the current desktop and any windows within it, giving the last selected window within that desktop the current focus.

Step 260 uses the eye detectors 135 to determine if any of the user's eyes is open and has been open since the last pass through the command interpreter's loop. If so, it causes steps 261–266 to respond to head motion with corresponding cursor motion. Step 260 performs the same function as steps 140 and 144 of FIG. 8. This is, it allows the user to selectively cause certain head motion to be ignored, so he or she can perform extended navigation in any direction without requiring corresponding net movement in that direction.

If the eye detectors 135 find both of the user's eyes are open, it moves the cursor in the visual display in correspondence to head motion made while both such eyes are open. That is, the cursor's X position is moved in proportion to changes in the head's yaw indicated by the compass detector 236, and the cursor's Y position is changed in proportion to changes in head pitch indicated by the tilt indicator 238.

If the eye detectors find that the left eye is closed, but the right eye is opened during such head motion, step 262 moves the cursor in a similar manner as step 261, except that it performs a left mouse button drag if the user moves his or her head. If the eye detectors find the right eye is closed and the left eye is open during such motion, step 264, performs a right mouse button drag. And if the eye detectors find the user rapidly blinks in one eye followed quickly by keeping the other eye closed while moving the head, step 266 performs a middle mouse button drag.

If the eye detectors 135 detect a blink of the left eye by itself, step 268 generates the equivalent of a left mouse button click. If they detect a double-blink of the left eye by itself, that is two rapid blinks in quick succession, step 270 generates the equivalent of a left mouse button double-click. If they detect a blink of the right eye by itself, step 272 generates a right mouse button click. If they detect a double-blink of the right eye by itself, step 274 generates a right mouse button double-click. If they detect a rapid blink in one eye followed quickly by a blink in the other, step 276 generates a middle mouse button click. And if they detect a rapid blink in one eye followed quickly by a double-blink in the other, step 278 generates a middle mouse button double-click.

Thus, it can be seen that the command interpreter shown in FIG. 16 enables a user of a see-through head mounted display to turn on and off the display in an instant, to select windows by pointing at, or coming within, locations associated with desktops, and to move and click the mouse cursor, all without the use of his or her hands, by head and eye movements. If the computing apparatus is supplied with speech recognition software, and interpreter makes it possible to use a powerful computer at any time and place, as a user moves about, without the need to hold or touch anything.

XII. Flow Chart and Screen Displays for Location Quantized View Space

FIGS. 17A through 17D provide is a simplified flow chart of that part of the user interface of the computing apparatus 230 which relates to the association of desktops with external locations. FIGS. 18–34 represent part of the graphical output produced by the program represented by that flow chart.

Figure 17A:
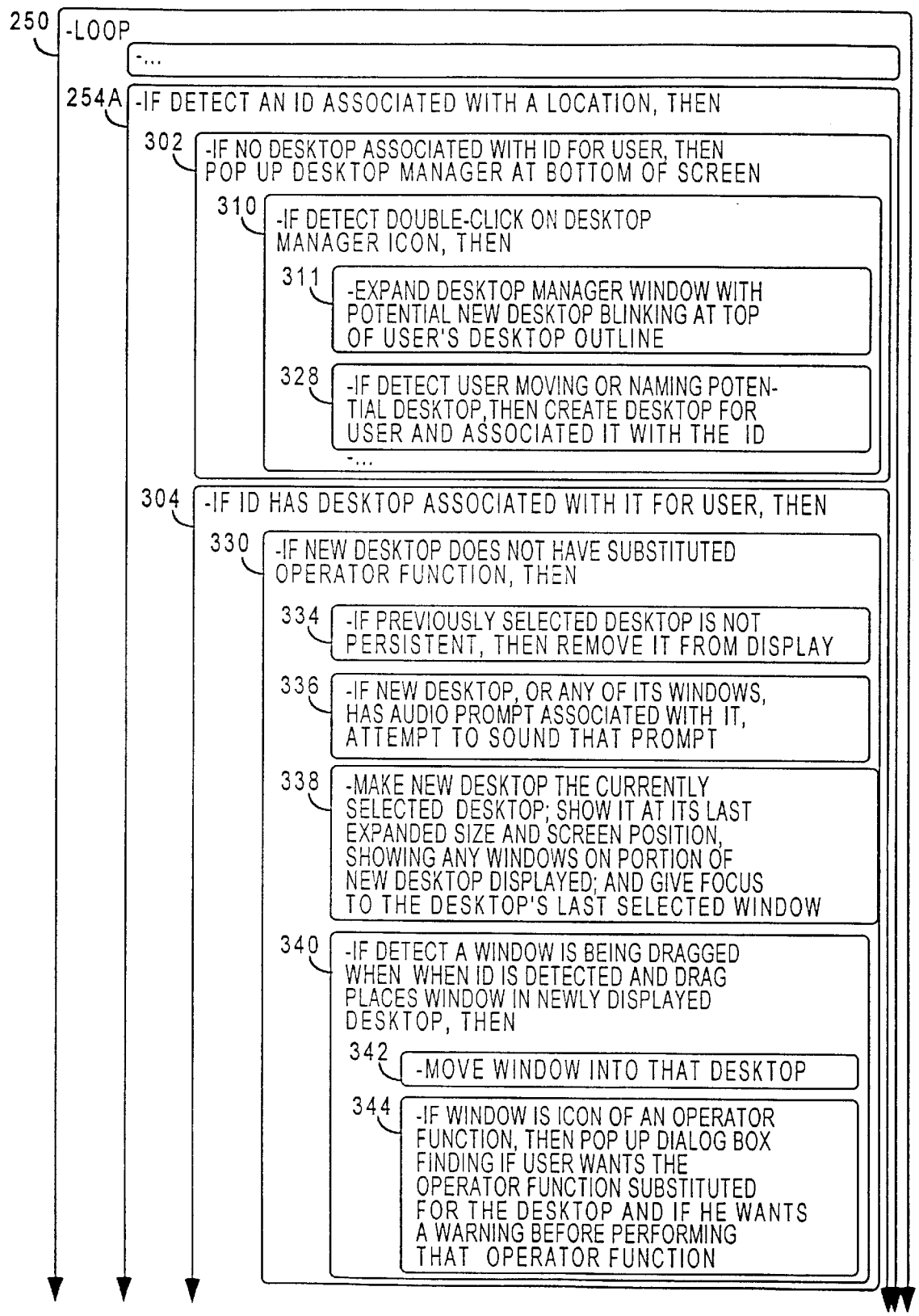
FIGS. 17A through 17D illustrate a more detailed, but still high level, version of the flow chart shown in FIG. 11, which version is used in certain embodiments of the invention and which generates the screens and screen objects shown in FIGS. 18–34 and 36.

Like the steps of FIG. 16, the steps of FIGS. 17A–17D are part of the command interpreter loop 250 of the computer 14A. The first step of this part of the command interpreter, step 254A determines whether or not a location associated with an ID has been detected, such as by the bar code reader 170, the intra-building locator 240, or the GPS locator 242. The step 254A shown in FIG. 17A is another description of the step 254 shown in FIG. 16, except that it assumes for simplicity that the visual display is on and it focuses more on the responses made to different kinds of IDs and desktops.

If step 254A detects an ID, it causes either step 302 or 304 to be performed, depending upon whether or not a desktop is currently associated with the detected ID for the user.

Figure 18:
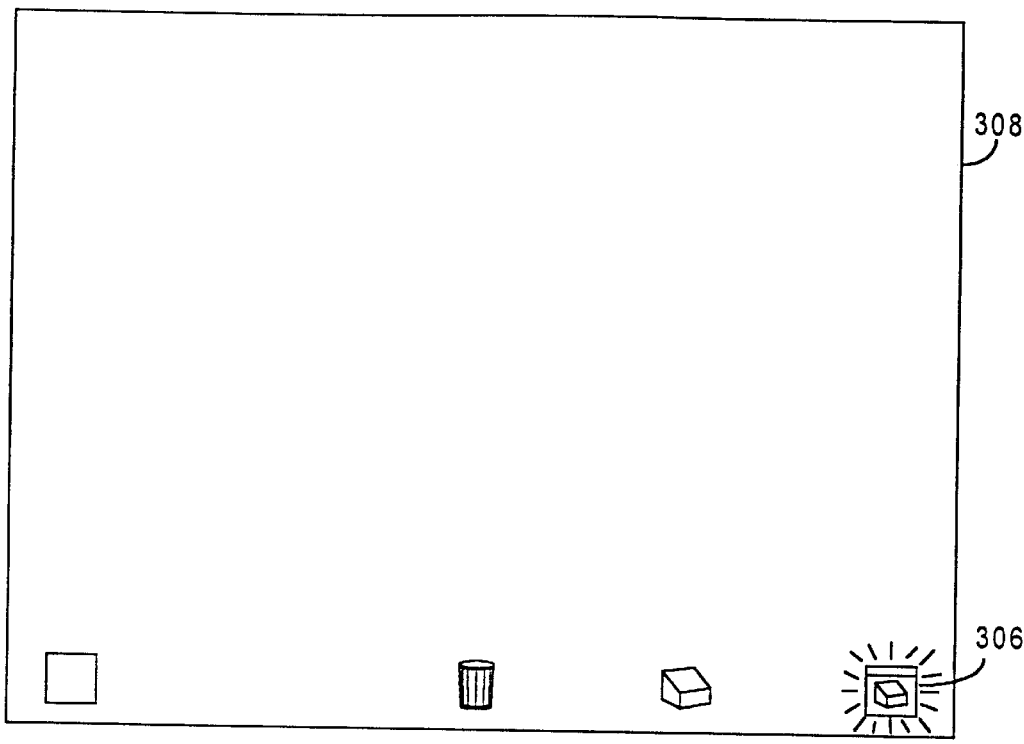
FIG. 18 illustrates a screen showing the background desktop, when no other desktop is shown, with the desktop manager icon flashing.

If no desktop is associated with that ID for the user, step 302 pops up the desktop manager icon 306 at the bottom of the display screen 308, as shown in FIG. 18. This is done to enable the user to associate the ID of a new bar code pattern with a desktop. This is necessary for bar code patterns, because they are external objects about which the computer 14A initially has no knowledge other than the IDs defined by their pattern.

If the user double-clicks on the desktop manager icon presented by step 302, step 310 causes the steps 311 and 328 to be performed. Step 311 pops up the desktop manager window 312, as shown in FIG. 19, with a potential new desktop entry 314 blinking at the top of the user's desktop outline 316.

Figure 29:
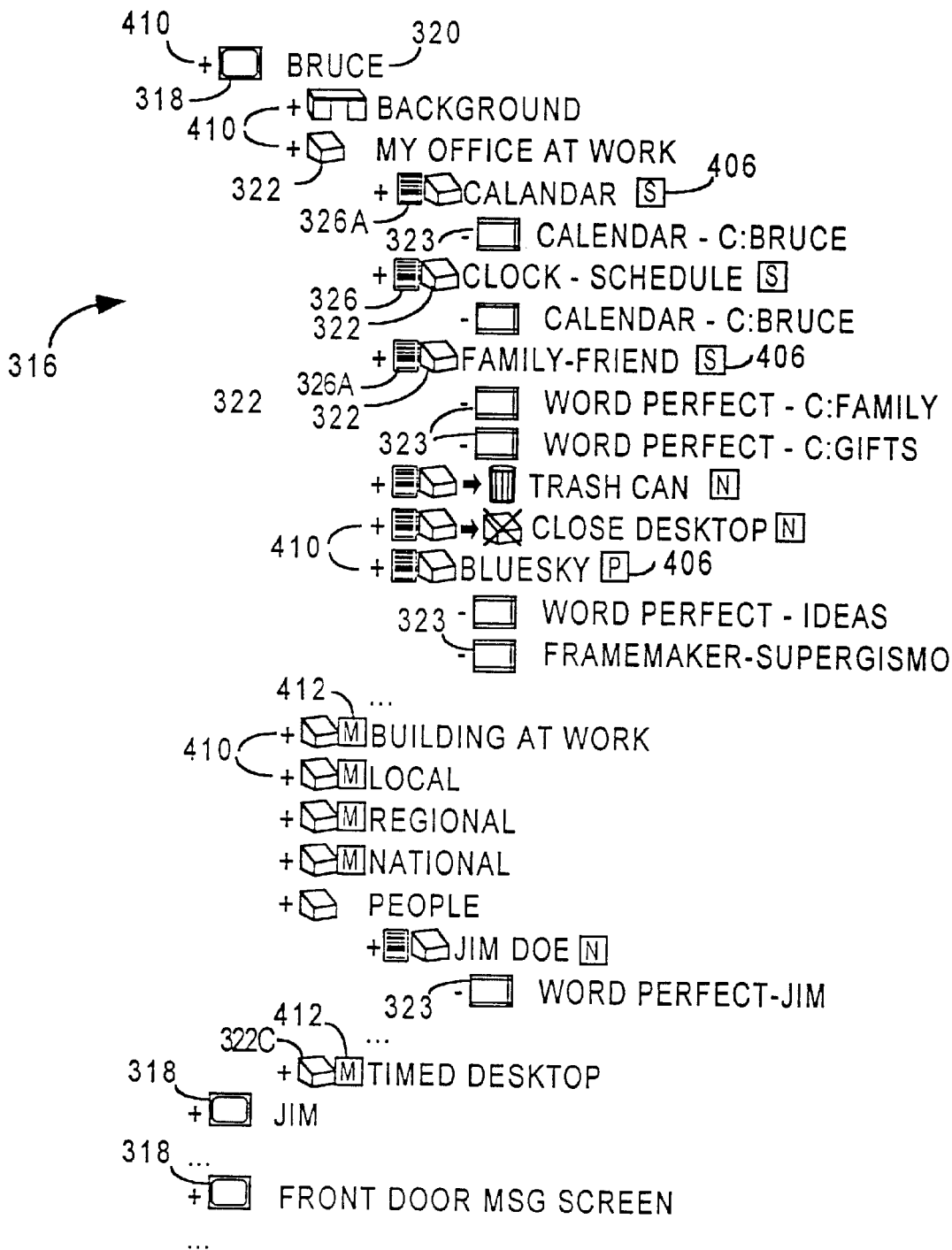
FIG. 29 illustrates a view of portions of a desktop outline.

The desktop manager 312 allows a user to perform many of the functions involved in associating desktops with locations, windows with desktops, and properties with desktops and windows. The desktop manager contains a window showing a portion of a desktop outline 316. A larger view of this outline is shown in FIG. 29, with ellipsis indicating portions of the outline which are not shown in that illustration. This outline is a hierarchical representation of which desktops contain which windows for which users, and which desktops are associated with which locations.

Figure 19:
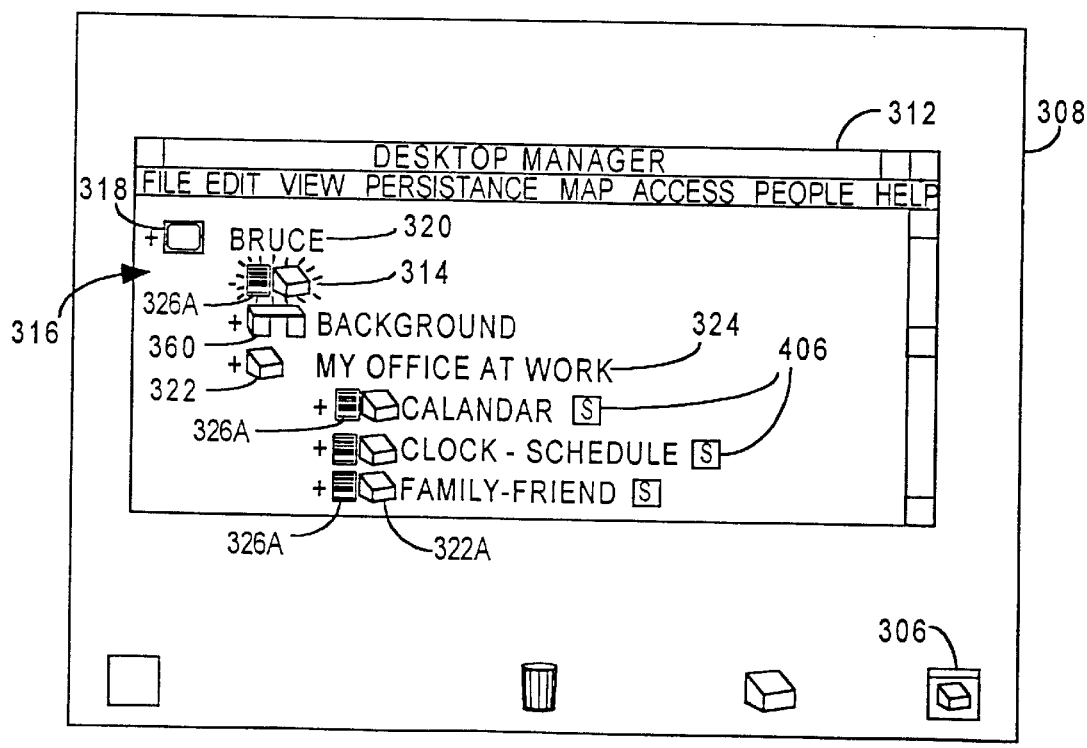
FIG. 19 illustrates a screen showing the desktop manager window with an undefined desktop flashing and awaiting user definition.

In this outline a user is indicated by a display icon 318 followed by a user's name, such as the name 320 shown in FIG. 19. The display icon 318 represents the user's visual display in which the desktops under that user's entry will be seen. A desktop is indicated by a desktop icon 322 followed by a desktop title, such as the name 324. Desktops can be placed under other desktops in the outline, just as the desktops 322A have been placed under the desktop 322 labeled "MY OFFICE AT WORK". As is shown in FIG. 29, windows are indicated by window icon 323, followed by an application name and file title.

Desktop icons representing desktops associated with external locations are preceded by location icons, which indicate the type of location each such desktop is associated with. Bar code location icons 326A indicate that their associated desktops are associated with bar code pattern. Intra-building location icons 326B, shown in FIG. 30, indicate their desktops are associated with locations defined by the intra-building location system. GPS location icons 326C, shown in FIG. 32, indicate their desktops are associated with locations defined by the GPS location system.

Figure 20:
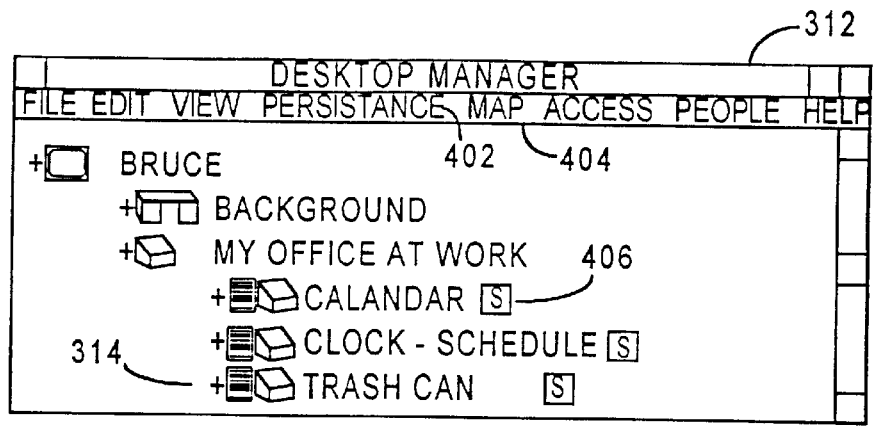
FIG. 20 illustrates the desktop manager window of FIG. 19 after the user has defined the previously defined desktop.

In the example shown in FIG. 19, the potential new desktop 314 has a bar code location icon 326A, since it popped up because a new bar code pattern was detected. If the user selects to move or enter a name for the potential desktop associated with the bar code pattern, step 328 will create an empty desktop in association with the ID, so the next time that desktop's ID is detected step 304 will be performed instead of step 302. FIG. 20 illustrates the desktop outline after the user has moved and named the potential desktop 314 to have the location and appearance shown. If the user does not name or move the potential desktop 314 shown in FIG. 19, the bar code ID which gave rise to it remains unassociated with a desktop for the user, and the next time that ID is detected step 302 will be repeated.

If a detected ID has a desktop associated with it in a user's portion of the desktop outline, step 304 will cause either the steps under step 330 or 332 to be performed, depending on whether the ID's associated desktop has had an operator function substituted for it. As is explained below, if an operator function has been substituted for a desktop, when the desktop is selected its substituted operator function is performed instead of the desktop being displayed.

If the desktop associated with the detected ID does not have an operator function substituted for it, step 330 causes steps 334–340 to be performed.

Step 334 removes the previously selected desktop from the display if its has not been designated as a persistent display. As is explained below, the user can designate a given desktop to be non-persistent, semi-persistent, or persistent. Non-persistent desktops remain on the display only when their corresponding ID is being detected. Semi-persistent desktops remain on the display from the time their associated ID is detected until the ID for another desktop is detected. Persistent desktops remain on the desktop (although they may be covered by another desktop) until the user explicitly selects to close them.

Step 336 sounds the audio prompt, if any, associated with the desktop or any windows within it. Such audio prompts can contain a tone to draw the user's attention to a desktop if the display is in the off mode described above with regard to FIG. 16, or it can contain an actual audio message.

Step 338 makes the desktop associated with the detected ID the selected desktop. It displays that desktop at its last displayed location and size, covering any other desktops in that portion of the display, showing any windows of the portion of the desktop displayed, and giving input/output focus to the window last selected in that display.

Figure 21:
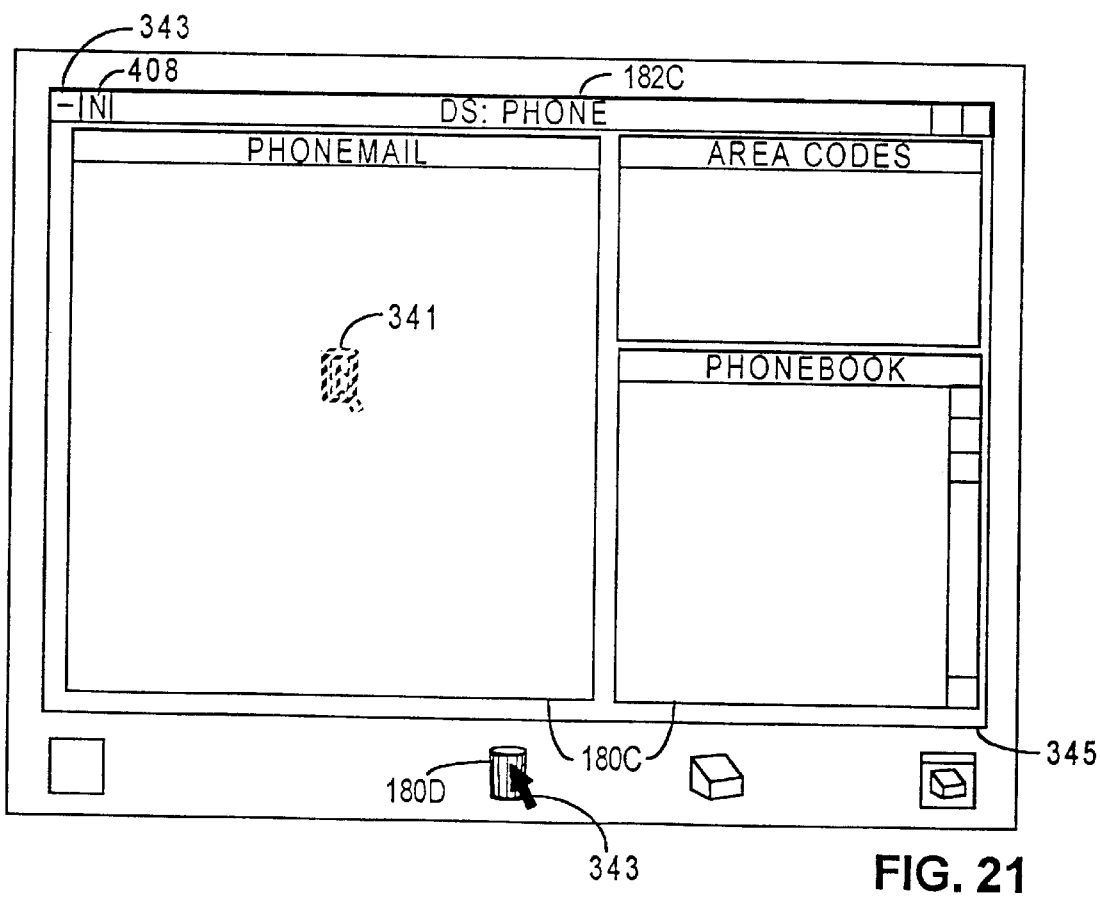
FIG. 21 illustrates a screen showing the phone desktop.

For example, if the user points his or her head toward the phone 190 shown in FIG. 12, the bar code reader 170 will detect the bar code pattern 184C and step 338 will display the desktop 182C shown in FIG. 21, and its included windows 180C. It will make the window labeled Phone Mail the selected window for input and output, since, in the example, it was the last selected window in that desktop. A desktop is a graphic window. Like other windows it can be dragged, resized, closed, and reduced to an icon and then re-expanded. But it is unlike most other windows, in that windows associated with one or more different applications can be located within it.

If the user is performing a drag on a window with the mouse cursor 343 when step 338 displays a new desktop, step 340 will cause the drag to continue with the dragged window being placed over the desktop displayed by step 338. If the drag places the mouse cursor inside the newly displayed desktop, step 342 will move or copy the window to the window's current location relative to the desktop, depending upon whether the drag is a move or copy drag.

Figure 22:
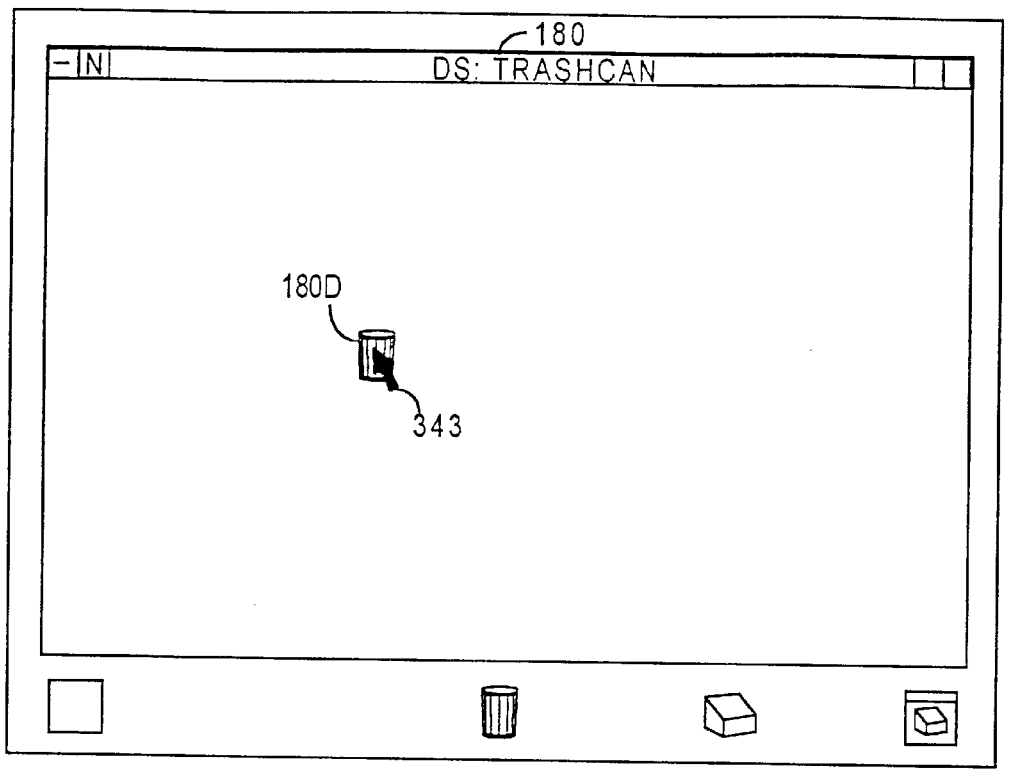
FIG. 22 illustrates a screen generated when the trash can icon is being dragged into the trash can desktop.
Figure 23:
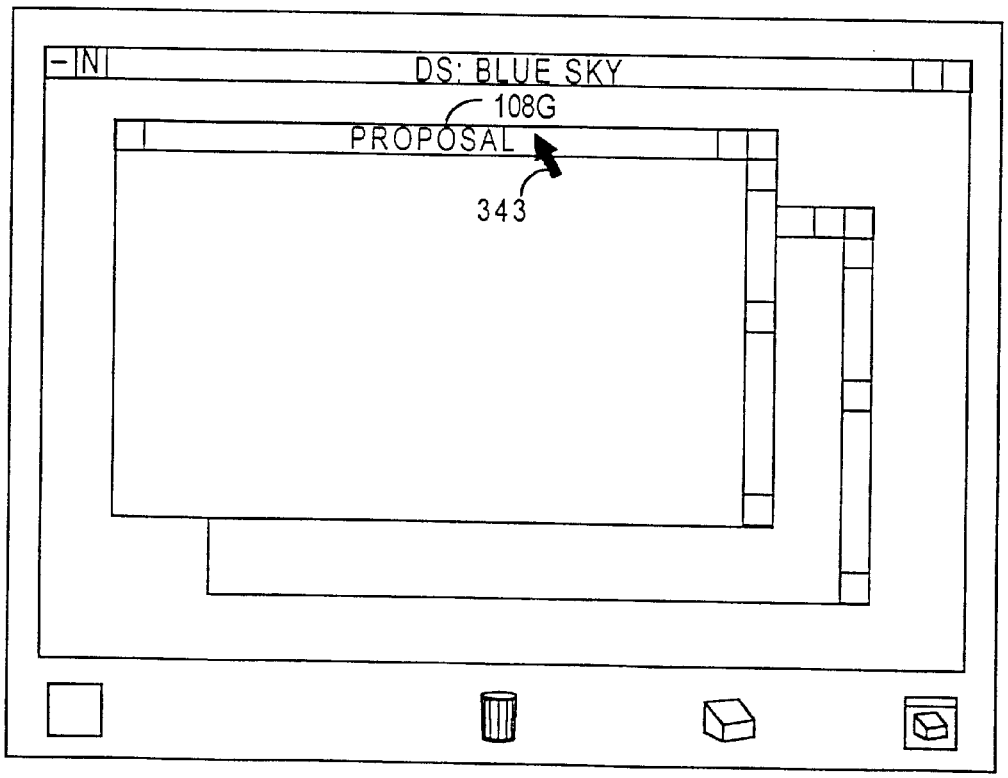
FIGS. 23–25 illustrate screens generated when the user selects a window, then points at the trash can, and causes the previously selected window to be deleted.

Assume for example the user places the cursor 343 on the window formed by the trash can icon 180D shown in FIG. 21, and copy drags that window up to the position 341 shown with dotted lines in that figure. If, without letting go of the drag, he or she then points his or her head at the trash can 192 shown in FIG. 12, the trash can desktop 180 would appear under the desktop, as shown in FIG. 22, assuming the trash can window, or icon, 180D has not yet been substituted for that desktop. If the window 180D were a normal window it would be moved to the new desktop 180 of that figure as soon as the user let go of the drag.

But if the window being dragged is the icon of an operator function, such as the trash can icon 180D, step 344 pops up a dialog box (not shown in the figures) asking the user if he or she wishes to substitute the operator function for the desktop, meaning future selection of the desktop will cause the icon's associated operator function to be performed. The dialog box also allows the user to specify that a warning be given before the operator function is performed in response to the detection of an associated ID. If the user selects not to substitute the operator function for the desktop, the icon is merely placed in the desktop like any other window.

If the desktop associated with an ID detected by step 254A has an operator function associated with it, step 332 causes either steps 346 or 350 to be performed. If the user has selected that the operator function have a warning before being evoked by detection of the desktop's ID, step 346 causes step 347 to repeatedly flash both the selected object upon which the operator will function, if any, and the icon for the operator function. If the user continues to point at the location associated with the operator function for four flashes, step 348 performs the operator function on the selected object. If the operator function does not require a warning, step 350 immediately performs the operator function on the object, if any, which has previously been selected for it.

Figure 24:
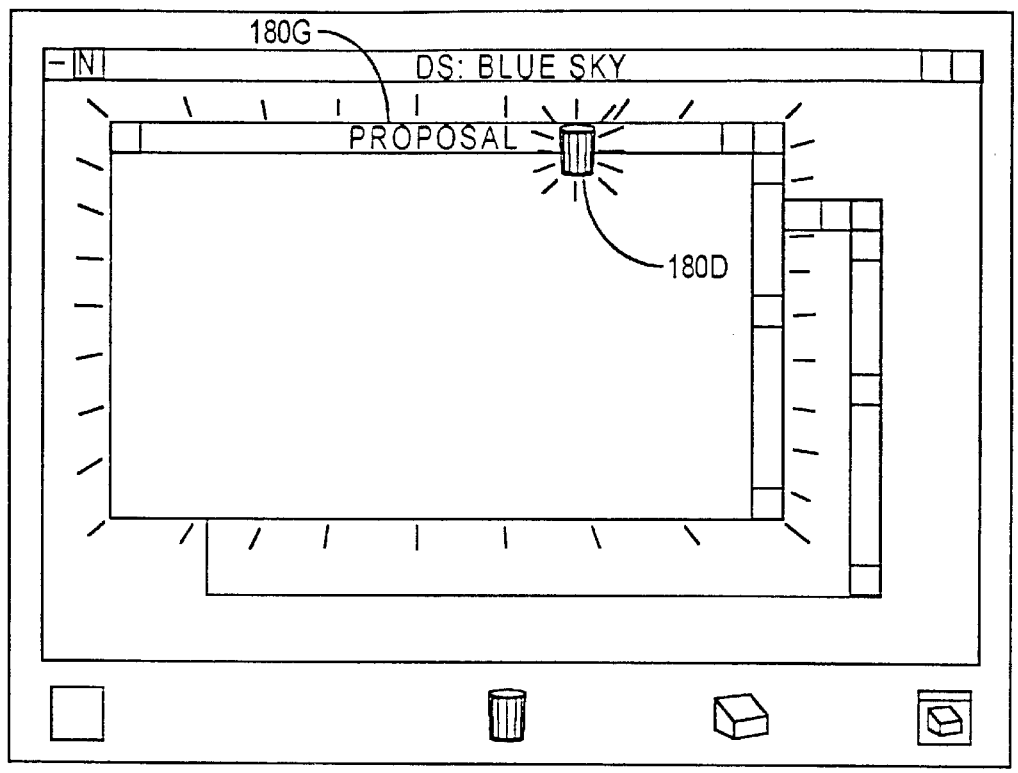
Figure 25:
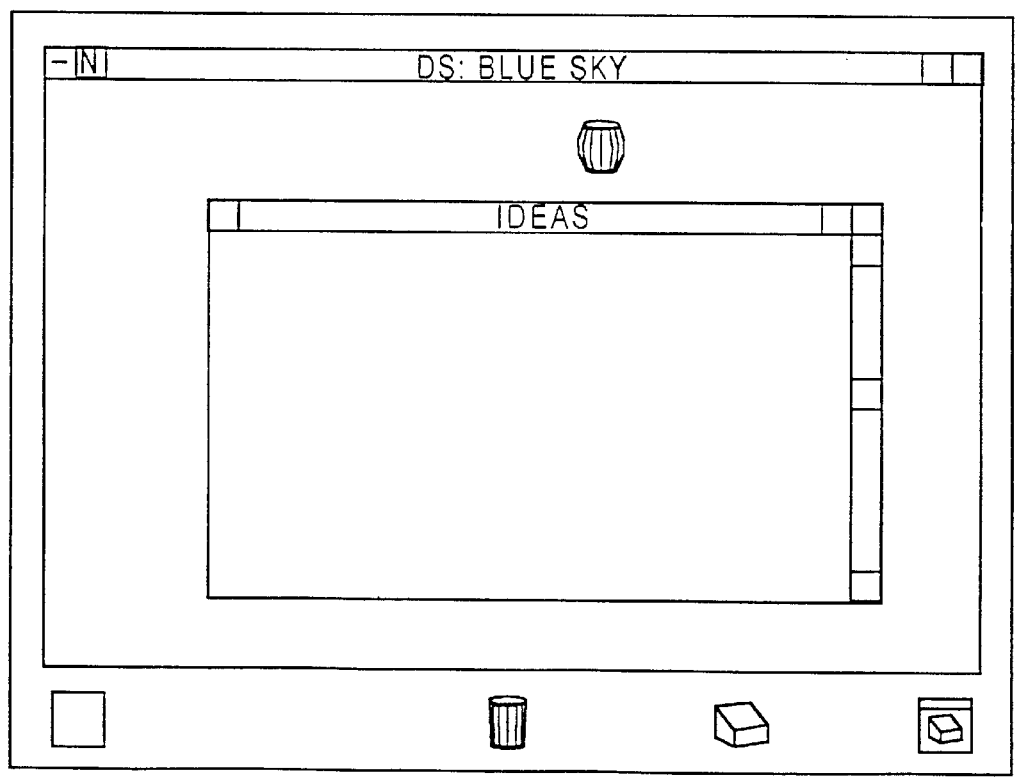

For example the trash can icon 180D deletes any graphic object which is dragged onto it. The function performed by the trash can icon can have significant consequences. Thus, users will normally require a warning before its function is performed when they point at the physical trash can 192, since they might point at that physical object without thinking about its associated function. Thus, if the user has the mouse cursor 343 on a draggable object, such as the window 180G in FIG. 23, with the mouse button down so as to perform a drag when the user points his or her head at the trash can 192 in FIG. 12, that draggable object and the trash can icon 180D will flash, as is indicated in FIG. 24. If the user does not move his or her or her head, or let go of the mouse button by the end of the fourth flash, the trash can's application will delete the draggable object, causing the screen to appear as in FIG. 25.

The close-desktop icon 180E, shown in FIG. 12, closes the currently selected desktop, if it is selected by looking at the bar code 184E placed next to a picture 194 of that icon shown in FIG. 12. This allows a user to quickly remove a desktop which has popped up without needing to first select it with the mouse cursor, as would be necessary to close it with the trash can icon.

If the ID associated with a selected desktop is no longer detected, and if the selected desktop is non-persistent, step 354 de-selects that desktop and removes its from the display. As is explained below, the desktop manager allows a user to selectively make desktops either persistent, semi-persistent, or non-persistent. If the currently selected desktop is persistent, it will not be removed from the screen (although it might be covered by another object) unless the user specifically selects to, such as with the close desktop button 343, shown in FIG. 21, or the hide-desktop icon 108E. If the desktop is semi-persistent it can be closed by the explicit steps which close persistent desktops, and, in addition, it will be closed by step 334 every time another desktop's ID is detected by step 254A. If it is non-persistent it will be closed in all the situations in which semi-persistent desktops are closed, and in addition, by step 354 if its ID is no longer being detected.

Figure 26:
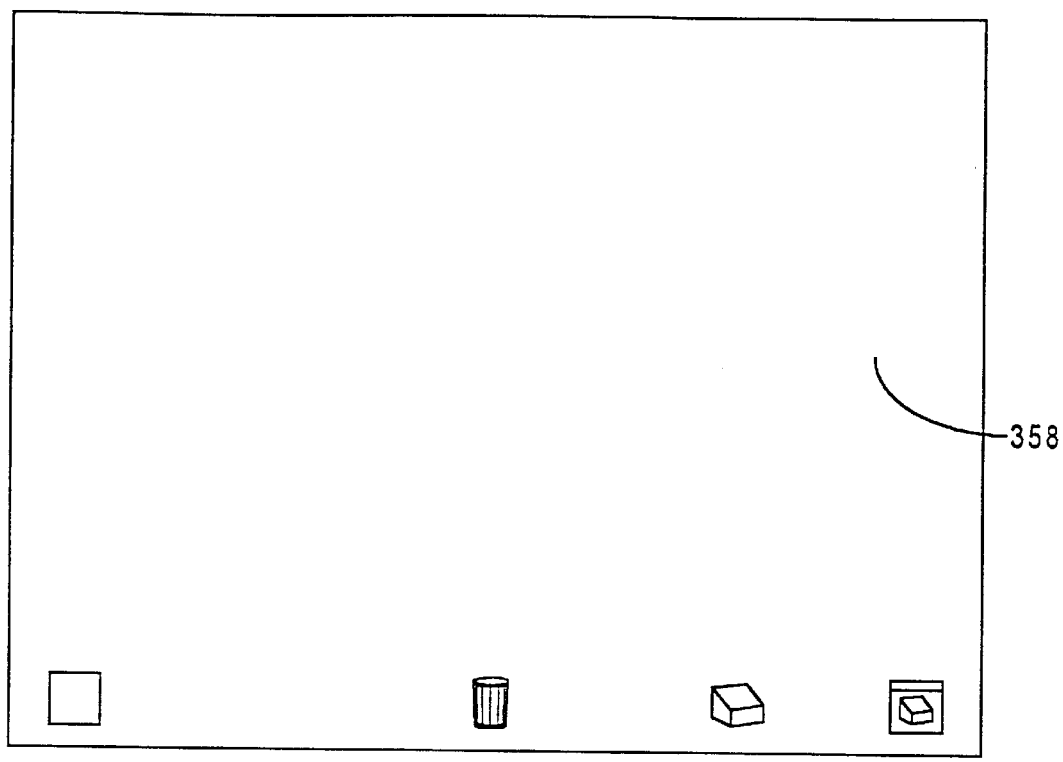
FIG. 26 illustrates a screen generated when the user de-selects a desktop.

When all desktops have been removed from the visual display the user sees the background desktop 358, shown in FIG. 26, which normally is clear, except where the user had placed windows or icons upon it. This desktop has a special desktop icon 360 in the desktop outline, shown in FIG. 19, representing a larger desk, since it is the main desktop, the one the user sees when no other desktops are shown.

Steps 362, 364, 366, 368, 370, 372, 373, and 380 list some of the steps that will cause a particular type of action to be performed in response to a particular type of user input from a pointing device, such as a computer mouse or input simulating a mouse in response to head and eye movements as described in FIG. 16.

Figure 27:
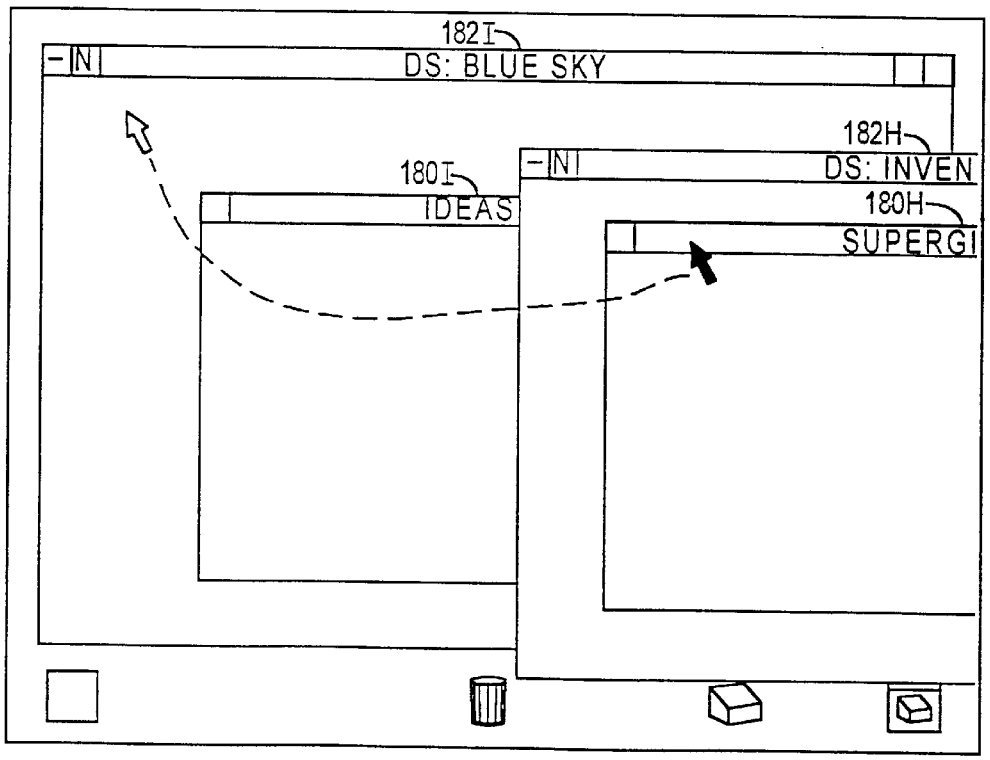
FIGS. 27–28 illustrate screens generated when a window is dragged from one desktop to another.
Figure 28:
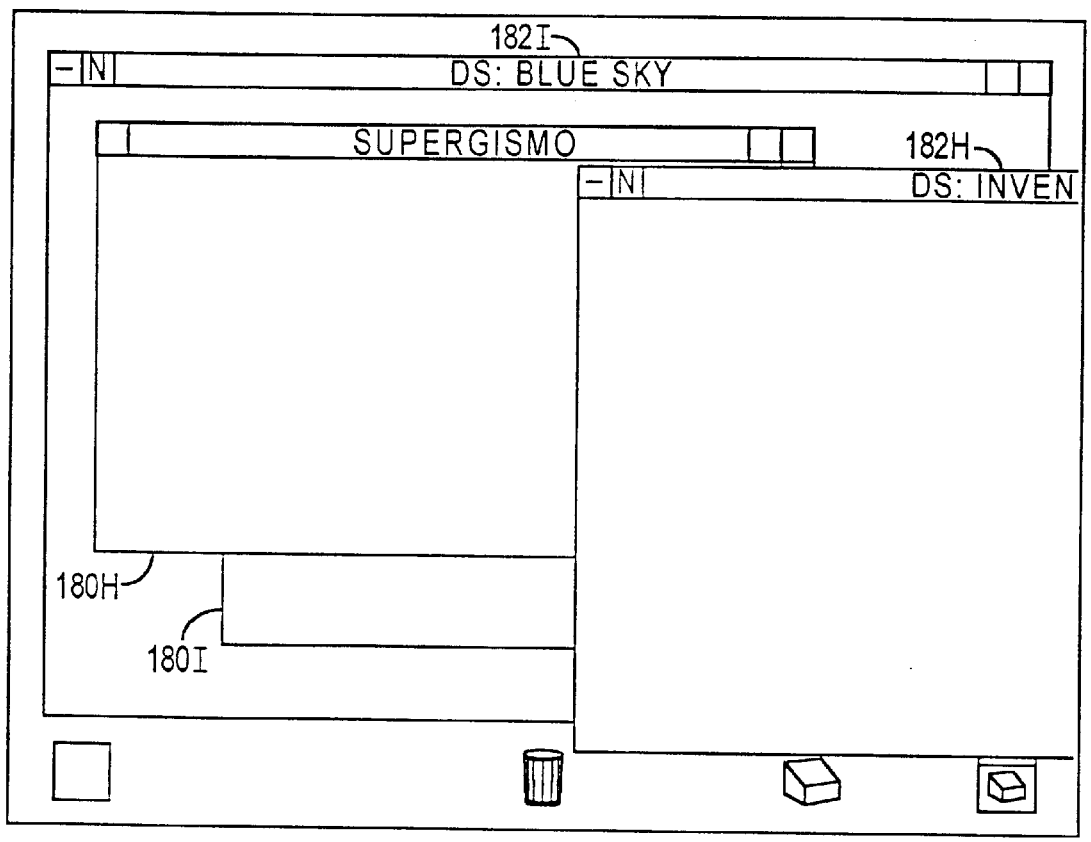

If the user drags a window by grabbing its title bar with the mouse cursor, step 362 moves an outline of the window during the drag, and places the window at its new location when the drag ends, making it the selected window in the desktop it is in. During such drags the window's outline will not extend outside the desktop in which the mouse cursor which is dragging it is located. If the cursor crosses from one desktop into another, a tone sounds, and only that part of the window outline which is in the new desktop the cursor is in is shown. If the user ends a drag with the window in a different desktop than that in which he or she started, step 364 places the window's at the location in the new window at which the drag stopped. Unless the drag is a copy drag, it also removes the window from its old desktop. The dragging of a window from one desktop to another is illustrated in FIGS. 27 and 28 in which the window 180H is shown dragged from desktop 182H to a desktop 182I.

If the user clicks on a window in a desktop, step 366 causes that window to be the selected window in that desktop, that is, the window with the current input focus and the window that will have that focus the next time the desktop is selected.

If the user drags on the title bar of the desktop, step 368 will move its position relative to the visual display. This position will be maintained next time the desktop is displayed again.

If the user drags on the desktop sizing controls, which form the frame 345 shown in FIG. 21 around the desktop, step 370 will correspondingly change the rectangular dimensions of the desktop, and these dimensions will be remembered the next time the desktop is displayed.

If the user clicks on the desktops close button 342, shown in FIG. 21, step 372 will remove the desktop from view.

If the user clicks on the desktop's persistence button 408, shown in FIG. 21, step 373 changes the persistence property of the desktop to the next persistence property in a cyclical sequence of three such properties: non-persistent, semi-persistent, and persistent, with the current desktop's current value of the property being indicated on that button. As described above, the persistence property determines under what circumstances a desktop is removed from the video display.

If the user selects the desktop manager by double-clicking on the desktop manager Icon 306, shown in FIG. 18, step 380 causes step 382 to display the desktop manager window 312 shown in FIGS. 19 and 20. Then the system waits for user input, and in response to a particular input performs a step, such as step 384, 386, 388, 392, 394, 396, 398, or 400, associated with that input.

If the user places the cursor in the title space after a desktop icon 322 and enters textual or editing information, step 384 enters or edits the title of the desktop correspondingly.

If the user selects to make a desktop non-persistent, semi-persistent, or persistent by use of the PERSISTENCE control 402 in the desktop manager's title bar 404, as shown in FIG. 20, then step 386 will change the persistence property of the desktop accordingly. A persistence icon 406, indicates the persistence property of desktops which are associated with external locations. It does so with either an "N", "S" or "P" shown after the desktop's title in the desktop outline, as is shown in FIG. 29.

If the user drags a desktop or window icon to a new location in the desktop outline, step 388 causes steps 389 and 390 to be performed. Step 389 removes the dragged desktop or window from its former location in the outline, unless the drag is a copy-drag, and places it in the new location. If the move or copy move inserts an object into a portion of the desktop outline other than under the display icon 318 of the user making the move, step 390 inserts a "From" entry 432, such as those shown in FIGS. 30, 32, and 34, labeled with the name of the user making the insertion. This "From" entry is placed in the position in outline at which the cursor was located at the end of the drag, and the actual object being dragged is placed under that "From" entry. Step 390 also communicates any change made to a portion of the desktop outline not associated with the user making the change. It makes this communication over the wireless LAN to the computer associated with the part of the desktop to which the change has been made.

If a given outline entry's outline control 410, shown in FIG. 29, is a plus sign, indicating that entry has desktops or windows indented under it, step 392 will expand the view of that given outline entry to show all of the outline entries indented immediately under it, if they are not already shown, when the user double-clicks on that outline control. If those indented entries are already shown, step 392 hides them from view. This enables the user to expand or compress various portions of the desktop outline at will.

If the user double-clicks on a given desktop icon 322, step 394 displays the desktop window as if its associated ID were detected.

Figures 30, 31:
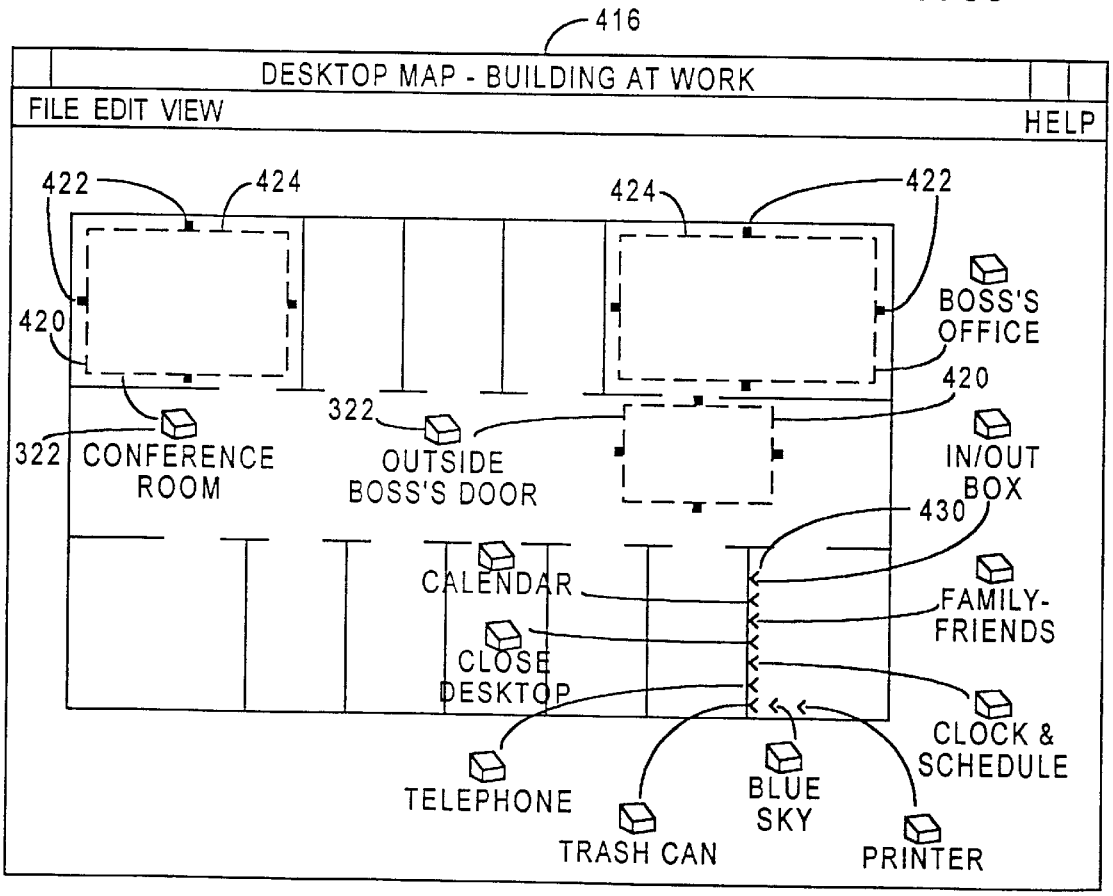
FIG. 30 illustrates a view of a portion of a desktop outline showing desktops located throughout a user's building.
FIG. 31 illustrates a desktop map showing the location throughout the user's building of the desktops in the portion of the desktop outline shown in FIG. 30.
Figures 32, 33:
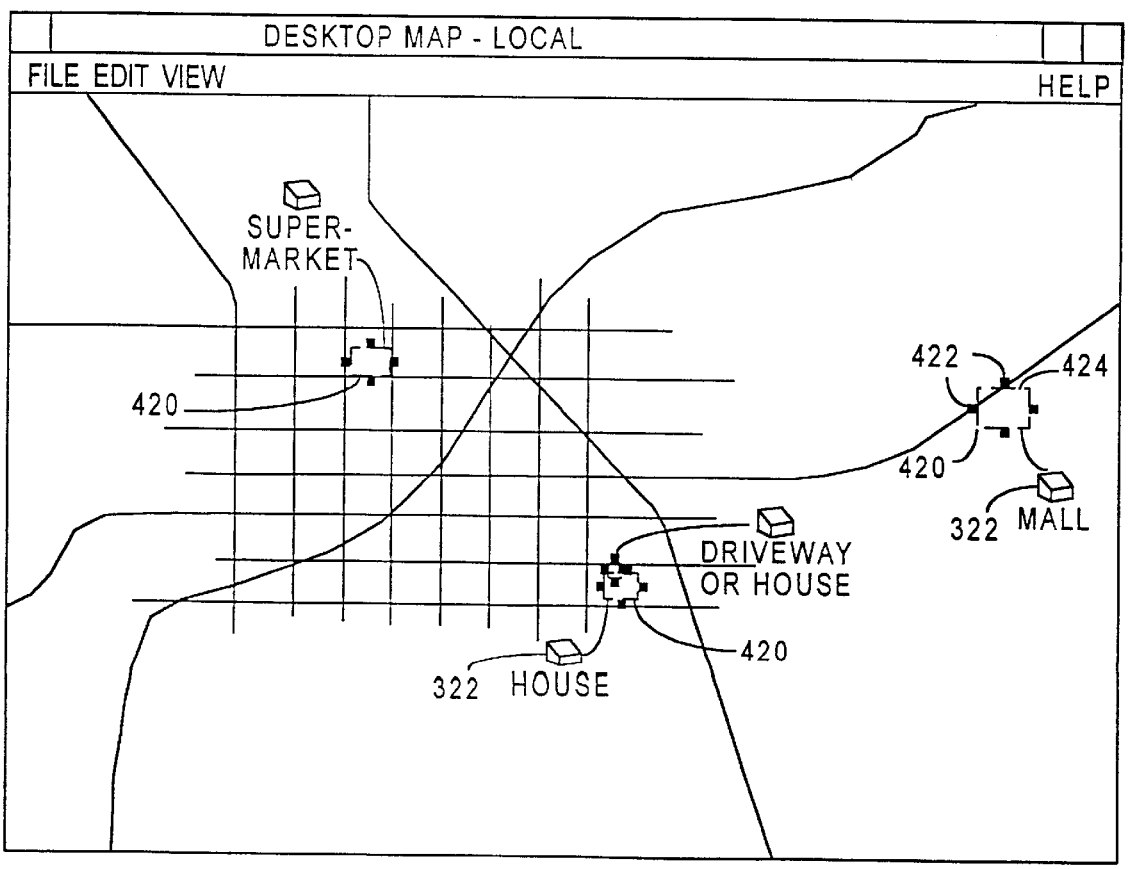
FIG. 32 illustrates a view of a portion of a desktop outline showing desktops located throughout a user's local geographic area.
FIG. 33 illustrates a desktop map showing locations associated with desktops in the user's local area.

If a desktop has a map icon 412, such as those shown in FIGS. 29, 30, and 32, and if the user double-clicks on that icon, step 396 will show the icon's corresponding map. Such a map indicates the physical location of desktops indented under that map icon's desktop.

For example if the user double-clicks on the desktop map icon 412 shown in FIG. 30, step 396 shows the desktop map window 416 shown in FIG. 31. This map represents all the locations in the user's office building associated with user's desktops that can be detected by the intra-building locator 240, shown in FIG. 15. In the preferred embodiment of the intra-building location system described above, the wireless LAN communicates this map and the information necessary to associate locations defined by triangulation between transmitters with positions on it. Once communicated, this information can be stored in the computer 14A so that the map can be rapidly accessed.

Similarly if the user double-clicks on the desktop map icon 412 shown in FIG. 32, step 396 shows map of FIG. 33, which illustrates desktop locations defined for the user that can be detected by the global positioning locator 242, shown in FIG. 15. Such maps for an organization's local area, its state, its country, and the world can be stored in a computer on the wireless LAN. But a given user's computer only need store the maps which he or she frequently uses.

Desktop maps are provided for intra-building and GPS desktop locations. An individual user's intra-building and GPS locators 240 and 242 can normally indicate when they are at any location in their respective maps. Thus, it is possible to associate a desktop with virtually any location, of virtually any size, in such a map.

If the user selects to create a new intra-building or GPS location on such a map, step 417 allows the user to draw a rectangle 420 representing the size and position of that location on the map, and it creates an ID and desktop in association with it. These desktops are represented by a desktop icon 232 associated with each such location on the map.

If a user select to drag one side 424 of such a location rectangle 420, step 418 moves the corresponding rectangle and, thus, the location associated with its desktop.

If the user drags on such a rectangle's sizing drag boxes 422, step 420 will resize the location's rectangular size to correspond to the movement of the side of that rectangle which is moved via the drag box.

When a user detects bar code IDs with the bar code reader 170, the computing apparatus 230 can automatically calculate the approximate location of those bar codes relative to an intra-building or GPS map. It can do so from the position the user was in and the direction his or her head was pointing at the time such a bar code pattern was located. A more exact location can be calculated if the user views the bar code from two or more different angles. If the user so selects, these locations can automatically be entered into a intra-building or GPS desktop map. The locations associated with bar codes, however, cannot be changed by dragging or resizing an object on the desktop map, since their location can only be moved if their associated bar code is moved. In FIG. 31 the location of such bar codes are indicated by "<" shaped icons 430.

If the user double-clicks on any desktop icon in the desktop map, step 426 will cause that desktop to be displayed, and the user can then drag windows in and out of it according to step 364.

Thus, it can be seen that desktop maps make it very easy for a user to rapidly associate a desktop with a physical location and then to place information in that desktop. When the user moves to that location the information placed in its desktop will either appear in his or her head mounted display, or a tone can be selected to sound indicating to the user that there is information for the user associated with his or her current location.

In the example shown in FIG. 31, the user has created desktops that become selected whenever he enters certain rooms, such as the conference room or his boss's office. Although he can easily access this information while at any location through the portion of the desktop outline shown in FIG. 30, the information will be automatically selected whenever he enters those rooms. Similarly the user has associated desktops with certain locations in the GPS map shown in FIG. 33. For example, he has associated separate desktops with the local supermarket and mall, where he places respective shopping lists. He has also placed a GPS activated desktop in the driveway of his house. In it he has placed the window 180J which has a sound alarm associated with it, as indicated by the icon 428 shown in FIG. 32. This window reminds him of something he is not supposed to leave his home without.

Figure 17B:
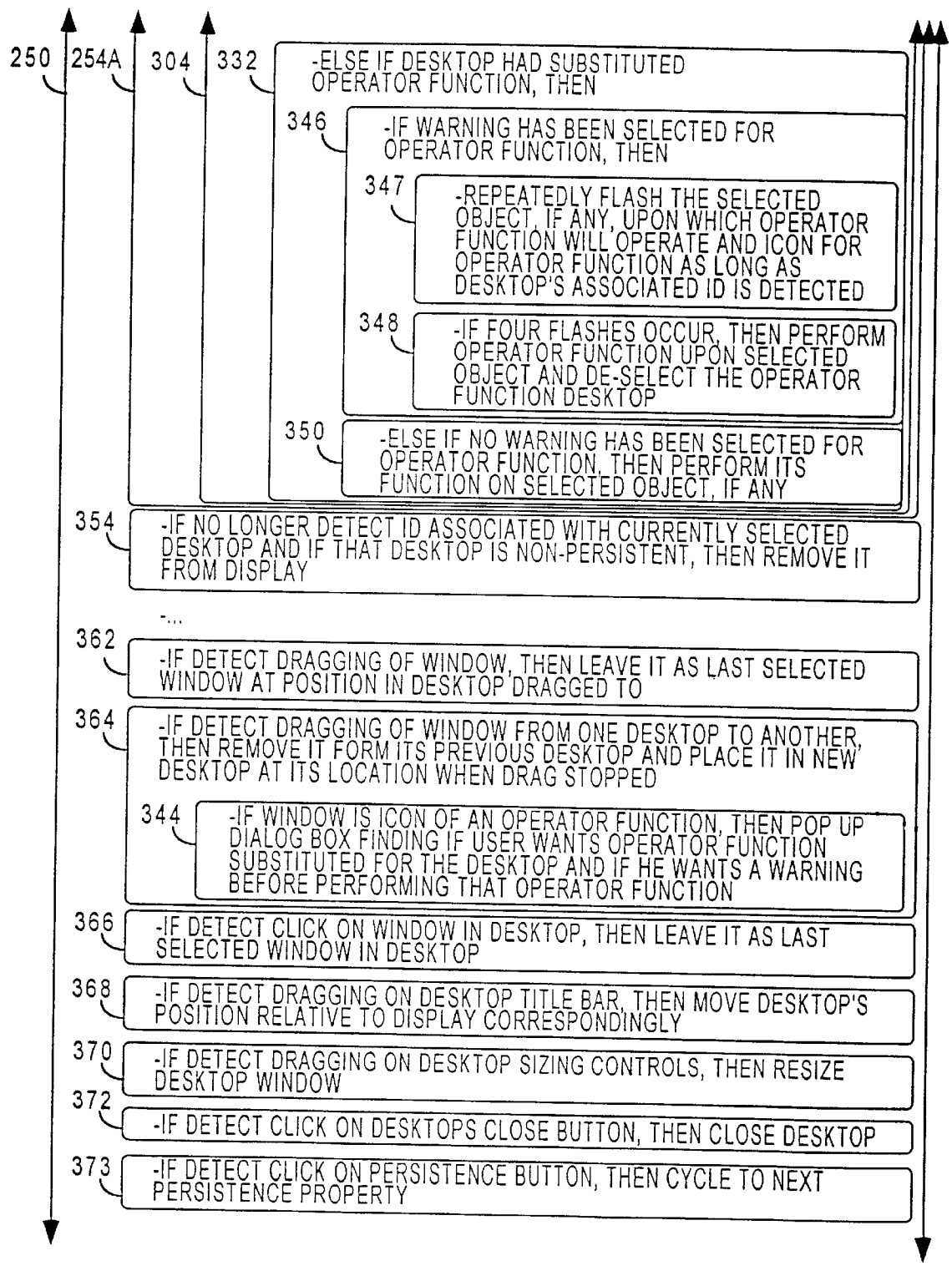
Figure 17C:
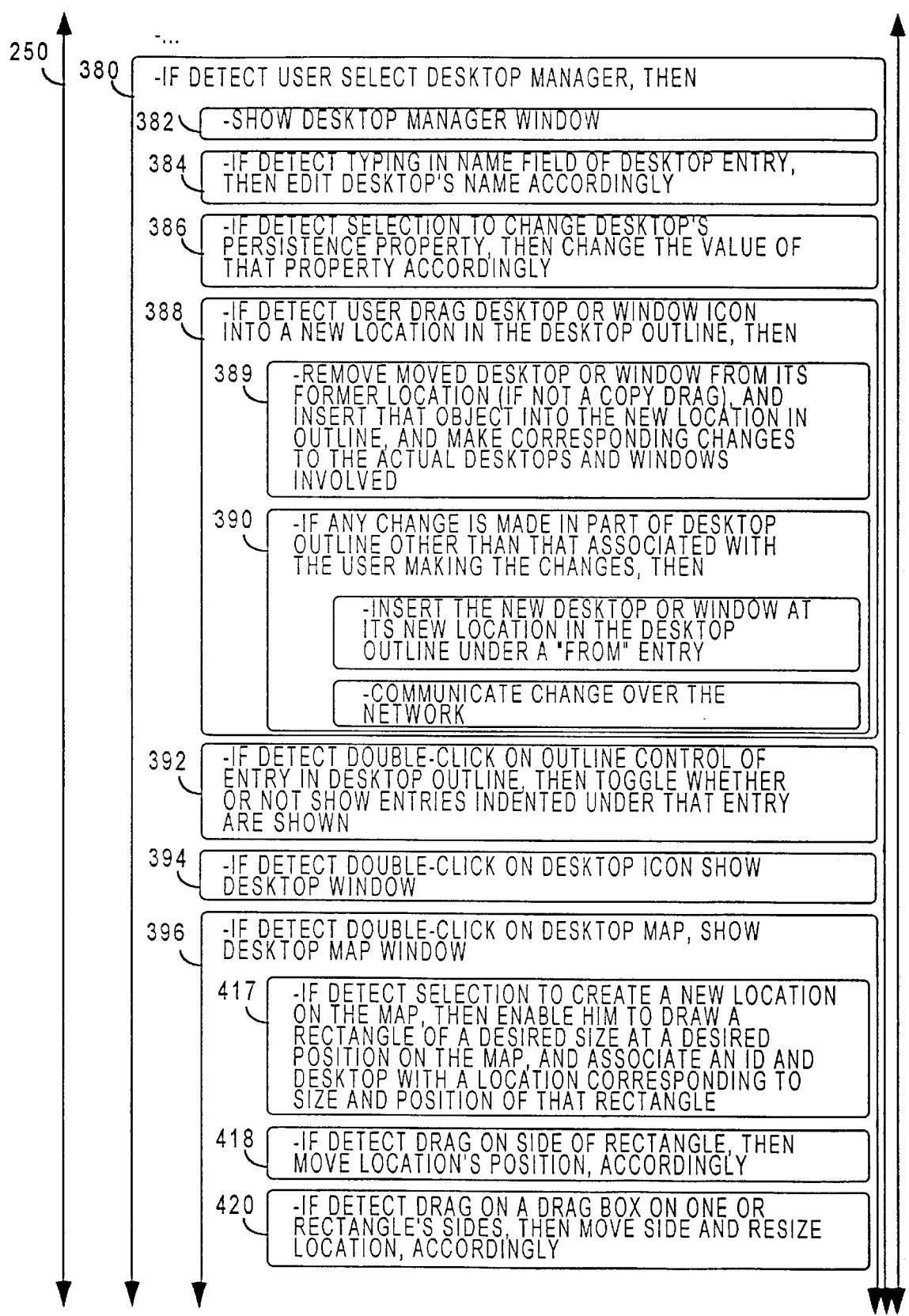
Figure 17D:
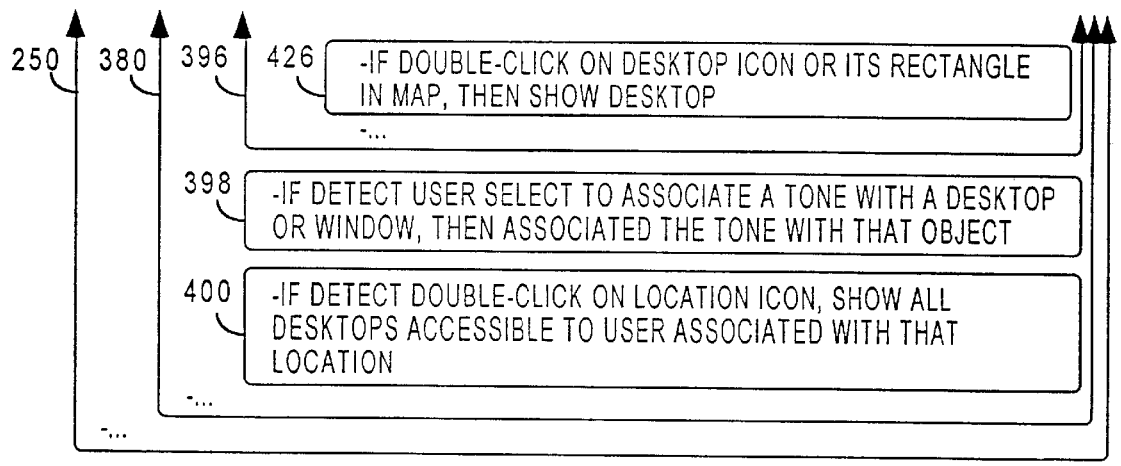

Step 398 of FIG. 17D enables a user to associates a tone of the type indicated by the icon 428 with a window or desktop. This is done by having the user select that window or desktop with the cursor and then use the menu bar to associate such a tone with it. This tone will sound, if the user has his or her sound turned on, whenever the system detects an ID associated with a desktop which has such a tone associated with it or with a window in it. This is useful if the user is not wearing his or her head mounted unit when he or she enters a location with which important information has been associated. The sounding of the alarm will prompt the user to put on, or turn on, or look at his or her display. It is also useful in embodiments of the invention which do not have head mounted visual display, or visual displays at all, such as audio-only embodiments of the invention.

Figure 34:
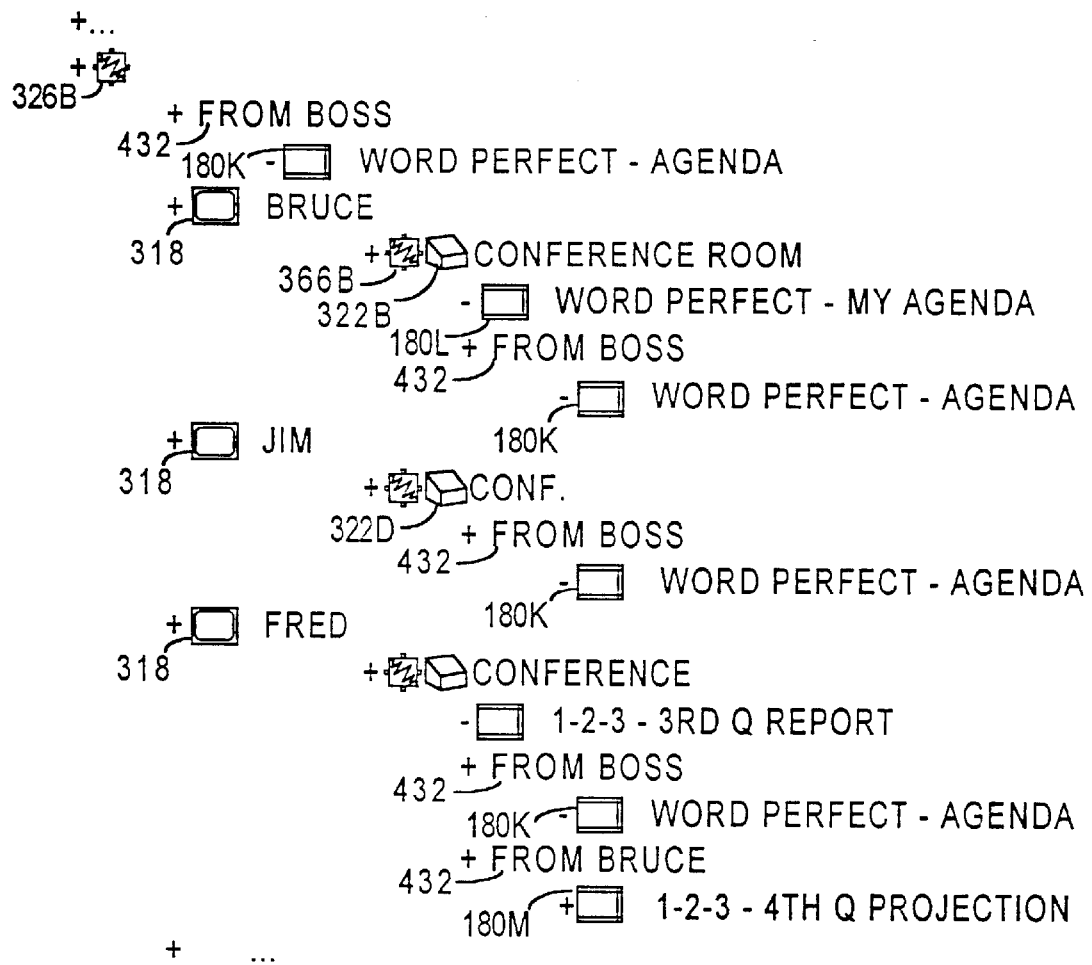
FIG. 34 illustrates a view of a portion of a desktop outline showing all the desktops of different users associated with one location.

If the user double-clicks on a location icon 326, 326A, or 326C associated with a given desktop icon, step 400 will use the wireless LAN to gather information on, and to display, all of the desktops accessible to the user which are associated with that location. For example, if the user Bruce double-clicks on the location icon 366B associated with the desktop icon 322B, titled "CONFERENCE ROOM" in FIG. 30, he will see a projection of the desktop outline corresponding to FIG. 34 showing all the other desktops which might be associated with that same location in portions of the of the desktop outline associated with other users, such as Jim and Fred shown in the example.

This ability to see all the desktops which different people have associated with a location enables one to see what desktops windows have been associated with that location, and to place desired windows in the desktop associated with that location by each of one or more users. The user can do this by merely dragging or copy-dragging a window to a location under a desired user's version of the given desktop, using steps 388 and step 390. For example, if the user Bruce drags the window 180M to under Fred's "Conference" desktop it will be positioned as is the window 1 80M under a "From Bruce" entry 432A, as shown in FIG. 34.

If a user desires to place a window in each desktop associated with a given location, he or she can do this by dragging the window's icon to a position immediately under the location icon 326B representing that location. If this is done that window icon will be inserted under a "From" entry at that location, as is indicated by the window 180K shown in FIG. 34. When this is done corresponding "From" and window entry are placed under each desktop associated with that location which is accessible to the user making the insertion.

Preferably the user is allowed to limit who has access to the various portions of his or her desktop outline to prevent others from interfering with selected portions of his or her computer work environment.

XIV. Person Specific Messages on Communal Display

Figure 35:
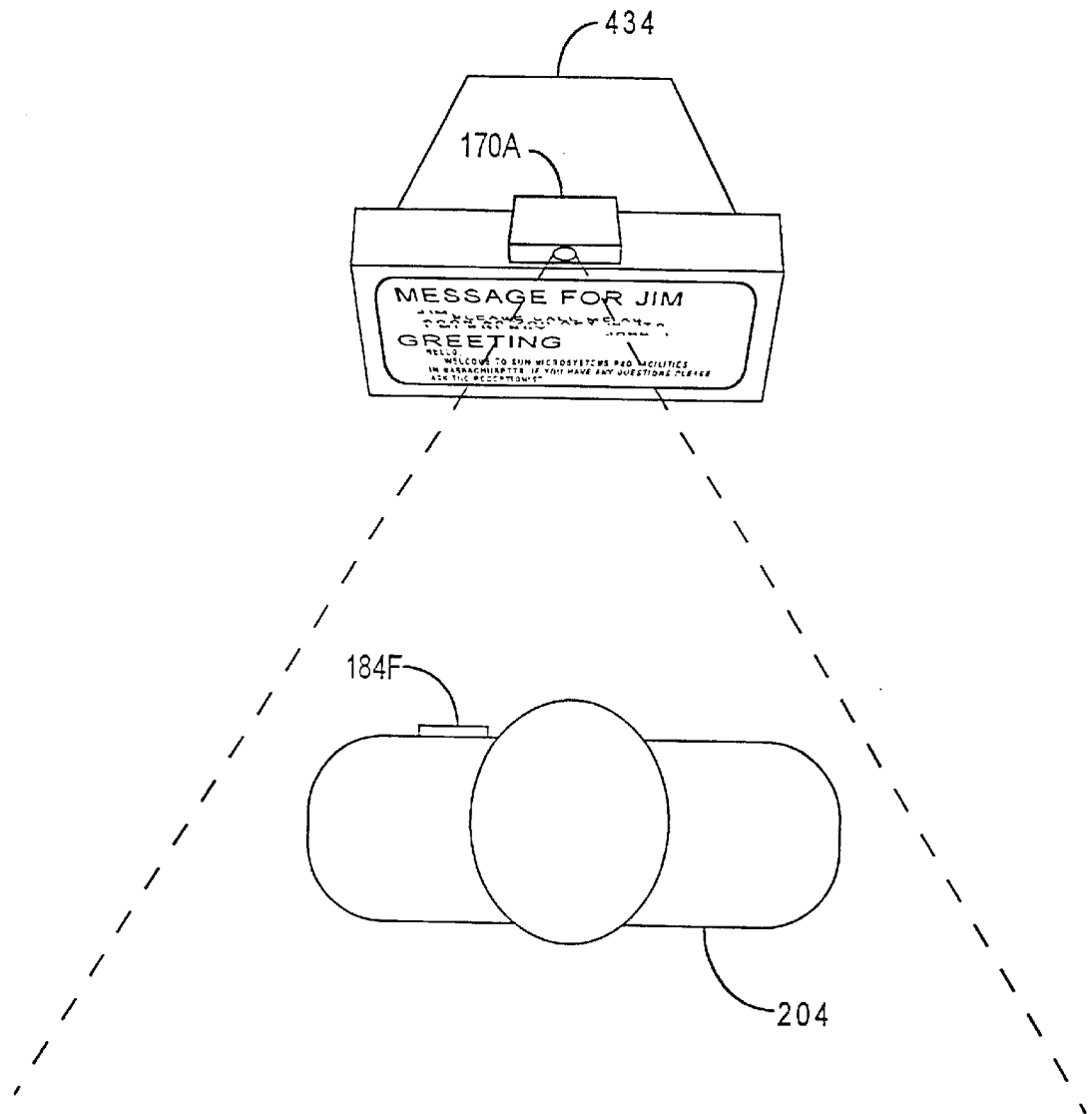
FIG. 35 illustrates a shared display which can be used by the present invention to display different messages for different users.

FIGS. 35 and 36 illustrate how the invention can be used not only to control the display of information on an individual's head mounted display, but also on a communal display 434 which acts as an electronic bulletin board. In this case the communal display is treated in the desktop outline just as is each user's individual display. For example, the display "Front Door Msg. Screen" shown in FIG. 29 is a communal display. As is indicated in FIG. 36, in which that display's part of the desktop outline has been expanded, it has the same type of outline structure as does the individual display associated with "Bruce".

Since such communal displays are normally stationary, the desktops they display are normally associated with bar coded patterns worn on individual identity badges, such as the bar code 184F shown on the person 204 in FIGS. 12 and 35. When no such bar code is detected within the view of the bar code reader 170A located with the display, the display shows the windows, if any, associated with the background desktop icon 360 shown in FIG. 36. When the system detects a person wearing a bar code pattern 184F, step 245A, 304, 330, and 338 of FIG. 17A will display the desktop, if any, associated with that user on the display 434.

In other embodiments of the invention, the bar code reader 170A can be replaced with a video camera and visual recognition system, similar to that shown in FIG. 14, which recognizes faces or other identifying visual features of individual people and uses them to determine which desktops to display.

XV. Hand Held Display with Motion Controlled Cursor and Window Selection

Figure 37:
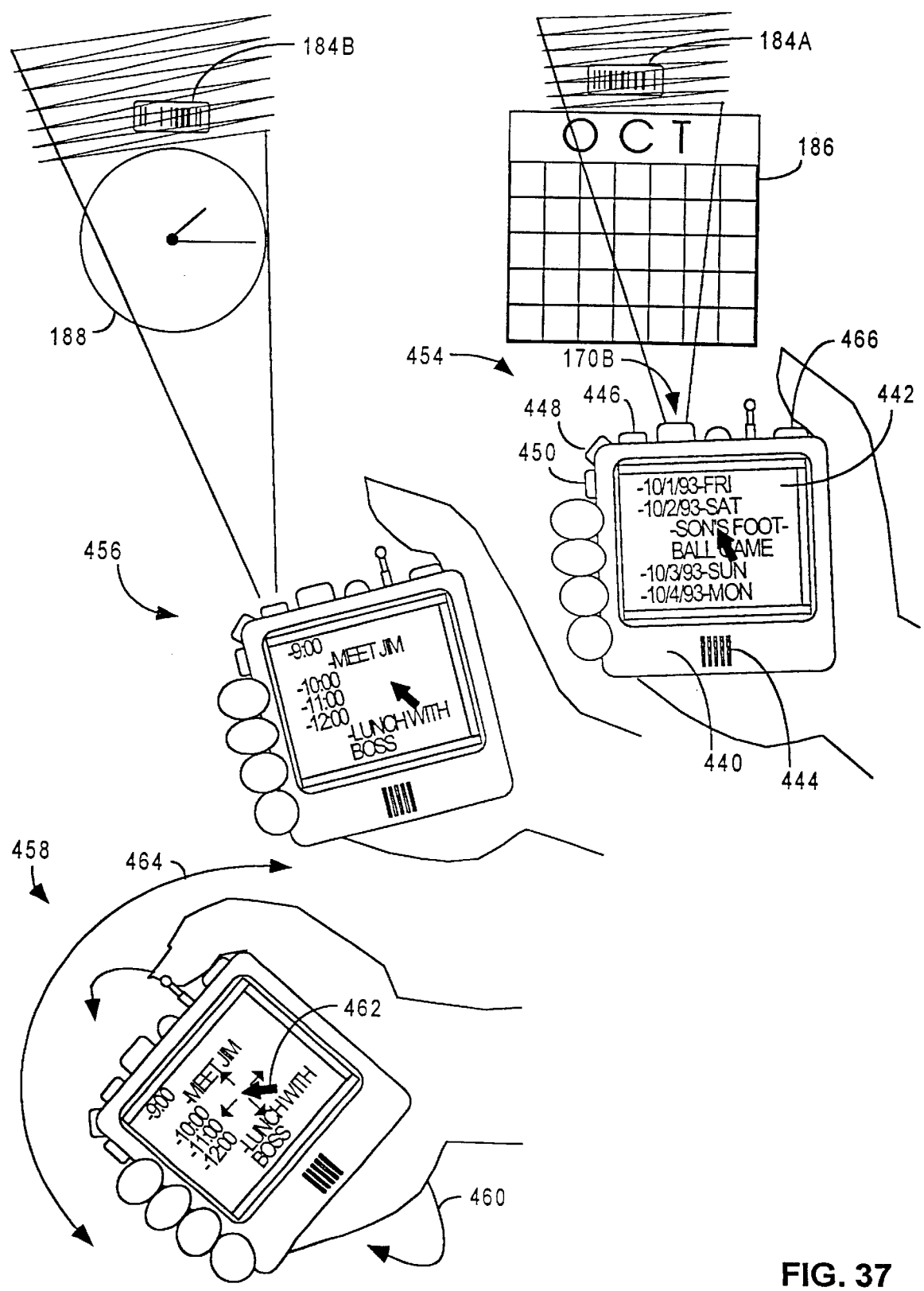
FIG. 37 illustrates an alternate embodiment of the invention using a hand-held computer with a built in display, showing how motion of the computer can be used both to select desktops and to move the cursor.

FIG. 37 illustrates how the present invention can be beneficially used in a hand held computer 440 having a visual display 442. In this embodiment of the invention the computer has a microphone 166 and speaker 168 hidden behind openings 444, left, middle, and right mouse button, 450, 448, and 446, respectively, and a bar code reader 170B. It also contains a tilt detector like the detector 238 shown in FIG. 15, except that it detects side-to-side tilting as well as front-to-back tilting.

When the user places the computer in the position 454 so the bar code reader points at the bar code pattern 184A located above the calendar 186, a program similar to that of FIGS. 17A through 17D displays a desktop associated with that bar code pattern. In the example of FIG. 37 this desktop contains a window with a month view in a calendar programs. When the user places the computer in the position 456 so the bar code reader points at the bar code pattern 184B placed near the clock 188, the program displays a desktop associated with that bar code pattern which, in the example, contains a window having a day view of the calendar program. Similarly, in the example, when the user points the bar code reader at other bar code patterns shown in FIG. 12, he or she sees desktops containing the windows described as being associated with those bar code patterns in the discussion of that figure.

As is shown at 458, when the user tilts the computer forward or backward in the direction 460 the cursor 462 moves correspondingly in the vertical, or Y, direction on his or her display. When he or she tilts the computer sidewards in the direction 464 the cursor moves correspondingly in the horizontal or X, direction on the display. Such titling is detected by gravity actuated tilt sensors similar to the sensor 238 shown in FIG. 15. The user can press any of the three mouse buttons 446, 448, or 450 after having tilted the computer to move the cursor over a desired screen object so as to select that object. The user can also keep such a button pressed after having so selected an object, to perform a drag while moving the cursor by tilting the computer.

The command interpreter for selecting desktops and generating pointing device inputs for such a computer is similar to that described above with regard to FIG. 16, except that it uses mouse button input instead of eye blinks to generate mouse button down signals. When a separate button 466 is pressed, motion of the computer is not used to move the cursor, allowing extended cursor motion in any given direction without requiring a corresponding net motion in that direction, the same way that the closing of both eyes does with the program of FIG. 16.

The embodiment of the invention shown in FIG. 37 provides a hand held computer in which a user can rapidly select windows and perform functions upon them without requiring a separate pointing device. If the computer includes speech recognition, the user would be able to perform all computer functions with just the one hand required to hold that computer.

XVI. Video Recognition of Pointing Toward External Locations or Objects

Figure 38:
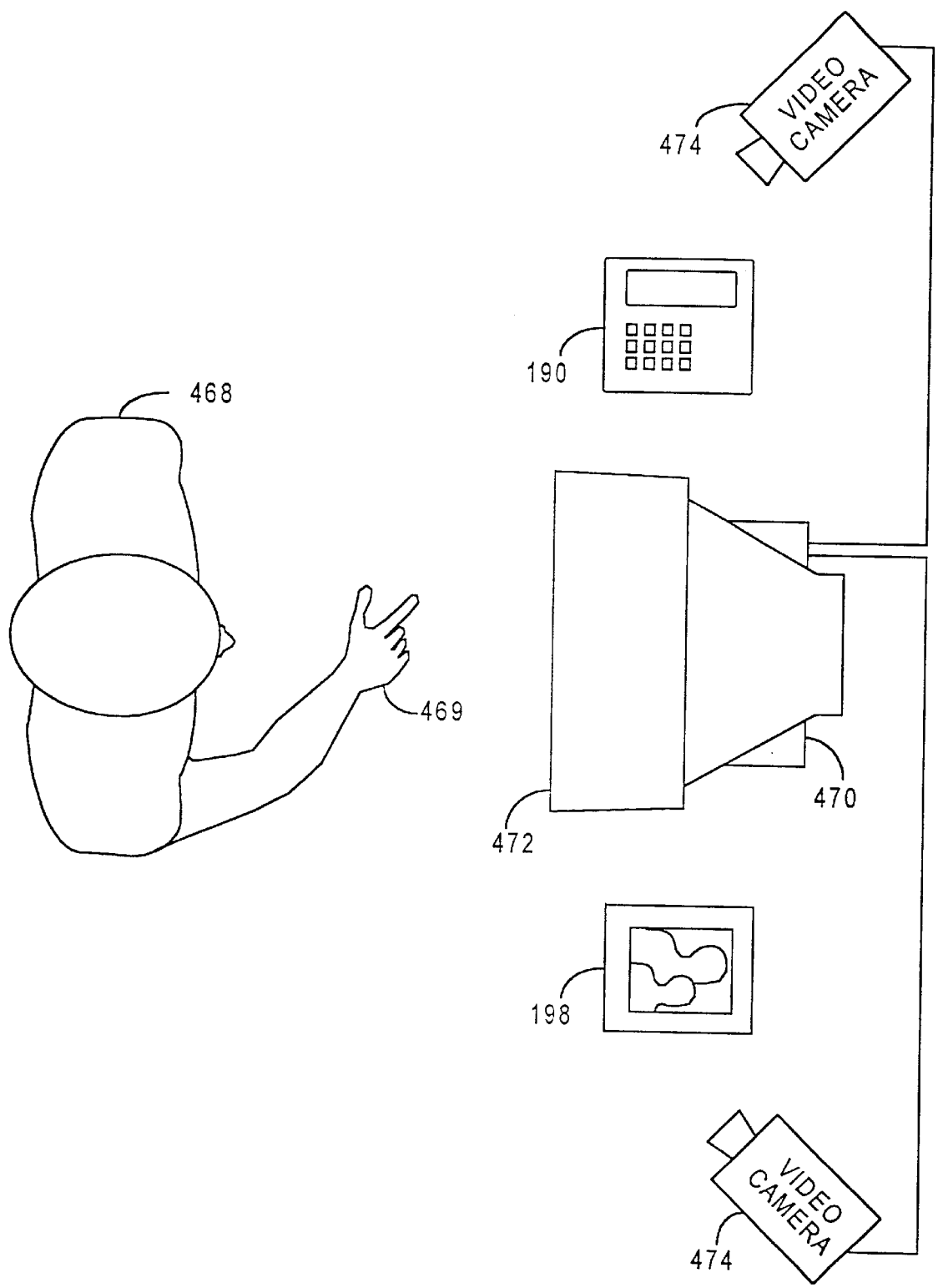
FIG. 38 illustrate an alternate embodiment of the invention which uses video recognition to enable the user to select computing objects and generate commands by pointing his or her hand.

FIG. 38 shows another embodiment of the invention in which a user 468 can select desktops merely by pointing his or her hand 469 at their associated external locations. This embodiment's computing apparatus 470 includes a computer (not shown in the figure), such as a SPARCstation computer of the type described above by Sun Microcomputer, Inc., a display screen 472 and one or more video cameras 474 connected to it.

Figure 39:
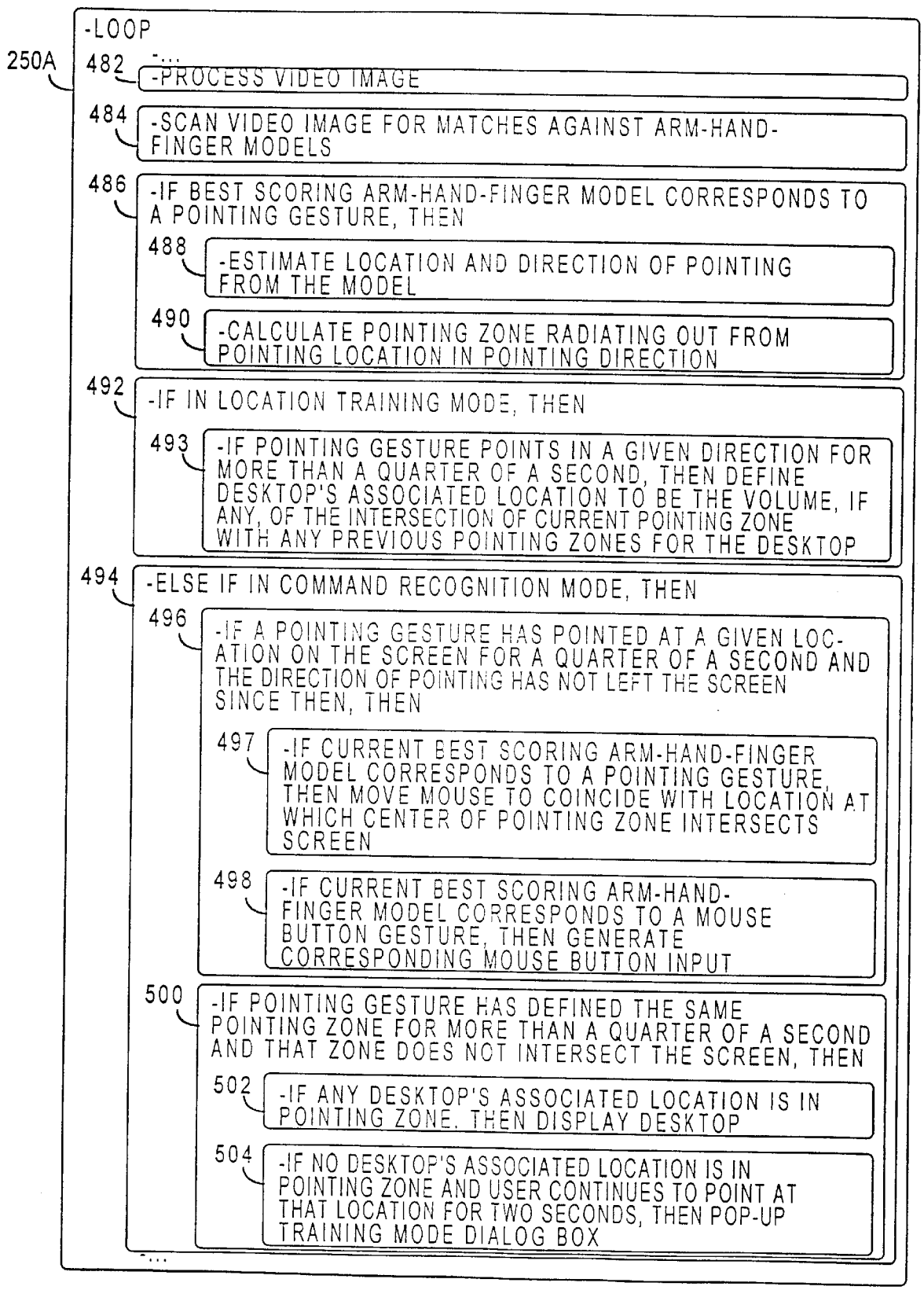
FIG. 39 illustrates a high level flow chart of a part of the program used to recognize and respond to commands generated by the user's hand shown in FIG. 38.

FIG. 39 show a high level flow chart of a part of the program loop 250A which is used in the embodiment of the invention shown in FIG. 38. The loop 250A is a modified version of the same command loop 250 which is partially shown in FIGS. 16 and 17A–17D.

Step 482 processes the video image or images from the apparatus's one or more video cameras.

Step 484 scans those one or more images for patterns that match arm-hand-finger models stored in the computer's memory. These models includes separate component models for arms, hands, and fingers shown in different angles and models for allowed linkages between such body parts.

Step 486 tests to see if the best scoring arm-hand-finger model corresponds to a pointing gesture, and if so it causes steps 488 and 490 to be performed. In the embodiment shown, a pointing gesture occurs when the user sticks his or her index finger out strait, with the thumb sticking up and the other fingers folded, as is indicated by the hand 469 shown in FIG. 38.

If the best scoring arm-hand-finger model corresponds to such a pointing gesture, step 488 estimates the location of the finger of the best scoring arm-hand-finger model and the direction in which it is pointing. If there are two cameras, location of the finger can be calculated by triangulation. If not, it can be estimated by size of the finger's image relative to the user's finger, if the system has been trained to know the user's finger size, or to the size of an average finger, if not. The direction of pointing can be calculated from the angle in which the finger of the best scoring arm-hand-finger model appears pointed in the image or images captured by the one or more camera's 474.

Once step 488 is complete, step 492 calculates a limited angular pointing zone which extends out radially from the calculated location of the finger in the direction in which that finger is calculated to point.

If the program is in a mode in which the user is training the system to know where a location associated with a desktop is, step 492 records the time when the user is first detected pointing in that direction under such circumstances. On successive passes through the loop, the step counts the length of time the user has continued pointing in that direction during the training mode. If, on any given pass through the loop, step 492 indicates the pointing gesture has been pointing in the same direction for over a quarter of a second, step 493 causes the desktop location being trained to be defined as the volume of the intersection of the pointing zone corresponding to the current pointing direction with any previous pointing zones for the given desktop location.

During this training process the user is instructed to point at the location to be associated with the desktop from at least three different directions, including from different vertical and horizontal positions. The user is also instructed to hold his or her hand in each such pointing gesture for at lest a quarter second. The intersection of the resulting different pointing zones created in different passes through the loop 480 will define a location for the desktop which has a limited extent in all three spatial dimensions.

If the program is in the command recognition mode, the mode in which it responds to user gestures to control desktop display and cursor functions, the test of step 494 will be met, causing steps 496 and 500 to be performed.

On each pass through the loop 250A in which the system is in command recognition mode step 496 determines if 1) the user has pointed at a given location on the screen for at least a quarter of a second and 2) has not pointed his or her finger at a location which is substantially off the screen since the end of that quarter of a second. If the condition of this test are currently met, either step 497 or 498 can be performed.

If the best scoring arm-hand-finger model is a pointing gesture, step 497 moves the display's mouse cursor to correspond to the location at which the center of the finger pointing zone intersects the screen. Preferably a smoothing algorithm, of the type described above with regard to the graphics processor 54, is used to prevent normal unsteadiness of the hand from undesirably shaking the mouse cursor.

If the best scoring arm-hand-finger model corresponds to a mouse button gesture, step 498 generates the corresponding mouse button input. Pointing the thumb down so it points in substantially the same direction as the pointing index finger is interpreted as a left mouse button down. Pointing the thumb down toward the palm at approximately a ninety degree angle to the index finger is interpreted as a right mouse button down. And pointing all the fingers out parallel to the index finger is interpreted as the middle mouse button down. When such gestures are made the mouse should remain stationary unless the index finger moves excessively, so as to compensate for the shaking of the index finger which will normally result during such movement of other fingers.

If during command recognition mode a pointing gesture has defined substantially the same pointing zone for more than a quarter of a second and that pointing zone does not intersect the screen 472 or an area immediately around it, step 500 enables step 502 or 506 to be performed.

If the test of step 500 determines that the pointing zone detected for over a quarter of a second intersects a location associated with a desktop, step 502 selects and shows the desktop on the display 472 in a manner similar to that of step 304 of FIG. 17A.

If the pointing zone does not intersect any location associated with a desktop, and if the pointing gesture defining that zone is continued for a total of two seconds, step 504 pops up the training mode dialog box which gives the user the option of defining a new location and the desktop associated with it. If the user selects to enter this training mode, steps 492 and 493, described above, will be performed.

The program of FIG. 39 also includes steps, not shown in that figure, similar to those of FIGS. 17A through 17D for associating windows with desktops and for displaying, navigating, and editing a desktop outline.

It can be seen that the apparatus and method of FIGS. 38 and 39 make it possible for a user with a traditional display to make use of the present invention's ability to associate computational objects with locations and then to select those objects merely by pointing at them. If the computer 14B includes speech recognition, this system would enable a user to perform all the operations necessary to operate a computer from a distance without ever needing to touch any part of the computer apparatus.

XVII. Alternate Embodiments

The present invention provides novel ways to navigate through, rapidly select, and easily interact which computer generated information and objects. It should be understood that the novel aspects of the invention can by realized in many different ways in many different embodiments.

For example, in other embodiments the view spaces shown in FIGS. 2, 6, 7, and 12 can be made three dimensional and the user can navigate in them by three dimensional motion. Such motion could be sensed by any appropriate means, including the ultrasonic sensing system described with regard to FIGS. 1–4, a 3-D radio triangulation system, such as the intra-building system described above, by having the bar code reader 170 detect the frequency with which light is modulated by the reflection off a bar code pattern to determine changes in distance from such a pattern, and by having video cameras such as those shown in FIG. 39 triangulate or calculate changes in distance from objects by changes in the size of the images of those objects.

In some embodiments of the invention characteristics are combined from the different types of view spaces described above, the continuous view space of FIG. 2, the quantized path-independent view space of FIG. 6, the quantized hyper view space of FIG. 7, and the quantized, location-dependent, view space shown in FIG. 12. For example, a screen shown in any one of these different types of view spaces could become an entrance to another one of those types of view spaces, in a manner similar to that described above with regard to screen 114B of FIG. 6.

View spaces of the type shown in FIGS. 2, 6, 7, 12 can be viewed with any type of display including: head mounted displays which shut out the surrounding physical world, as shown in FIG. 2; head mounted displays which allow the user to see the surrounding word, as shown in FIGS. 9 and 10; small portable displays, as shown in FIG. 37; desk mounted displays as shown in FIG. 39; or wall mounted displays. Some futurists are talking about building light valves or light emitting elements into contact lenses. When, and if, such contact lens video display are built, their use for the purpose described above would come within the scope of this invention.

The measuring step 92 of FIG. 5, the position change calculating steps of FIG. 8, and the detecting steps 158 and 254A of FIG. 11 and of FIGS. 17A–17B, respectively, can all be performed in ways other than by measuring motion or position of the user's head. This includes detecting the position of a portable computer or visual display as shown in FIG. 37, detecting the position of the user's portable computer, such as by the intra-building and global positioning locators discussed with regard to FIGS. 15 and 30–33, or detecting the position of a part of the user's body, as shown in FIGS. 38 and 39.

As is indicated in FIG. 35, these position detecting steps can also be used to alter the computers output by detecting changes in the relative position between the user, or a sensor, and a given location or object. Detection of the position or motion of the user, parts of the user's body, the user's computer, a sensor, or an external object can all be detected by virtually any means and still come within the scope of the present invention.

The external locations with which communication links are associated according to the aspect of the invention shown in FIG. 11 and many of the figures that follow include locations associated with objects which can be detected by a sensor such as the bar code reader, infrared detector, or video camera of FIGS. 12, 13, and 14, respectively. Other types of objects and sensor could be used, such as visible lights and photo detectors, ultrasonic generators and detectors, the human voice and a speaker identification module, etc. The location can be defined relative to a spatial location system such as the intra-building and GPS systems described above. It also can be defined relative to a user's own body. For example, pointing the user's head to his or her left shoulder could select one communication link and pointing it to his or her right shoulder could select another.

The computation which equates changes in motion or position with changes in display can be varied in different embodiments of the invention. For example, the amount of head or other user movement required to navigate from one screen to the next in the view spaces of FIGS. 2, 6, and 7 can be varied greatly. In some situations it is advantageous to make a small amount of user motion cause the transition from one screen to the next. In others it is desirable to allow the user a wide degree of movement without changing screens. For example, when very small amounts of motion are sufficient to cause screen changes, movement through a quantized space of the type shown in FIGS. 6 or 7 can be used to create a continuous "motion picture" image.

The access step 98 of FIG. 5 is implemented by the scan line generator 60 under the supervision of the graphics processor 54. It should be understood that in other embodiments of the invention different methods for generating scan lines can be used.

The dimensions and size of the virtual view space 40, frame buffer 42 and view window 36 are all arbitrary. In some embodiments of the invention the screen buffer might be no larger than the screen of the video display. In some embodiments of the invention the view space stores, and the visual display shows, monochrome images. In others they store and show color images. The graphics processor 54 can be modified to perform a number of standard graphics related functions, such as shading, anti-aliasing, illumination, etc.

It should be appreciated that the embodiments of the invention described above allows a user to select a succession of quantized views by moving through successive zones of motion without requiring a separate selecting step in each such zone. This is true with regard to the navigation of the spaces shown in FIGS. 6 and 7 when performed according to the flow chart of FIG. 8, as well as the navigation of the space shown in FIG. 12 when performed according to the flow charts of FIGS. 16 and 17A–17D. This is advantageous because it lets the user scan visual information at a very high rate, without slowing him or her down by requiring an extra selection step to see each new piece of the visual space. In some embodiments of the invention, however, the user might be required to click a mouse button or perform some other selection step to see each new piece of the visual space, for example, to prevent his or her view from being changed unless specifically desired.

It should be understood that the information navigational methods described above will often be combined with other navigational methods, such as associating certain windows or desktops with keys of a computer keyboard.

In alternate embodiments of the aspect of the invention shown with regard to FIG. 11 and the figures that follow it, items other than desktops are associated with external locations. For example, in some such embodiments windows are associated directly with external locations, rather than being placed at desired locations in desktops associated with such locations. In other embodiments of this aspect of the invention computational objects other than GUI windows are associated with external locations, including character based windows, images, text messages, audio messages, OOP type objects, changes in input or output direction, different locations within a document, changes in modes of user interface operation, the turning of a display on or off, the zooming of a display's field of vision in or out, inputs in a command grammar, etc.

Alternate embodiment of the invention can operate with different types of hardware than that described above. As has been mentioned, different types of visual displays and motion or position sensing apparatus can be used. Computers other than those manufactured by Sun Microcomputer, Inc. described above can be used. For example, pocket sized or wrist mounted computers could be used. The computers could be multiprocessing computers or non-Von Neumann computers. Neural net or fuzzy logic computer could be used, for example, to automatically associate a communication link with a given location or object if the user often uses that link when pointing at or near that location or object.

In different embodiments of the invention different subsets or superset of the input and output devices shown in FIG. 15 can be used. For example, in some embodiments of the invention an individual user's system is not networked, as described above with regard to FIG. 15, and, thus, has no means for placing windows in, or seeing what windows are located in, desktops associated with other users. In other embodiments, the user only carries a display or a smart terminal and much of the computation which drives his or her display is performed in a stationery computer, either one associated with the individual user alone, or a time sharing machine. The connection to such a stationary computer can be either by wire, optical, or radio link.

It should be understood that in other embodiments of the invention other types of user interface can be used. For example, the various continuous, quantized, and location dependent view spaces described above could be used in a character based user interface.

The command interpreter shown in FIG. 16 used to control a head-mounted, see-through display could use input other than eye closings to control its operations. For example, in other embodiments eye ball direction, speech, head nods, or other body gestures could be used. Similarly the command gestures used with embodiments of the invention like that of FIGS. 38 and 39 which views the motion of body parts can differ. For example, in a system monitoring head position with a video camera, blinks or facial expressions can be used to simulate mouse clicks or indicate when pointing is to be interpreted as a command.

It should be understood that the desktops described above can be used for other purposes besides associating windows with locations. They also provide a convenient way to organize computer work environments. The display of such desktops can be triggered by conditions other than the detection of locations. For example, the desktops under the desktop icon 322C shown in FIG. 29 are timed desktops that pop up at pre-specified times on specified days or on reoccurring patterns of days. Such other conditions can be combined with the detection of a location to trigger the display of a desktop. For example, a given desktop might only be popped up when a given location is detected if it is also a given day, or if a voice associated with a given person is also recognized, or if given words have also been recognized.

In other embodiments of the invention different methods besides the use of a desktop outline could be used to keep track of what communication links had been associated with what locations and to make changes in those associations. For example, where the number of locations is relatively small there is no need for such an outline at all.

It should be noted that the devices described in reference to FIGS. 1–39 are only exemplary. It is within the scope of the present invention to use any device to implement the above-mentioned functions. Thus, while the invention has been described in relationship to the embodiment shown in the accompanying figures, other embodiments, alternatives and modifications will be apparent to those skilled in the art.

What is claimed is:

1. A head mounted display apparatus comprising:
   a display for receiving a signal representing a visual image and for projecting a corresponding visual image which can be seen by a user wearing said apparatus;
   a directional detector for generating an object detection signal when said detector receives a certain signals from a physical object in response to said detector being pointed at said object, said detector being mounted on said apparatus so a user who is wearing the apparatus can point the detector by moving his or her head.

2. A head mounted display apparatus as in claim 1, further comprising a see through window to enable a user to see his or her physical surroundings when wearing the apparatus.

3. A head mounted display apparatus as in claim 1, further comprising an additional input device to enable a user wearing the apparatus to selectively generate computer readable signals in addition to those generated by said detector.

4. A head mounted display apparatus as in claim 1 wherein said detector points in the same general direction as the face of a user wearing said apparatus.

5. A head mounted display as in claim 1, wherein:
   the physical objects radiate electromagnetic radiation at a sufficient frequency that it travels in a substantially straight line;
   the directional detector has a limited angular view from which it can receive radiation;
   the user can point the angular view by moving his or her head; and
   the directional detector generates the object detection signal when the detector is pointed at one of said physical object so that it can receive radiation coming straight from such an objects.

6. A method of providing a computer graphical user interface comprising the steps of:
   computing a view space in which graphical user interface windows each generated by a separate computer process can be selectively located by a user, said view space having a plurality of discrete portions each of which is large enough to hold a plurality of said windows generated by separate computer processes;
   computing a plurality of said graphical user interface windows;
   enabling a user to selectively locate a variable number of said windows in each of said view space portions and to selectively move said windows between view space portions by use of a point and click interface;
   displaying a subset of said view space portions to the user with a head-mounted visual display;
   sensing motion of a user's head;
   changing the portions of the view space displayed to the user, in discrete units of view space portions, in response to changes sensed in the position of the user's head.

7. The method of claim 6 wherein said step of enabling a user to selectively locate and move windows includes enabling a user to drag a window with a pointing device to a desired portion in said view space.

8. The method of claim 6 wherein:
   said step of sensing motion of a user's head includes sensing rotational movement of a user's head; and
   said step of changing the portions of the view space which are displayed includes making such changes in response to the detection of said rotational motion, so a user can change the portion of the view space shown without moving the majority of his or her body, merely by rotating his or her head.

9. The method of claim 6, further comprising the step of detecting eye movements of the user and using the detections of said eye movements to enable the user to interact with windows in the portion of the workspace displayed to him or her.

10. The method of claim 6 wherein:
    the sensing of motion of a user's head, including dividing head motions into at least a first and second class of head motion;
    the method makes said changes in the portions of the view space displayed to the user in response to head motions of said first class but not head motions of said second class, so as to enable a user to move further in the view space in a given direction than would otherwise be possible by causing successive head motions in the given direction to be of the first class which are counted toward such view space motion, and causing one or more intervening head motions in the opposite direction, made so as to prevent the head from being over extended in the given direction, to be of the second class, so as to go uncounted toward such view space motion.

11. A method of providing a computer graphical user interface comprising the steps of:

computing a computer generated visual space;

displaying a subset of said visual space to the user;

sensing user motion including monitoring motion of a user's head, said sensing including dividing head motions into at least a first and second class of head motion;

allowing a user to navigate through said visual space by changing the subset of the visual space displayed in response to head motions of said first class, but not in response to head motions of said second class, so as to enable a user to move further in the visual space in a given direction than would otherwise be possible by causing successive head motions in the given direction to be of the first class which are counted toward such visual space motion, and causing one or more intervening head motions in the opposite direction, made so as to prevent the head from being over extended in the given direction, to be of the second class, so as to go uncounted toward such visual space motion.

12. A method as in claim 11 wherein said step of displaying uses a head mounted display.

* * * * *